(12) United States Patent
Ort et al.

(10) Patent No.: US 12,534,736 B2
(45) Date of Patent: Jan. 27, 2026

(54) PLANTS WITH INCREASED PHOTORESPIRATION EFFICIENCY

(71) Applicant: The United States of America, as Represented by the Secretary of Agriculture, Washington, DC (US)

(72) Inventors: Donald R. Ort, Champaign, IL (US); Paul F. South, Champaign, IL (US); Berkley Walker, Dusseldorf (DE)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 15/913,395

(22) Filed: Mar. 6, 2018

(65) Prior Publication Data

US 2018/0258440 A1     Sep. 13, 2018

Related U.S. Application Data

(60) Provisional application No. 62/467,993, filed on Mar. 7, 2017.

(51) Int. Cl.
   C12N 15/82      (2006.01)
(52) U.S. Cl.
   CPC ..... C12N 15/8218 (2013.01); C12N 15/8262 (2013.01); C12N 15/8269 (2013.01)
(58) Field of Classification Search
   CPC ............ C12N 15/8218; C12N 15/8262; C12N 15/8269
   See application file for complete search history.

(56) References Cited

U.S. PATENT DOCUMENTS

| | | | |
|---|---|---|---|
| 4,407,956 A | 10/1983 | Howell | |
| 4,536,475 A | 8/1985 | Anderson | |
| 4,683,195 A | 7/1987 | Mullis et al. | |
| 4,683,202 A | 7/1987 | Mullis | |
| 4,684,611 A | 8/1987 | Schilperoort et al. | |
| 4,800,159 A | 1/1989 | Mullis et al. | |
| 5,679,558 A | 10/1997 | Gobel et al. | |
| 6,140,553 A | 10/2000 | D'Halluin | |
| 7,208,318 B2 | 4/2007 | Hain et al. | |
| 10,106,826 B2 * | 10/2018 | Yuan ..................... | C12P 7/625 |
| 11,926,833 B2 | 3/2024 | Hall et al. | |
| 2006/0095981 A1 | 5/2006 | Hain et al. | |
| 2011/0023181 A1 * | 1/2011 | Maurino ............ | C12N 15/8261 800/278 |
| 2011/0268865 A1 * | 11/2011 | Kebeish .................. | C12N 15/52 426/622 |
| 2018/0258440 A1 | 9/2018 | Ort et al. | |

FOREIGN PATENT DOCUMENTS

| | | |
|---|---|---|
| CN | 102016012 A | 4/2011 |
| EP | 0067553 A2 | 12/1982 |
| EP | 0116718 A1 | 8/1984 |
| EP | 0233247 A1 | 8/1987 |
| EP | 0242246 A1 | 10/1987 |
| EP | 0270356 A2 | 6/1988 |
| EP | 0270822 A1 | 6/1988 |
| JP | 2005532791 A | 11/2005 |
| JP | 2007525966 A | 9/2007 |
| JP | 2020511960 A | 4/2020 |
| WO | WO-1984002913 A1 | 8/1984 |
| WO | WO-1985001856 A1 | 5/1985 |
| WO | WO-1987000516 A1 | 1/1987 |
| WO | WO-1992009696 A1 | 6/1992 |
| WO | WO-1996006932 A1 | 3/1996 |
| WO | WO-1997048819 A1 | 12/1997 |
| WO | WO-1999053050 A1 | 10/1999 |
| WO | WO-2000042207 A2 | 7/2000 |
| WO | WO-2000071733 A1 | 11/2000 |
| WO | WO-2002059294 A1 | 8/2002 |
| WO | WO-2009103782 A1 | 8/2009 |
| WO | 2016096761 A1 | 6/2016 |
| WO | WO-2016089931 A1 * | 6/2016 ......... C12N 15/8243 |
| WO | 2018165259 A1 | 9/2018 |

OTHER PUBLICATIONS

Maier et al (Front. Plant Sci., 2012, 3(38): 1-12) (Year: 2012).*
UniProt Accession A8J2E9_CHLRE (published online Dec. 4, 2007; see alignment below) (Year: 2007).*
UniProt Accession F4HRR5_ARATH (published online Jun. 28, 2011; see alignment below) (Year: 2011).*
Pick et al (PNAS, 2013, 110(8): 3185-3190) (Year: 2013).*
Lee et al (Plant Physiology, 2006, 140: 466-483) (Year: 2006).*
Kim et al (BMC Biotechnology, 2008, 8:36).*
Cui et al, J. of Exper. Botany (2021) 72:2584-2599.*
Pick et al., PNAS (2013) 110(8): 3185-3190, including Supporting Information.*
Walker et al, Photysynth. Res. (2016) 129:93-103.*
Friedberg I., Automated Protein Function Prediction—the Genomic Challenge, Brief. Bioinformatics (2006) 7:225-242.*
GenBank Accession KFK44969, Submitted on Jun. 3, 2014.*
Nakahara, J. et al., "Bending of Protonema Cells in a Plastid Glycolate/G.lycerate Transporter Knockout Line of Physcomitrella patens," PLOS, (2015), pp. 1-12.
NCBI GenBank Accession No. NP_564388.1, membrane protein [*Arabidopsis thaliana*] (RecName: Full=Plastidal glycolate/glycerate translocator 1, chloroplastic), Sep. 30, 2016.

(Continued)

*Primary Examiner* — Mykola V. Kovalenko
(74) *Attorney, Agent, or Firm* — Morrison & Foerster LLP

(57) ABSTRACT

Presented herein are plants with altered photorespiratory characteristics. Disruption of transport proteins involved in shuttling glycolate and/or glycerate results in reductions in photosynthetic rates, reduced plant growth and alterations in gene expression and photosynthetic metabolite profiles. Such disruptions are also combined with introduced genes expressing components of alternate photorespiratory enzyme pathways to increase photosynthetic efficiency.

13 Claims, 26 Drawing Sheets
(16 of 26 Drawing Sheet(s) Filed in Color)
Specification includes a Sequence Listing.

(56) References Cited

OTHER PUBLICATIONS

NCBI, GenBank Accession No. P24571.1, "Malate synthase, glyoxysomal", Sep. 7, 2016.
NCBI, GenBank Accession No. XP_001695381.1, "glycolate dehydrogenase [*Chlamydomonas reinhardtii*]", May 22, 2009.
International Searching Authority, PCT/US2018/021295 for The United States of America, as Represented by the Secretary of Agriculture et al., International Filing Date Mar. 7, 2018.
Donald Dansforth Plant Science Center, St. Louis, MO., 2015 Midwestern Section Annual Meeting, American Society of Plant Biologists, pp. 23-24 and 30.
Supplementary European Search Report for EP18764955, dated Oct. 23, 2020.
Lee et al., (2009). "Multiple Sequence Motifs in the Rubisco Small Subunit Transit Peptide Independently Contribute to TOC159-Dependent Import of Proteins into Chloroplasts," Plant Physiology, 151(1):129-141.
Obata et al., (2016). "On the metabolic interactions of (photo)respiration," Journal of Experimental Botany, 67(10):3003-3014.
Shim et al., (2020). "Loss of Function of Rice Plastidic Glycolate/Glycerate Translocator 1 Impairs Photorespiration and Plant Growth," Frontiers in Plant Science, 10:1726, 11 pages.
Aboelmy et al., (2014). "Enzymatic characterization of Chlamydomonas reinhardtii glycolate dehydrogenase and its nearest proteobacterial homologue," Plant Physiol. Biochem., 79:25-30.
Ahmad et al., (2016). "Improvement of biomass accumulation of potato plants by transformation of cyanobacterial photorespiratory glycolate catabolismpathway genes," Plant Biotechnol. Rep., 10:269-276.
Altschul et al., (1990). "Basic local alignment search tool," Journal of Molecular Biology, 215(3):403-410.
Altschul et al., (1997). "Gapped BLAST and PSI-BLAST: a new generation of protein database search programs," Nucleic Acids Research, 25(17):3389-3402.
An et al., (1996). "Strong, constitutive expression of the *Arabidopsis* ACT2/ACT8 actin subclass in vegetative tissues," The Plant Journal, 10(1):107-121.
Anderson, (1971). "Chloroplast and cytoplasmic enzymes. II. Pea leaf triose phosphate isomerases," Biochim Biophys Acta, 235:237-244.
Badger et al., (2009). "Chlorophyll fluorescence screening of *Arabidopsis thaliana* for CO2 sensitive photorespiration and photoinhibition mutants," Funct. Plant Biol., 36:867-873.
Bauwe et al., (2010). "Photorespiration: players, partners and origin," Trends Plant Sci., 15:330-336.
Bernacchi et al., (2003). "In vivo temperature response functions of parameters required to model RuBP-limited photosynthesis," Plant Cell. Environ, 26:1419-1430.
Betti et al., (2016). "Manipulating photorespiration to increase plant productivity: recent advances and perspectives for crop improvement," J. Exp. Bot., 67:2977-2988.
Bordych et al., (2013). "Co-expression analysis as tool for the discovery of transport proteins in photorespiration.," Plant Biol., 15:686-693.
Bowes et al., (1971). "Phosphoglycolate production catalyzed by ribulose diphosphate carboxylase," Biochem Bioph. Res. Co, 45:716-722.
Breuers et al., (2012). "Dynamic remodeling of the plastid envelope membranes—a tool for chloroplast envelope in vivo localizations" Frontiers Plant Sci., 3:7, 10 pages.
Brooks et al., (1985). "Effect of temperature on the CO2/O2 specificity of ribulose-1,5-bisphosphate carboxylase/oxygenase and the rate of respiration in the light," Planta, 165:397-406.
Christensen et al., (1992). "Maize polyubiquitin genes: structure, thermal perturbation of expression and transcript splicing, and promoter activity following transfer to protoplasts by electroporation," Plant Molecular Biology, 18(4):675-689.
Christou et al., (1990). "Soybean genetic engineering-commercial production of transgenic plants," Trends in Biotechnology, 8:145-151.
Clough et al., (1998). "Floral dip: a simplified method for Agrobacterium-mediated transformation of *Arabidopsis thaliana*," The Plant J., 16:735-743.
Couger et al., (2015). "Transcriptomic analysis of lignocellulosic biomass degradation by the anaerobic fungal isolate *Orpinomyces* sp. strain C1A," Biotechnol Biofuels, 8:208, 17 pages.
da Silva et al., (2013). "The solute carrier family 10 (SLC10): Beyond bile acid transport," Mol. Aspects of Med., 34:252-269, 28 pages.
Datta et al., (1990). "Genetically engineered fertile indica-rice recovered from protoplasts," Bio/technology, 8(8):736-740.
Davenport et al., (1979). "Movement of Kinetin and Gibberellic Acid in Leaf Petioles during Water Stress-induced Abscission in Cotton," Plant Physiol, 63:152-155.
de Pater et al., (1992). "The promoter of the rice gene GOS2 is active in various different monocot tissues and binds rice nuclear factor ASF-1," The Plant Journal, 2(6):837-844.
Depicker et al., (1982). "Nopaline synthase: transcript mapping and DNA sequence," Journal of Molecular and Applied Genetics, 1(6):561-573.
Eisenhut et al., (2013). "*Arabidopsis* A Bout De Souffle is a putative mitochondrial transporter involved in photorespiratory metabolism and is required for meristem growth at ambient CO2 levels," Plant J., 73:836-849.
Eisenhut et al., (2013). "Towards closing the remaining gaps in photorespiration—the essential but unexplored role of transport proteins," Plant Biol., 15(4):676-685.
Engler et al., (2014). "A golden gate modular cloning toolbox for plants," ACS Synthetic Biology, 3(11):839-843.
Fernie et al., (2013). "Perspectives on plant photorespiratory metabolism," Plant Biol., 15:748-753.
Franck et al., (1980). "Nucleotide sequence of cauliflower mosaic virus DNA," Cell, 21(1):285-294.
Fromm et al., (1990). "Inheritance and expression of chimeric genes in the progeny of transgenic maize plants," Bio/technology, 8(9):833-839.
Furumoto et al., (2011). "A plastidial sodium-dependent pyruvate transporter," Nature, 476:472-475.
Gardner et al., (1981). "The complete nucleotide sequence of an infectious clone of cauliflower mosaic virus by M13mp7 shotgun sequencing," Nucleic Acids Research, 9(12):2871-2888.
Genbank, (2006). "Accession: X00581; Maize alcohol dehydrogenase 1 gene (Adh1-1S)," available online at <https://www.ncbi.nlm.nih.gov/nuccore/22123>, 4 pages.
Genbank, (2006). "Accession: X04049; Maize alcohol dehydrogenase 1 gene (Adh1-1S)," available online at <https://www.ncbi.nlm.nih.gov/nuccore/X04049>, 4 pages.
Gielen et al., (1984). "The complete nucleotide sequence of the TL-DNA of the Agrobacterium tumefaciens plasmid pTiAch5," The EMBO Journal, 3(4):835-846.
Gigolashvili et al., (2009). "The Plastidic Bile Acid Transporter 5 Is Required for the Biosynthesis of Methionine-Derived Glucosinolates in *Arabidopsis thaliana*," The Plant Cell, 21:1813-1829.
Gimenez et al., (2003). "The gene yjcG, cotranscribed with the gene acs, encodes an acetate permease in *Escherichia coli*," J. Bacteriol., 185:6448-6455.
Glowacka et al., (2016). "An evaluation of new and established methods to determine T-DNA copy number and homozygosity in transgenic plants," Plant Cell and Environment, 39:908-917.
Gonzalez-Moro et al., (1997). "Glycolate accumulation causes a decrease of photosynthesis by inhibiting RUBISCO activity in maize," J. Plant Physiol., 150:388-394.
Gordon-Kamm et al., (1990). "Transformation of Maize Cells and Regeneration of Fertile Transgenic Plants," The Plant Cell, 2(7):603-618.
Haseloff, (1999). "Chapter 9: GFP variants for multispectral imaging of living cells," Method Cell Biol., 58:139-151.
Hinchee et al., (1988). "Production of transgenic soybean plants using Agrobacterium-mediated DNA transfer," Bio/technology, 6(8):915-922.
Hodges et al.,(2016). "Perspectives for a better understanding of the metabolic integration of photorespiration within a complex plant primary metabolism network," J. Exp. Bot., 67(10):3015-3026.

(56) References Cited

OTHER PUBLICATIONS

Howitz et al., (1985). "Substrate specificity of the pea chloroplast glycolate transporter," Biochem, 24(14):3645-3650.
Howitz et al., (1986). "d-Glycerate Transport by the Pea Chloroplast Glycolate Carrier ," Plant Physiol, 80:390-395.
Howitz et al., (1991). "Solubilization, Partial Purification, and Reconstitution of the Glycolate/Glycerate Transporter from Chloroplast Inner Envelope Membranes," Plant Physiol., 96:1060-1069.
Hull et al., (1978). "Structure of the Cauliflower Mosaic Virus Genome," Virology, 86:482-493.
Karlin et al., (1990). "Methods for assessing the statistical significance of molecular sequence features by using general scoring schemes," Proceedings of the National Academy of Sciences, 87(6):2264-2268.
Karlin et al., (1993). "Applications and statistics for multiple high-scoring segments in molecular sequences," Proceedings of the National Academy of Sciences, 90(12):5873-5877.
Kebeish et al., (2007). "Chloroplastic photorespiratory bypass increases photosynthesis and biomass production in *Arabidopsis thaliana*," Nat Biotechnol, 25:593-599.
Kelly et al., (1976). "Inhibition of spinach-leaf phosphofructokinase by 2-phosphoglycollate," Febs Lett, 68:55-58.
Kozaki et al., (1996). "Photorespiration protects C3 plants from photooxidation," Nature, 384:557-560.
Kromdijk et al., (2016). "Improving photosynthesis and crop productivity by accelerating recovery from photoprotection," Science, 354:857-861.
Last et al., (1991). "pEmu: an improved promoter for gene expression in cereal cells," Theor Appl Genet, 81:581-588.
Lorimer, (1981). "The Carboxylation and Oxygenation of Ribulose 1,5-Bisphosphate: The Primary Events in Photosynthesis and Photorespiration," Ann. Rev. Plant Physiol, 32:349-383.
Maurino et al., (2010). "Photorespiration: current status and approaches for metabolic engineering," Curr Opin Plant Biol, 13:249-256.
Needleman et al., (1970). "A general method applicable to the search for similarities in the amino acid sequence of two proteins," J. Mol. Biol., 48:443-453.
Nogues et al., (1998). "Ultraviolet-B Radiation Effects on Water Relations, Leaf Development, and Photosynthesis in Droughted Pea Plants," Plant Physiology, 117(1):173-181.
Nolke et al., (2014). "The expression of a recombinant glycolate dehydrogenase polyprotein in potato (*Solanum tuberosum*) plastids strongly enhances photosynthesis and tuber yield," Plant Biotechnol. J., 12:734-742.
Ogren et al., (1971). "Ribulose Diphosphate Carboxylase regulates Soybean Photorespiration," Nature-New Biol., 230:159-160.
Ogren, (1984). "Photorespiration: Pathways, Regulation, and Modification," Ann. Rev. Plant Physiol., 35:415-442.
Oliveira et al., (1996). "Isolation and characterisation of mutants from the halotolerant yeast *Pichia sorbitophila* defective in H+/glycerol symport activity," FEMS Microbiol. Lett., 142:147-153.
Oxborough et al., (1997). "An instrument capable of imaging chlorophyll a fluorescence from intact leaves at very low irradiance and at cellular and subcellular levels of organization," Plant Cell Environ, 20:1473-83.
Pandolfini et al., (2003). "Expression of self-complementary hairpin RNA under the control of the rolC promoter confers systemic disease resistance to plum pox virus without preventing local infection," BMC Biotechnology, 3:7, 15 pages.
Pathirana et al., (1997). "Analyses of phosphoenolpyruvate carboxylase gene structure and expression in alfalfa nodules," Plant J, 12:293-304.
Patron et al., (2015). "Standards for plant synthetic biology: a common syntax for exchange of DNA parts," New Phytol., 208:13-19.
Price et al., (2013). "The cyanobacterial CCM as a source of genes for improving photosynthetic CO2 fixation in crop species," J. Exp. Bot., 64:753-768.
Renne et al., (2003). "The *Arabidopsis* mutant dct is deficient in the plastidic glutamate/malate translocator DiT2," Plant J., 35:316-331.
Rolland et al., (2016). "Redirecting the Cyanobacterial Bicarbonate Transporters BicA and SbtA to the Chloroplast Envelope: Soluble and Membrane Cargos Need Different Chloroplast Targeting Signals in Plants," Front. Plant Sci., 7:185, 19 pages.
Saiki et al., (1985). "Enzymatic amplification of beta-globin genomic sequences and restriction site analysis for diagnosis of sickle cell anemia," Science, 230(4732):1350-1354.
Sawada et al., (2009). "*Arabidopsis* bile acid:sodium symporter family protein 5 is involved in methionine-derived glucosinolate biosynthesis," Plant and Cell Physiol., 50:1579-1586.
Schmidt et al., (2010). "Stable internal reference genes for normalization of real-time RT-PCR in tobacco (*Nicotiana tabacum*) during development and abiotic stress," Mol. Genet. Genomics, 283:233-241.
Schneidereit et al., (2006). "Antisense repression reveals a crucial role of the plastidic 2-oxoglutarate/malate translocator DiT1 at the interface between carbon and nitrogen metabolism," Plant J., 45:206-224.
Schünmann et al., (2003). "A suite of novel promoters and terminators for plant biotechnology. II. The pPLEX series for use in monocots," Functional Plant Biology, 30(4):453-460.
Servaites et al., (1977). "Chemical Inhibition of the Glycolate Pathway in Soybean Leaf Cells," Plant Physiology, 60(4):461-466.
Sharkey, (1988). "Estimating the rate of photorespiration in leaves," Physiologia Plantarum, 73:147-152.
Shimamoto et al., (1989). "Fertile transgenic rice plants regenerated from transformed protoplasts," Nature, 338(6212):274-276.
Somerville et al., (1980). "Photorespiration mutants of *Arabidopsis thaliana* deficient in serine-glyoxylate aminotransferase activity," PNAS USA, 77(5): 2684-2687.
South et al., (2010). "A conserved interaction between the SDI domain of Bre2 and the Dpy-30 domain of Sdc1 is required for histone methylation and gene expression," J. Biol. Chem., 285:595-607.
South et al., (2013). "H3K4 methyltransferase Set1 is involved in maintenance of ergosterol homeostasis and resistance to Brefeldin A," PNAS USA, 110:E1016-E1025.
South et al., (2017). "Bile Acid Sodium Symporter BASS6 Can Transport Glycolate and Is Involved in Photorespiratory Metabolism in *Arabidopsis thaliana*," Plant Cell, 29:808-823.
Sun et al., (2009). "PPDB, the Plant Proteomics Database at Cornell," Nucleic Acids Res., 37:D969-D974.
Takahashi et al., (2007). "Impairment of the photorespiratory pathway accelerates photoinhibition of photosystem II by suppression of repair but not acceleration of damage processes in *Arabidopsis*," Plant Physiol., 144:487-494.
Timm et al., (2013). "The variety of photorespiratory phenotypes— employing the current status for future research directions on photorespiration," Plant Physiol., 15:737-747.
Velten et al., (1984). "Isolation of a dual plant promoter fragment from the Ti plasmid of Agrobacterium tumefaciens," The EMBO Journal, 3(12):2723-2730.
Velten et al., (1985). "Selection-expression plasmid vectors for use in genetic transformation of higher plants," Nucleic Acids Res, 13(19):6981-6998.
Verdaguer et al., (1998). "Functional organization of the cassava vein mosaic virus (CsVMV) promoter," Plant Molecular Biology, 37(6):1055-1067.
Walker et al., (2016). "An improved approach for measuring the impact of multiple CO2 conductances on the apparent photorespiratory CO2 compensation point through slope-intercept regression," Plant Cell Environ., 39:1198-1203.
Walker et al., (2016). "The Costs of Photorespiration to Food Production Now and in the Future," Ann. Rev. Plant Biol., 67:107-129.
Wang et al., (1998). "Improved Vectors For Agrobacterium Tumefaciens-Mediated Transformation Of Monocot Plants," Acta Hort., 461:401-407.
Weising et al., (1988). "Foreign genes in plants: transfer, structure, expression, and applications," Annual Review of Genetics, 22(1):421-477.

(56) References Cited

OTHER PUBLICATIONS

Werner et al., (2012). "Fast track assembly of multigene constructs using Golden Gate cloning and the MoClo system," Bioeng Bugs, 3:38-43.

Wingler et al., (2000). "Photorespiration: metabolic pathways and their role in stress protection," Philosoph. Trans. Royal Soc. B-Biol. Sci., 355:1517-1529.

Woo et al., (1987). "A Two-Translocator Model for the Transport of 2-Oxoglutarate and Glutamate in Chloroplasts during Ammonia Assimilation in the Light," Plant Physiol., 84:624-632.

Yang et al., (2012). "A chloroplast envelope membrane protein containing a putative LrgB domain related to the control of bacterial death and lysis is required for chloroplast development in *Arabidopsis thaliana*," New Phytol., 193:81-95.

Young et al., (1993). "Assay of Proton-Coupled Glycolate and D-Glycerate Transport into Chloroplast Inner Envelope Membrane Vesicles by Stopped-Flow Fluorescence," Plant Physiol., 101:793-799.

Zhang et al., (1991). "Analysis of rice Act1 5' region activity in transgenic rice plants," The Plant Cell, 3(11):1155-1165.

Zhang et al., (1996). "Induction of a Pea Cell-Wall Invertase Gene by Wounding and Its Localized Expression in Phloem," Plant Physiol, 112:1111-1117.

Zhu et al., (2010). "Improving Photosynthetic Efficiency for Greater Yield," Ann. Rev. Plant Biol., 61:235-261.

Keller et al., (2012). "Poster: Application of Tobacco Rattle Virus-Based Virus-Induced Gene Silencing (VIGS) to Characterize Photorespiratory Transporters," University of Illinois, 1 page.

South et al., (2024). "Poster: Putative Chloroplast Inner Membrane Protein BASS6 is Involved in Photorespiratory Metabolism," University of Illinois, 1 page.

Timm et al., (2012). "High-to-low CO2 acclimation reveals plasticity of the photorespiratory pathway and indicates regulatory links to cellular metabolism of *Arabidopsis*," PLoS One, 7(8):e42809, 15 pages.

Chothia et al., (1986). "The relation between the divergence of sequence and structure in proteins," Embo J, 5(4):823-6.

Fanning et al., (2006)."Gene-expressed RNA as a therapeutic: issues to consider, using ribozymes and small hairpin RNA as specific examples," Handb Exp Pharmacol, 2006:(173):289-303.

Rinaldi et al., (2018). "Antisense oligonucleotides: the next frontier for treatment of neurological disorders," Nat Rev Neurol, 14(1):9-21, 32 pages.

Schulz et al., (1979). "Chapter 1.5: Empirical Similarities Between Amino Acid," Principles of Protein Structure, pp. 14-16.

South et al., (2019). "Synthetic glycolate metabolism pathways stimulate crop growth and productivity in the field," Science, 363(6422):45, 10 pages.

Xin et al., (2015). "The Benefits of Photorespiratory Bypasses: How Can They Work?" Plant Physiology, 167(2)574-585.

* cited by examiner

PLANTS WITH INCREASED PHOTORESPIRATION EFFICIENCY

CROSS-REFERENCE

This present application claims priority under 35 U.S.C. § 119(e) to U.S. Provisional Ser. No. 62/467,993, which was filed on Mar. 7, 2017, and is hereby incorporated by reference.

BACKGROUND OF THE INVENTION

Field of Invention

The present disclosure provides plants with altered photorespiratory characteristics. Disruption of transport proteins involved in shuttling glycolate and/or glycerate results in reductions in photosynthetic rates, reduced plant growth and alterations in gene expression and photosynthetic metabolite profiles. Such disruptions, when combined with introduced genes expressing components of alternate photorespiratory enzyme pathways, increase photosynthetic efficiency.

Background

Ribulose-1,5-bisphosphate carboxylase/oxygenase (RubisCO) catalyzes the fixation of ribulose-1,5-bisphosphate (RuBP) with $CO_2$ generating two molecules of 3-phosphoglycerate (3-PGA). However, at 25° C. and current $CO_2$ levels about 25% of RubisCO catalytic activity in plants with C3 photosynthetic metabolism is the fixation of the competing substrate oxygen instead of carbon dioxide, resulting in the conversion of RuBP to one molecule of 3-PGA and one molecule of 2-phosphoglycolate (2-PG) (Bowes et al., Biochem Bioph. Res. Co (1971) 45:716-22; Ogren and Bowes, Nature—New Biol. (1971) 230:159-60; Lorimer, G. H., Ann. Rev. Plant Physiol. Plant Mol. Biol. (1981) 32:349-83; Ogren, W. L., Ann. Rev. Plant Physiol. Plant Mol. Biol. (1984) 35:415-42; Sharkey, T. D., Physiologia Plantarum (1988) 73:147-52). 2-PG accumulation in the chloroplast stroma can inhibit triose phosphate isomerase and phosphofructokinase thereby decreasing RuBP regeneration capacity (Anderson, L. E., Biochim Biophys Acta (1971) 235:237-44; Kelly and Latzko, Febs Lett (1976) 68:55-58). Although 2-PG is rapidly dephosphorylated by 2-phosphoglycolate phosphatase, the glycolate produced can also inhibit the rate of photosynthesis in the chloroplast and is considered toxic to the cell (Kelly and Latzko, supra; Gonzalez Moro et al., J. Plant Physiol. (1997) 150:388-94). The inhibition of photosynthesis by 2-PG/glycolate is prevented and partial recovery of the reduced carbon is accomplished through the C2 photorespiratory pathway involving steps in the chloroplast, peroxisome, mitochondria and the cytosol (Somerville and Ogren, Plant Physiol (1979) 63:152; Eisenhut et al., Plant Biol. (2013) 676-85). Photorespiration converts two molecules of 2-PG to one molecule of 3-PGA and releases one molecule of $CO_2$.

In addition, the photorespiratory cycle utilizes ATP and, as a byproduct of the conversion of *Glycine* to serine, produces ammonia ($NH_3$) in the mitochondria. Plants then recycle the $NH_3$ using reducing equivalents NAD(P)H. As a result, photorespiration under current atmospheric $CO_2$ concentrations results in a ~15 to 50% drag on seasonal C3 photosynthetic efficiency depending upon regional growing season temperature (Ogren, supra; Peterhansel et al., Photorespiration. The *Arabidopsis* Book (2010), 20130).

Losses in yield due to photorespiration add up to ~150 trillion calories per year in midwestern US soybean and wheat production alone (Walker et al., Ann. Rev. Plant Biol. (2016) 107-29), and has similar negative impacts on other major C3 crops such as rice and potato (Sharkey, T. D., supra, Zhu et al., Ann. Rev. Plant Biol. (2010) 61:235-61).

Photorespiration is essential for C3 plants but operates at the massive expense of fixed carbon dioxide and energy. Photorespiration is initiated when the initial enzyme of photosynthesis, ribulose-1,5-bisphosphate carboxylase/oxygenase (Rubisco), reacts with oxygen instead of carbon dioxide and produces the toxic compound glycolate that is then recycled by photorespiration. Photorespiration can be modeled at the canopy and regional scales to determine its cost under current and future atmospheres. A regional-scale model reveals that photorespiration currently decreases US soybean and wheat yields by 36% and 20%. Even modest improvements in this photorespiratory loss could be worth $100s million annually in the US alone making photorespiration a target process for improving crop yield (Annu. Rev. Plant Biol. 2016. 67:107-29). Advances in synthetic biology have enabled the introduction of several novel pathways into plant chloroplasts intending to short circuit the native pathway by introducing enzymes that metabolize glycolate in the chloroplast using less energy and shifting the location of photorespiratory $CO_2$ production from the mitochondria to the chloroplast thereby enabling rapid refixation by Rubisco (Kebeish et al., Nat Biotechnol (2007) 25:593-599; Maurino and Peterhansel, Curr Opin Plant Biol (2010) 13: 249-256).

The soluble enzymes involved in photorespiration have been well studied over the past four decades providing much information on the biochemistry and genetics governing photorespiratory metabolism (Peterhansel et al., supra; Timm and Bauwe, Plant Biol. (2013) 15:737-47). In contrast, only a small number of transporters have been demonstrated to be involved in photorespiration despite at least 25 proposed transport steps involved in the recycling of carbon in photorespiration (Eisenhut et al., supra). Importantly, photorespiration is a high flux pathway that interacts with multiple other metabolic pathways including the nitrogen cycle and amino acid biosynthesis (Fernie et al., Plant Biol. (2013) 15:748-53).

The first transporters identified to be involved in photorespiration were the chloroplastic dicarboxylate transporters DiT1 and DiT2 (Woo et al., Plant Physiol. (1987) 84:624-32). A single point mutation in DiT2.1 and subsequent biochemical characterization revealed that DiT2 is the glutamate/malate transporter located in the chloroplast inner envelope membrane (Renne et al., Plant J. (2003) 35:316-31). Antisense repression of DiT1 demonstrated the classical photorespiratory mutant phenotype of decreased growth under ambient $CO_2$ and complementation by elevated carbon dioxide concentration ($[CO_2]$) and resulted in reduced nitrate re-assimilation due to a decrease in 2-oxoglutarate transport in the chloroplast (Schneidereit et al., Plant J. (2006) 45:206-24). Together, DiT1 and DiT2 are necessary for the proper refixation of released ammonia from the *Glycine* decarboxylation reaction in photorespiratory metabolism.

More recently, co-expression analysis was used to identify other potential transporters involved in photorespiration (Bordych et al., Plant Biol. (2013) 15:686-93). Co-expression analysis identified A BOUT DE SOUFFLE (BOU) a mitochondrial transporter required for normal *Glycine* decarboxylase (GDC) activity and meristematic growth in which null mutants exhibit the photorespiratory mutant phenotype of complementation by elevated $[CO_2]$ (Eisenhut et al., Plant J. (2013) 73:836-49). Currently, the only photorespiratory pathway transporter that transports carbon derived directly from glycolate that has been identified is the plastidic glycolate/glycerate translocator protein, PLGG1. Plgg1 is co-expressed with many enzymes involved in photorespiration (Pick et al., Proc. Nat'l Acad. Sci. USA (2013) 110:3185-90). A Plgg1 T-DNA knockout line in *Arabidopsis thaliana* (plgg1-1) reveals the role of PLGG1 in the first and final transport steps in the photorespiratory pathway, viz, the export of glycolate from and import glycerate into the chloroplast (Pick et al., supra). Nearly 30 years prior to the molecular identification of PLGG1, the export of glycolate coincident with the import of glycerate import had been demonstrated in purified spinach chloroplasts (Howitz and McCarty, Biochem. (1985) 24:3645-50; Howitz and McCarty, Plant Physiol. (1986) 80:390-95; Howitz and McCarty, Plant Physiol. (1991) 96:1060-69; Young and McCarty, Plant Physiol. (1993) 101:793-99). Additionally, PLGG1 was identified as a chloroplast protein in proteomic studies and was originally thought to be involved in programmed cell death, though current evidence suggests the phenotype was linked to accumulation of photorespiratory intermediates (Yang et al., New Phytol. (2012) 193:81-95; Pick et al., supra). However, it was shown that the *Arabidopsis* plgg1-1 line showed no differences in the quantum efficiency of $CO_2$ assimilation, or changes in the photorespiratory $CO_2$ compensation point compared to wild type when measured under low light conditions (Walker et al., Photosyn Res. (2016) 129:93-103). Combined, these data show that PLGG1 protein is involved in photorespiratory metabolism but also suggest an additional pathway for glycolate to exit the chloroplast, as well as demonstrate the difficulty in phenotypically identifying transporters in the photorespiration pathway (Hodges et al., J. Exp. Bot. (2016) 3015-26).

Although both genetic and co-expression approaches have been successful in identifying genes involved in photorespiratory metabolism, many of the transporters involved in the flux of photorespiratory intermediates remain unknown. An alternative approach to co-expression analysis is to identify candidate chloroplast inner membrane transporters from chloroplast envelope proteomic studies and screen tDNA insertional mutants of the candidate genes for a photorespiratory mutant phenotype using chlorophyll fluorescence (Badger et al., Funct. Plant Biol. (2009) 36:867-73; Sun et al., Nucleic Acids Res., (2009) 37:D969-D974). Photorespiration deficient mutants exhibit a reduction in Fv/Fm chlorophyll fluorescence due to impaired function of photosystem II (PSII) when exposed to illumination under low $CO_2$ levels (Kozaki and Takeba, Nature (1996) 384: 557-60; Wingler et al., Philosoph. Trans. Royal Soc. B-Biol. Sci. (2000) 355:1517-29; Takahashi et al., Plant Physiol. (2007) 144:487-94).

Using this high throughput fluorescence-based approach in combination with forward genetics targeting putative transporter-like chloroplast inner envelope membrane proteins has the potential to identify additional genes important for photorespiratory metabolite transport. Bile acid sodium symporters are a family of transport proteins which were first identified as bile acid transporters in the mammalian liver. Further analysis showed that the BASS family of transporters exhibit a broad range of substrate specificity including non-bile acid organic compounds such as pyruvate, steroids, and xenobiotics (Furumoto et al., Nature (2011) 476:472-75; Claro da Silva et al., Mol. Aspects of Med. (2013) 34:252-69). Although bile acids are not produced in plants, BASS family genes are present in both monocots and dicots (Gigolashvili et al., The Plant Cell (2009) 21:1813-29; Sawada et al., Plant and Cell Physiol. (2009) 50:1579-86; Furumoto et al., supra).

As detailed herein, the Bile Acid Sodium Symporter 6 protein (BASS6) as a glycolate transporter involved in photorespiration has been identified. Analysis of bass6 knockout T-DNA lines in *Arabidopsis* (bass6-1 and bass6-2) revealed that loss of Bass6 resulted in a photorespiratory mutant phenotype and accumulation of photorespiratory metabolic intermediates *Glycine* and glycolate. In addition, BASS6 protein localized to the chloroplast envelope and the capacity of BASS6 to transport glycolate was demonstrated through combined yeast complementation and transport analysis. A bass6-plgg1 double mutant showed additive growth defects.

Our discovery has revealed that photorespiratory short circuits or bypass pathways have been only modestly effective due to the rapid export of glycolate out of the chloroplast via the two glycolate transporters located in the chloroplast envelope membrane. PLGG1 (Proc Natl Acad Sci USA (2013) 110(8):3185-90) is a plastidial glycolate glycerate translocator that exchanges glycolate for glycerate across the chloroplast envelope membrane. While PLGG1 is wholly responsible for glycerate import, BASS6 and PLGG1 share glycolate export from the chloroplast. Thus the combined activity of BASS6 and PLGG1 compete with the synthetic photorespiratory bypass pathway for glycolate thereby limiting the effectiveness of the bypass in improving photosynthetic efficiency and plant growth/yield.

Toxic byproducts of RuBisCO oxygenation reaction and *Glycine* conversion in photorespiration (glycolate and ammonia respectively) are re-fixed and converted into usable products at a high-energy demand and a net loss of fixed carbon, among three organelles: the chloroplast, the peroxisome, and the mitochondria (Bauwe et al, Trends Plant Sci. (2010) 15:330-6). Some photosynthetic algae, bacteria, and plants have evolved ways to reduce the stress of photorespiration via carbon concentrating mechanisms (CCM) and C4 photosynthesis (Price et al, J. Exp. Bot. (2013) 64:753-68). As an alternative, bypassing photorespiration using alternative metabolic pathways could reduce the energy demand and re-capture the carbon lost in the process more efficiently (Betti et al., J. Exp. Bot. (2016) 67:2977-88). Three different photorespiration bypasses have been demonstrated in plants such as *Arabidopsis*, *Camelina sativa*, and potato (Dalal et al, Biotechnol. Biofuels (2015) 8; Kebeish et al, Nat. Biotechnol. (2007) 593-9; Maier et al, Front. Plant Sci. (2012) 3:12; Nolke et al, Plant Biotechnol. J. (2014) 12:734-42). Although these bypasses, including some modifications, showed improvements in plant productivity, there has been no demonstration of their effectiveness under agricultural condition and no current attempt to fully optimize a bypass to photorespiration for a farmer's field.

To address these concerns, presented herein are plants, and methods for producing them, that lack chloroplast glycolate export capability as well as those containing one or more alternate photorespiratory bypass pathway(s) to increase photosynthetic efficiency. A combination of the two approaches results in additional efficiency.

SUMMARY OF THE INVENTION

Provided herein are genetically altered plants, containing one or more genetic alterations resulting in the loss or reduction of the ability of the plant to transport glycolate from at least a portion of the chloroplasts and resulting in the gain of the ability to convert glycolate to energy within at least a portion of the chloroplasts of the plant. In one embodiment, the loss of chloroplast glycolate transport ability results from lack of production of a functional protein with at least 70% identity to SEQ ID NO:6. In other embodiments, the loss of chloroplast glycolate transport ability comprises inducing RNA interference by the expression of an RNA molecule at least 95% identical to SEQ ID NO: 46. In still other embodiments, the gain of the ability to convert glycolate to energy within the chloroplasts comprises the production of a transgenic malate synthase and a transgenic glycolate dehydrogenase in the chloroplasts. In specific embodiments, the malate synthase is at least 95% identical to amino acid residues 41-607 of SEQ ID NO: 43 and the glycolate dehydrogenase is at least 95% identical to amino acid residues of 41-1136 of SEQ ID NO: 45. In a particular embodiment, the malate synthase comprises SEQ ID NO: 43 and the glycolate dehydrogenase comprises SEQ ID NO: 45. In a another specific embodiment, the loss of chloroplast glycolate transport ability comprises lack of production of a protein with at least 95% identity to SEQ ID NO:3 and lack of production of a protein with at least 95% identity to SEQ ID NO:6; and wherein the gain of the ability to convert glycolate to energy within the chloroplasts comprises the production of a protein with at least 95% identity to SEQ ID NO:43 and the production of a protein with at least 95% identity to SEQ ID NO:45. The genetically altered plant can be any C3 plant. For example, in some embodiments, plants of the present disclosure are rice, soybean, potato, cowpea, barley, wheat, or cassava.

Disclosed herein is also a method of producing a plant with increased growth or productivity, by: a) introducing a genetic alteration to the plant comprising a loss of the ability to transport glycolate from at least a portion of the chloroplasts of the plant; and b) introducing a genetic alteration to the plant comprising a gain of the ability to convert glycolate to energy within the chloroplasts, thereby increasing growth or productivity of the plant. In some embodiments, the loss of the ability to transport glycolate from at least a portion of the chloroplasts of the plant comprises the lack of production of a functional protein with at least 95% identity to SEQ ID NO:3, the lack of production of a functional protein with at least 95% identity to SEQ ID NO:6, or both. In still additional embodiments, the gain of the ability to convert glycolate to energy within the chloroplasts comprises the production of a transgenic malate synthase and a transgenic glycolate dehydrogenase in the chloroplasts. In some embodiments, the malate synthase is at least 95% identical to amino acid residues 41-607 of SEQ ID NO: 43 and the glycolate dehydrogenase is at least 95% identical to amino acid residues of 41-1136 of SEQ ID NO: 45. In specific embodiments, the malate synthase comprises SEQ ID NO: 43 and the glycolate dehydrogenase comprises SEQ ID NO: 45. According to a particular embodiment, the loss of chloroplast glycolate transport ability comprises lack of production of a protein with at least 95% identity to SEQ ID NO:3; lack of production of a protein with at least 95% identity to SEQ ID NO:6, or both; and wherein the gain of the ability to convert glycolate to energy within the chloroplasts comprises the production of a protein with at least 95% identity to SEQ ID NO:43 and the production of a protein with at least 95% identity to SEQ ID NO:45. Any C3 plant may be used with the methods of the present disclosure. In some embodiments, the plant is rice, soybean, potato, cowpea, barley, wheat, or cassava.

An additional embodiment provided herein is a genetically altered plant, comprising a first heterologous polynucleotide encoding a malate synthase and a second heterologous polynucleotide encoding a glycolate dehydrogenase, wherein the malate synthase and the glycolate dehydrogenase localize to a chloroplast of the plant. In preferred embodiments, the plant converts glycolate to energy within the chloroplast of the plant. In some embodiments, the malate synthase is from any source provided herein, including *Cucurbita maxima*. In particular embodiments, the malate synthase is at least 95% identical to amino acid residues 41-607 of SEQ ID NO: 43. In further embodiments, any of these plants expresses a glycolate dehydrogenase from an organism selected from any source provided herein, including *Chlamydomonas reinhardtii*. In specific embodiments, the glycolate dehydrogenase is at least 95% identical to amino acid residues 41-1136 of SEQ ID NO: 45. In a particular embodiment, the first heterologous polynucleotide encodes the amino acid sequence of SEQ ID NO: 43 and the second heterologous polynucleotide encodes the amino acid sequence of SEQ ID NO: 45. In some embodiments, the plant further comprises a reduced level, a reduced activity, a partial loss of activity, or a complete loss of activity of one or more endogenous glycolate transport proteins in a chloroplast of the plant. In some embodiments, the plant has a reduction or loss of glycolate transport from a chloroplast of the plant. In specific embodiments, the one or more glycolate transport proteins include PLGG1 and BASS6. In further embodiments, the one or more glycolate transport proteins have at least 70% sequence identity, at least 75% sequence identity, at least 80% sequence identity, at least 85% sequence identity, at least 90% sequence identity or at least 95% sequence identity to SEQ ID NO:6. In still further embodiments, at least one of the one or more glycolate transport proteins had at least 70% sequence identity, at least 75% sequence identity, at least 80% sequence identity, at least 85% sequence identity, or at least 90% sequence identity to SEQ ID NO:3. In other embodiments, at least one of the one or more glycolate transport protein had at least 95% sequence identity to SEQ ID NO:3. In some embodiments, the plant comprises a mutation in a DNA molecule encoding the glycolate transport protein. In additional embodiments, the plant comprises a heterologous polynucleotide encoding an RNA molecule that inhibits expression of the glycolate transport protein, such as one that is at least 95% identical to SEQ ID NO: 46. In further embodiments the reduced level, the reduced activity, the partial loss of activity, or the complete loss of activity of at least one of the one or more glycolate transport proteins was generated using a technology selected from the group consisting of CRISPR/Cas, TALEN, Zn-finger nuclease, and RNAi.

Another aspect of the present disclosure is a genetically altered plant, wherein the plant comprises a first heterologous polynucleotide encoding a first polypeptide having at least 95% identity to SEQ ID NO:43 and a second heterologous polynucleotide encoding a second polypeptide having at least 95% identity to SEQ ID NO:45, wherein the first polypeptide and the second polypeptide localize to a chloroplast of the plant. In additional embodiments, the plant further comprises a reduced level of or a reduced activity of a third polypeptide having at least 95% identity to SEQ ID NO:3 and a reduced level of or a reduced activity of a fourth polypeptide having at least 95% identity to SEQ ID NO:6. Exemplary plants include rice, soybean, potato, cowpea, barley, wheat, and cassava.

An additional aspect of the present disclosure provides a method of producing a plant with increased growth or productivity, comprising introducing a first heterologous polynucleotide encoding a malate synthase and a second heterologous polynucleotide encoding a glycolate dehydrogenase to the plant, wherein the malate synthase and the glycolate dehydrogenase localize to a chloroplast of the plant, wherein the plant has an increased ability to convert glycolate to energy within the chloroplast, thereby increasing growth or productivity of the plant. In some embodiments, this method also has a step of introducing a genetic alteration to the plant, wherein the plant has a reduced ability to transport glycolate from at least a portion of the chloroplasts of the plant. In additional embodiments, the malate synthase is from an organism provided herein, including *Cucurbita maxima*. In particular embodiments, the malate synthase is at least 95% identical to amino acid residues 41-607 of SEQ ID NO: 43. In further embodiments, the glycolate dehydrogenase is from an organism provided herein, including *Chlamydomonas reinhardtii*. In particular embodiments, the glycolate dehydrogenase is at least 95% identical to amino acid residues 41-1136 of SEQ ID NO: 45. In a specific embodiment, the malate synthase comprises the amino acid sequence of SEQ ID NO: 43 and the glycolate dehydrogenase comprises the amino acid sequence of SEQ ID NO: 45. In some embodiments, the step of introducing a genetic alteration to the plant that causes a reduced level, a reduced activity, a partial loss of activity, or a complete loss of activity of one or more endogenous glycolate transport proteins in a chloroplast of the plant. In some embodiments of this methodology, the reduced level, the reduced activity, the partial loss of activity, or the complete loss of activity of at least one of the one or more endogenous glycolate transport proteins comprises introducing a mutation into an endogenous DNA molecule that encoded the endogenous glycolate transport protein. In additional embodiments, the reduced level, the reduced activity, the partial loss of activity, or the complete loss of activity of at least one of the one or more endogenous glycolate transport proteins comprises introducing a heterologous polynucleotide encoding an RNA molecule that inhibits expression of the endogenous glycolate transport protein, such as where the RNA molecule is at least 95% identical to SEQ ID NO: 46. In particular embodiments, at least one of the one or more endogenous glycolate transport proteins is PLGG1 or BASS6. In some embodiments, at least one of the one or more endogenous glycolate transport protein has at least 70% sequence identity, at least 75% sequence identity, at least 80% sequence identity, at least 85% sequence identity, or at least 90% sequence identity to SEQ ID NO:6. In specific embodiments, at least one of the one or more endogenous glycolate transport protein has at least 95% sequence identity to SEQ ID NO:6. In other embodiments, at least one of the one or more endogenous glycolate transport protein has at least 70% sequence identity, at least 75% sequence identity, at least 80% sequence identity, at least 85% sequence identity, or at least 90% sequence identity to SEQ ID NO:3. In specific embodiments, at least one of the one or more endogenous glycolate transport protein has at least 95% sequence identity to SEQ ID NO:3. In particular embodiments, the one or more endogenous glycolate transport protein is a first glycolate transport protein having at least 95% identity to SEQ ID NO:6 and a second glycolate transport protein having at least 95% identity to SEQ ID NO: 3. In particular embodiments, the plant is rice, soybean, potato, cowpea, barley, wheat, or cassava.

INCORPORATION BY REFERENCE

All publications, patents and patent applications mentioned in this specification are herein incorporated by reference to the same extent as if each individual publication, patent or patent application was specifically and individually indicated to be incorporated by reference.

BRIEF DESCRIPTION OF THE DRAWINGS

The patent application file contains at least one drawing executed in color. Copies of this patent or patent application publication with color drawing(s) will be provided by the Office upon request and payment of the necessary fee.

The novel features of the disclosure are set forth with particularity in the claims. Features and advantages of the present disclosure are referred to in the following detailed description, and the accompanying drawings of which:

In FIG. 4A, error bars indicate standard deviation and asterisk (*) indicates significant difference between $CO_2$ treatments. Double asterisk (**) indicates significant change in growth rate between T-DNA lines and WT. Statistical difference based on Student's T-test p<0.05.

FIG. 6A provides photographs showing representative wild-type, bass6, plgg1, and double mutant bass6, plgg1 growth and Fv/Fm changes in chlorophyll fluorescence. The photographs represent indicated plants grown for 4 weeks at 2000 ppm $CO_2$ then shifted to ambient $CO_2$ for 5 days. Fv/Fm images show changes in chlorophyll fluorescence due to the formation of chlorotic lesions on leaves. Images are representative of 5 repeats. FIG. 6B provides a graph showing the extent of chlorotic lesion formation in these plants. Area in $cm^2$ of leaf lesion size based on pixel density measured using photo software (Adobe).

FIG. 8A is a graph showing relative growth rates of indicated *Arabidopsis* T-DNA lines and either 2000 ppm (dark) or 400 ppm $CO_2$ (light) grey bars. Error bars indicate standard deviation of at least 5 plants per 3 biological replicates. Asterisk (*) indicates significant difference between $CO_2$ treatments. Double asterisk (**) indicates significant change in growth rate between T-DNA lines and WT. Statistical difference based on Student's T-test p<0.05. FIG. 8B is a graph of photosynthetic measurements recorded at indicated $CO_2$ concentration and saturating light (1000 µmol·m-2·s-1) for the indicated strains. Letters represent significant difference from ANOVA analysis and Tukey's post-hoc test. Error bars indicate standard deviation.

FIG. 15A provides representative photos of 9 day old transgenic tobacco lines during fluorescence-based screening for improved photorespiration bypass by changes in Fv'/Fm' after 24 hours of low $CO_2$ and constant illumination. FIG. 15B provides combined values of the three bypass construct designs with and without RNAi targeting the glycolate/glycerate transporter PLGG1. Error bars indicate SEM. * indicates statistical difference compared to WT based on one-way ANOVA P≤0.05.

FIG. 16A. qRT-PCR analysis of the two transgenes in Bypass 3 and the target gene PLGG1 of the RNAi construct. FIG. 16B. Western blot analysis using custom antibodies raised against the indicated target genes. 3 µg load of protein per lane except for the RbcS control (1.5 µg). Arrows (▶) indicate detected protein based on molecular weight. Error bars indicate SEM. * indicates statistical difference compared to WT based on one-way ANOVA P≤0.05.

FIG. 17A qRT-PCR analysis of the indicated transgenes and the native PLGG1 targeted for RNAi of bypass 1. Glycolate dehydrogenase subunits D, E, F (GDH), Tartonic acid semi-aldehyde reductase (TSR), Glyoxylate carboligase (GCL), Plastidic glycolate/glycerate transporter (PLGG1). FIG. 17B qRT-PCR analysis of the indicated transgenes and the native PLGG1 targeted for RNAi of bypass 2. Glycolate oxidase (GO), Catalase (CAT), Malate synthase (MS). Error bars indicated SEM.

FIG. 18A Stem height analysis based on measurements recorded 7 weeks post germination. Error bars indicated SD and * indicated significance based on one-way ANOVA N=8. FIG. 18B. Percent difference in combined stem, leaf, and total dry weight biomass compared to WT control with and without the PLGG1 RNAi module. Error bars indicate SEM, * indicated significance based on one-way ANOVA N=8.

FIG. 19A. Combined apparent quantum efficiency of photosynthesis (Φa) of bypass 1 determined by linear regression of assimilation based on available light response curves and saturating rates of assimilation of $CO_2$ at the indicated [$CO_2$]. FIG. 19B. Combined apparent quantum efficiency of photosynthesis (Φa) of bypass 2 determined by linear regression of assimilation based on available light response curves and saturating rates of assimilation of $CO_2$ at the indicated [$CO_2$]. FIG. 19C. Combined apparent quantum efficiency of photosynthesis (Φa) of Bypass 3 determined by linear regression of assimilation based on available light response curves and saturating rates of assimilation of $CO_2$ at the indicated [$CO_2$]. Error bars indicated SEM and * indicate significance based on one-way ANOVA P≤0.05.

FIG. 20A. Combined maximum rate of Rubisco carboxylation (Vcmax). FIG. 20B. Combined maximum rate of electron transport (Jmax). Maximum rates of carboxylation and electron transport are modelled from photosynthetic response under changing $CO_2$ concentration using the PS-Fit model. FIG. 20C. Combined apparent $CO_2$ compensation point: gamma star ($\Gamma^*$) calculated using the common intercept method and slope regression. FIG. 20D. $CO_2$ assimilation based on internal $[CO_2]$ (Ci). Error bars indicate SEM. * indicates statistical difference compared to WT based on one-way ANOVA P values are indicated.

FIG. 21A. Percent difference in combined leaf (left bar), stem (middle bar), and total (right bar) biomass compared to WT control for Bypass 3 with and without the PLGG1 RNAi module. Letter indicates statistical differences based on two-way ANOVA P≤0.05. FIG. 21B. Total combined accumulated leaf starch for indicated lines. FIG. 21C. Combined apparent quantum efficiency of photosynthesis ($\Phi a$) determined by linear regression of assimilation based on available light response curves. FIG. 21D. Combined accumulated assimilation of CO2 (A') based on diurnal analysis of photosynthesis. FIG. 21E. Combined accumulated electron used in electron transport determined from assimilation based on diurnal photosynthesis. Error bars indicate SD and P values are indicated based on ANOVA analysis.

DETAILED DESCRIPTION OF THE INVENTION

Figure 1:
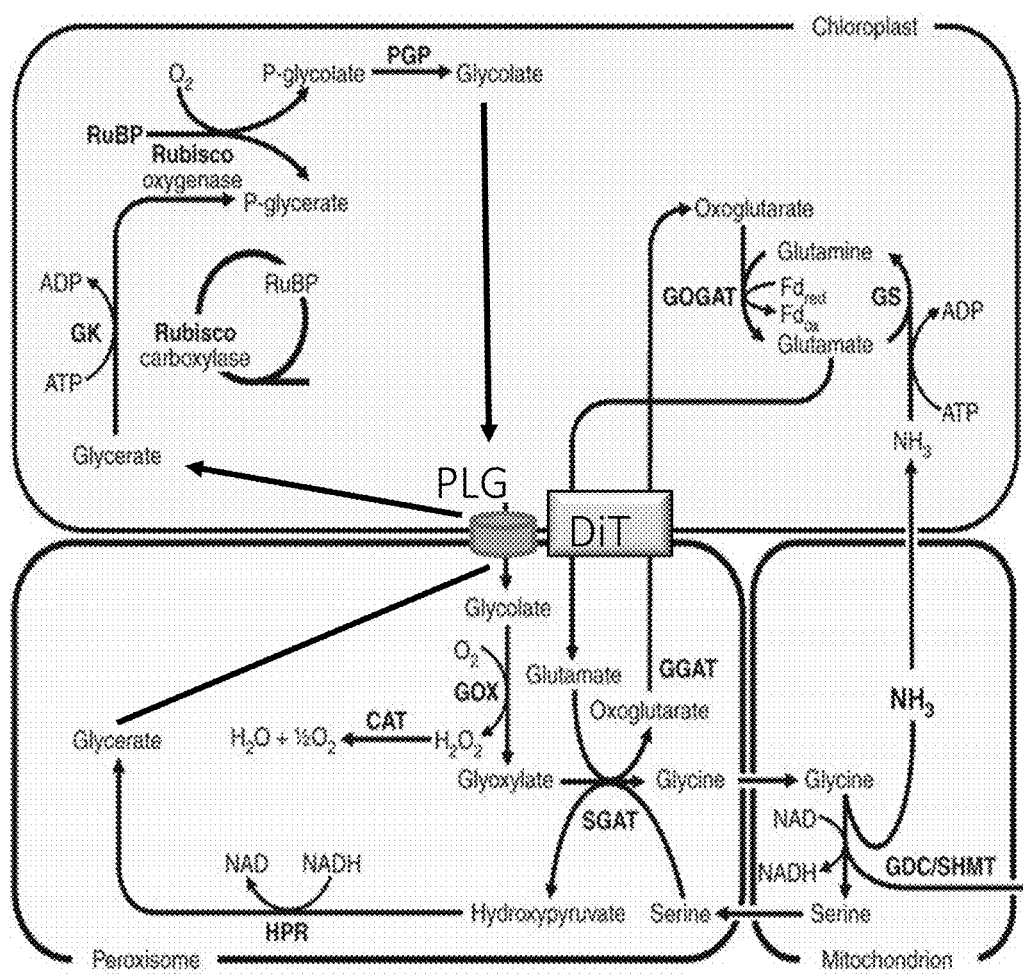
FIG. 1 provides a depiction of the photorespiratory C2 cycle.

Photorespiration is an energy intensive process that recycles the toxic metabolite 2-phosphoglycolate, a product of RubisCO oxygenation reactions. The photorespiratory pathway is highly compartmentalized involving the chloroplast, peroxisome, cytosol and mitochondria (FIG. 1). Though the soluble enzymes involved in photorespiration are well characterized very few membrane transporters involved in photorespiration have been identified to date. Under photorespiratory conditions *Arabidopsis* T-DNA insertions targeting the Bile Acid Sodium Symporter Bass6 inhibited photosynthesis and resulted in an ambient air slow growth phenotype that was rescued at elevated $CO_2$. In addition, metabolite analysis and genetic complementation of glycolate transport in yeast showed that BASS6 was capable of glycolate transport consistent with its involvement in the photorespiratory export of glycolate from *Arabidopsis* chloroplasts. A double knockout *Arabidopsis* line including Bass6 and the glycolate/glycerate transporter Plgg1 (bass6-1-plgg1-1) resulted in an additive growth defect, an increase in glycolate accumulation, and reductions in photosynthetic rates compared to either single mutation alone. The data indicate that BASS6 is a chloroplast inner envelope membrane localized transporter of glycolate and exogenous expression of Bass6 can complement the photorespiration mutant phenotype. Knowing the transporters that are responsible for glycolate export from the chloroplasts of C3 plants is critical information in designing strategies to introduce a more energetically efficient photorespiratory pathway thereby improving photosynthetic efficiency.

Figure 14:
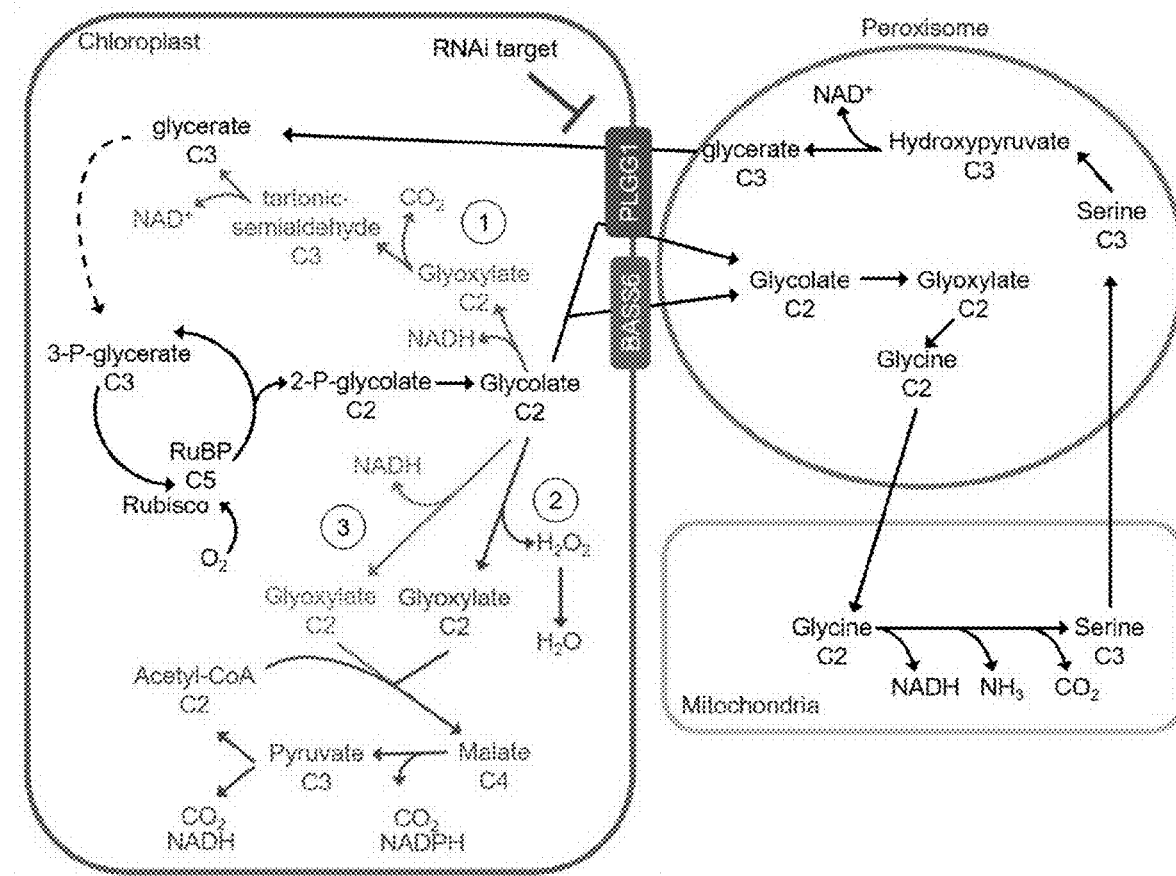
FIG. 14 Synthetic biology approach to photorespiration bypass. Model of three photorespiration bypass designs. Bypass 1 (orange) converts glycolate to glycerate using five genes from the *E. coli* glycolate pathway 3 genes DEF glycolate dehydrogenase, glyoxylate carboligase, and tartronic semialdehyde reductase. Bypass 2 (red/purple) utilizes three genes, glycolate oxidase, malate synthase, and catalase to remove hydrogen peroxide generated by glycolate oxidase. Bypass 3 (blue/purple) uses 2 genes. *Chlamydomonas reinhardtii* glycolate dehydrogenase and *Cucurbita maxima* malate synthase.

With multiple potential designs that can bypass photorespiration, computer modelling suggests that optimized expression of non-native genes and flux through the bypass pathway are needed to maximize the benefits to crop plants under field conditions. Additionally, reducing or shutting down the native photorespiratory pathway would further increase the benefits of expressing a photorespiratory bypass pathway in plants. We hypothesized that using a synthetic biology approach to generate a library of gene constructs expressing different photorespiratory bypass strategies, while reducing the transport of glycolate from the chloroplast, could provide insight into the benefits of photorespiration bypass and be used to design elite performing plant lines to increase crop productivity (FIG. 14).

Thus, presented herein are also plants containing a recombinant dsRNA (SEQ ID NO: 46) that leads to RNAi knockdown of PLGG1 protein production in combination with expression of bypass pathways. It is expected that either knockdown or knockout strains function similarly given the data showing similar results between such strains. In some embodiments, therefore, plants without a functional PLGG1 protein are combined with Bypass 3 proteins (malate synthase and glycolate dehydrogenase from *C. reinhardtii*) to produce plants with increased photosynthetic efficiency. Other embodiments provide plants expressing Bypass 3 proteins and lacking a functional BASS6 protein. Transgenic plants expressing Bypass 3 proteins and lacking both a functional BASS6 protein and a functional PLGG1 protein (via knockout or knockdown) are further contemplated herein.

Preferred embodiments of the present disclosure are shown and described herein. It will be obvious to those skilled in the art that such embodiments are provided by way of example only. Numerous variations, changes, and substitutions will occur to those skilled in the art without departing from the disclosure. Various alternatives to the embodiments of the disclosure described herein may be employed in practicing the disclosure. It is intended that the included claims define the scope of the disclosure and that methods and structures within the scope of these claims and their equivalents are covered thereby.

Technical and scientific terms used herein have the meanings commonly understood by one of ordinary skill in the art to which the instant disclosure pertains, unless otherwise defined. Reference is made herein to various materials and methodologies known to those of skill in the art. Standard reference works setting forth the general principles of recombinant DNA technology include Sambrook et al., "Molecular Cloning: A Laboratory Manual", 2d ed., Cold Spring Harbor Laboratory Press, Plainview, N.Y., 1989; Kaufman et al., eds., "Handbook of Molecular and Cellular Methods in Biology and Medicine", CRC Press, Boca Raton, 1995; and McPherson, ed., "Directed Mutagenesis: A Practical Approach", IRL Press, Oxford, 1991. Standard reference literature teaching general methodologies and principles of fungal genetics useful for selected aspects of the disclosure include: Sherman et al. "Laboratory Course Manual Methods in Yeast Genetics", Cold Spring Harbor Laboratory, Cold Spring Harbor, N.Y., 1986 and Guthrie et al., "Guide to Yeast Genetics and Molecular Biology", Academic, New York, 1991.

Any suitable materials and/or methods known to those of skill can be utilized in carrying out the instant disclosure.

Materials and/or methods for practicing the instant disclosure are described. Materials, reagents and the like to which reference is made in the following description and examples are obtainable from commercial sources, unless otherwise noted.

As used in the specification and claims, use of the singular "a", "an", and "the" include plural references unless the context clearly dictates otherwise.

The terms isolated, purified, or biologically pure as used herein, refer to material that is substantially or essentially free from components that normally accompany the referenced material in its native state.

The term "about" is defined as plus or minus ten percent of a recited value. For example, about 1.0 g means 0.9 g to 1.1 g and all values within that range, whether specifically stated or not.

The term "gene" refers to a DNA sequence involved in producing a RNA or polypeptide or precursor thereof. The polypeptide or RNA can be encoded by a full-length coding sequence or by intron-interrupted portions of the coding sequence, such as exon sequences.

The term "primer" refers to an oligonucleotide, which is capable of acting as a point of initiation of synthesis when placed under conditions in which primer extension is initiated. An oligonucleotide "primer" may occur naturally, as in a purified restriction digest or may be produced synthetically.

A primer is selected to be "substantially complementary" to a strand of specific sequence of the template. A primer must be sufficiently complementary to hybridize with a template strand for primer elongation to occur. A primer sequence need not reflect the exact sequence of the template. For example, a non-complementary nucleotide fragment may be attached to the 5' end of the primer, with the remainder of the primer sequence being substantially complementary to the strand. Non-complementary bases or longer sequences can be interspersed into the primer, provided that the primer sequence is sufficiently complementary with the sequence of the template to hybridize and thereby form a template primer complex for synthesis of the extension product of the primer.

For the purpose of this disclosure, the "sequence identity" of two related nucleotide or amino acid sequences, expressed as a percentage, refers to the number of positions in the two optimally aligned sequences which have identical residues (×100) divided by the number of positions compared. A gap, i.e., a position in an alignment where a residue is present in one sequence but not in the other is regarded as a position with non-identical residues. The alignment of the two sequences is performed by the Needleman and Wunsch algorithm (Needleman and Wunsch, J Mol Biol, (1970) 48:3, 443-53). A computer-assisted sequence alignment can be conveniently performed using a standard software program such as GAP which is part of the Wisconsin Package Version 10.1 (Genetics Computer Group, Madison, Wisconsin, USA) using the default scoring matrix with a gap creation penalty of 50 and a gap extension penalty of 3.

The terms "identical" or percent "identity", and grammatical variations thereof, in the context of two or more polynucleotides or polypeptide sequences, refer to two or more sequences or sub-sequences that are the same or have a specified percentage of nucleotides or amino acids (respectively) that are the same (e.g., 80%, 85% identity, 90% identity, 99%, or 100% identity), when compared and aligned for maximum correspondence over a designated region as measured using a sequence comparison algorithm or by manual alignment and visual inspection.

The phrase "high percent identical" or "high percent identity", and grammatical variations thereof in the context of two polynucleotides or polypeptides, refers to two or more sequences or sub-sequences that have at least about 80%, identity, at least about 81%, 82%, 83%, 84%, 85%, 86%, 87%, 88%, 89%, 90%, 91%, 92%, 93%, 94%, 95%, 96%, 97%, 98%, 99%, or 100% nucleotide or amino acid identity, when compared and aligned for maximum correspondence, as measured using a sequence comparison algorithm or by visual inspection. In an exemplary embodiment, a high percent identity exists over a region of the sequences that is at least about 16 nucleotides or amino acids in length. In another exemplary embodiment, a high percent identity exists over a region of the sequences that is at least about 50 nucleotides or amino acids in length. In still another exemplary embodiment, a high percent identity exists over a region of the sequences that is at least about 100 nucleotides or amino acids or more in length. In one exemplary embodiment, the sequences are high percent identical over the entire length of the polynucleotide or polypeptide sequences.

The term "BASS6", and capitalization and italicized versions thereof, refer to the plant gene and protein, as described herein. In some embodiments, this term may refer to the *A. thaliana* gene and protein, as described herein. In other embodiments, this term may refer to one or more homologs or orthologs of the gene and protein of any C3 plant. In some embodiments, this term may refer to one or more paralogs of the gene and protein of any C3 plant. In some embodiments, the C3 plant is rice, soybean, potato, cowpea, barley, wheat, or cassava. SEQ ID NO: 1 provides the genomic sequence of the *A. thaliana* BASS6 gene. SEQ ID NO:2 provides the cDNA sequence of the *A. thaliana* BASS6 gene. SEQ ID NO: 3 provides the *A. thaliana* Bass6 protein. When indicated with all lower-case letters in italics, the mutant (e.g., knockout) version of the gene/protein is intended. In *A. thaliana*, the mutant version may be a single gene/protein. In other C3 plants, the mutant version may be one, some, or all homologs, orthologs, and/or paralogs of the genes/proteins.

The term "PLGG1", and capitalization and italicized versions thereof, refer to the plant gene and protein, as described herein. In some embodiments, this term may refer to the *A. thaliana* gene and protein, as described herein. In other embodiments, this term may refer to one or more homologs or orthologs of the gene and protein of any C3 plant. In some embodiments, this term may refer to one or more paralogs of the gene and protein of any C3 plant. In some embodiments, the C3 plant is rice, soybean, potato, cowpea, barley, wheat, or cassava. SEQ ID NO: 4 provides the *A. thaliana* genomic sequence of the PLGG1 gene. SEQ ID NO:5 provides the cDNA sequence of the *A. thaliana* PLGG1 gene. SEQ ID NO: 6 provides the *A. thaliana* Plgg1 protein. When indicated with all lower-case letters in italics, the mutant (e.g., knockout) version of the gene/protein is intended. In *A. thaliana*, the mutant version may be a single gene/protein. In other C3 plants, the mutant version may be one, some, or all homologs, orthologs, and/or paralogs of the genes/proteins. SEQ ID NO: 46 provides a portion of the PLGG1 coding sequence utilized for RNAi knockdown via production of dsRNA in some transgenic plants of the present invention.

Unless otherwise specifically indicated, the term "CmMS" or "MS", refers to the *Cucurbita maxima* malate synthase gene and protein. SEQ ID NO: 43 provides the malate synthase protein (amino acid residues 41-607) fused with the rubisco small subunit signal peptide (amino acid residues 1-40). SEQ ID NO: 42 provides a DNA sequence encoding this protein with the signal peptide and used to produce the Bypass 3 plants described herein. Variants of these nucleic acid and protein sequences, such as DNA encoding proteins with 95% or higher identity to SEQ ID NO: 43 and proteins utilizing alternate signal peptide sequences, are included.

The term "CrGDH" or "GDH", refer to the *Chlamydomonas reinhardtii* glycolate dehydrogenase gene and protein. SEQ ID NO: 45 provides the malate synthase protein (amino acid residues 41-1136) fused with the rubisco small subunit signal peptide (amino acid residues 1-40). SEQ ID NO: 44 provides a DNA sequence encoding this protein with the signal peptide and used to produce the Bypass 3 plants described herein. Variants of these nucleic acid and protein sequences, such as DNA encoding proteins with 95% or higher identity to SEQ ID NO: 45 and proteins utilizing alternate signal peptide sequences, are included.

The term "Bypass" as used herein, refers to a transgenic enzyme pathway introduced into and expressed by a recombinant plant cell. Three Bypass pathways—1, 2, and 3—are shown in Table 1. These are further detailed in the Examples section below.

TABLE 1

Bypass 1, Bypass 2 and Bypass 3 enzymes

| | Plasmid-encoded enzymes | Source(s) | Transgenic genes expressed |
|---|---|---|---|
| Bypass Pathway 1 | Glycolate carboligase (Gcl), Tartonic Semialdehyde reductase (TSR), glycolate dehydrogenase subunits D, E, and F (GdD, GdE, GdF) | *E. coli* | Exemplary genes: KU512948.1, WP_001415790.1, KU512945.1, KU512946.1, KU512947.1 |
| Bypass Pathway 2 | Glycolate Oxidase (GO), Malate Synthase (CmMS), and Catalase HPII (CAT) | *A. thaliana* (GOX1), *Cucurbita maxima* (MS), *E. coli* (katE) | Exemplary genes: NM_112302.4, HM755991.1, M55161.1 |
| Bypass Pathway 3 | Malate Synthase (CmMS), Glycolate Dehydogenase (CrGDH) | *Cucurbita maxima* (MS), *C. reinhardtii* (GYD1) | SEQ ID NO: 42; SEQ ID NO: 44 |

"dsRNA" refers to double-stranded RNA that comprises a sense and an antisense portion of a selected target gene (or sequences with high sequence identity thereto so that gene silencing can occur), as well as any smaller double-stranded RNAs formed therefrom by RNAse or dicer activity. Such dsRNA can include portions of single-stranded RNA, but contains at least 19 nucleotides double-stranded RNA. In one embodiment of the disclosure, a dsRNA comprises a hairpin RNA which contains a loop or spacer sequence between the sense and antisense sequences of the gene targeted, preferably such hairpin RNA spacer region contains an intron, particularly the rolA gene intron (Pandolfini et al., 2003, BioMedCentral (BMC) Biotechnology 3:7 (www.biomedcentral.com/1472-6750/3/7)), the dual orientation introns from pHellsgate 11 or 12 (see, WO 02/059294 and SEQ ID NO: 25 and 15 therein) or the pdk intron (*Flaveria trinervia* pyruvate orthophosphate dikinase intron 2; see WO99/53050). SEQ ID NO: 46 provides an RNA sequence utilized in some embodiments of the present disclosure to knockdown PLGG1 production.

The enzyme names provided in Table 1, glycolate carboligase, 2-hydroxy-3-oxopropionate reductase, tartronic semialdehyde reductase, glycolate dehydrogenase subunits D, E and F, glycolate oxidase, malate synthase, catalase HPII, and glycolate dehydrogenase, refer to categories of enzymes exemplified by the provided enzymes and sequences. These terms include homologs of these enzymes as well as enzymes that can catalyze the same reactions.

The terms "increase growth" and "increase productivity", and grammatical variations thereof, as used herein refers to an increase in the rate of growth, or size of a plant at a given timepoint, or an enhanced photosynthetic efficiency of a genetically altered plant in comparison to a non-altered plant of the same species.

Molecular Biological Methods

An isolated nucleic acid is a nucleic acid the structure of which is not identical to that of any naturally occurring nucleic acid. The term therefore covers, for example, (a) a DNA which has the sequence of part of a naturally occurring genomic DNA molecule but is not flanked by both of the coding or noncoding sequences that flank that part of the molecule in the genome of the organism in which it naturally occurs; (b) a nucleic acid incorporated into a vector or into the genomic DNA of a prokaryote or eukaryote in a manner such that the resulting molecule is not identical to any naturally occurring vector or genomic DNA; (c) a separate molecule such as a cDNA, a genomic fragment, a fragment produced by polymerase chain reaction (PCR), or a restriction fragment; and (d) a recombinant nucleotide sequence that is part of a hybrid gene, i.e., a gene encoding a fusion protein. Specifically excluded from this definition are nucleic acids present in mixtures of (i) DNA molecules, (ii) transformed or transfected cells, and (iii) cell clones, e.g., as these occur in a DNA library such as a cDNA or genomic DNA library.

The term recombinant nucleic acids refers to polynucleotides which are made by the combination of two otherwise separated segments of sequence accomplished by the artificial manipulation of isolated segments of polynucleotides by genetic engineering techniques or by chemical synthesis. In so doing one may join together polynucleotide segments of desired functions to generate a desired combination of functions.

In practicing some embodiments of the disclosure disclosed herein, it can be useful to modify the genomic DNA, chloroplast DNA or mitochondrial DNA of a recombinant strain of a host cell to preclude functional expression of one or more target proteins (e.g., BASS6 or PLGG1) and/or introduce genetic elements allowing for the expression of introduced genes. In preferred embodiments, such a host cell is a plant cell.

Modifications intended to preclude functional expression of a target protein or reduced expression or reduced activity of a target protein can involve mutations of the DNA or gene encoding the target protein, including deletion of all or a portion of a target gene, including but not limited to the open reading frame of a target locus, transcriptional regulators such as promoters of a target locus, and any other regulatory nucleic acid sequences positioned 5' or 3' from the open reading frame, insertion of premature stop codons in the open reading frame, and insertions or deletions that shift the reading frame leading to premature termination of translation. Such deletional mutations can be achieved using any technique known to those of skill in the art. Reduced levels of the target protein or reduced activity of the target protein may also be achieved with point mutations or insertions in the DNA or gene encoding the target protein. Mutational, insertional, and deletional variants of the disclosed nucleotide sequences and genes can be readily prepared by methods which are well known to those skilled in the art. Techniques used to achieve reduced levels and/or reduced activity of the target protein may include CRISPR/Cas, TALEN, and Zn-finger nuclease. It is well within the skill of a person trained in this art to make mutational, insertional, and deletional mutations which are equivalent in function to the specific ones disclosed herein. Additionally, such modifications to functional protein production can be achieved via protein "knockdown" approaches, such as RNA interference (RNAi) mediated by double-stranded RNA (dsRNA), siRNA, or other techniques known in the art. An RNA molecule that inhibits expression of a target protein can reduce expression of the gene encoding the protein or may reduce translation of the protein.

Where a recombinant nucleic acid is intended for expression, cloning, or replication of a particular sequence, DNA constructs prepared for introduction into a host cell will typically comprise a replication system (i.e. vector) recognized by the host, including the intended DNA fragment encoding a desired polypeptide, and can also include transcription and translational initiation regulatory sequences operably linked to the polypeptide-encoding segment. Additionally, such constructs can include cellular localization signals (e.g., chloroplast localization signals). In preferred embodiments, such DNA constructs are introduced into a host cell's genomic DNA, chloroplast DNA or mitochondrial DNA.

In some embodiments, a non-integrated expression system can be used to induce expression of one or more introduced genes. Expression systems (expression vectors) can include, for example, an origin of replication or autonomously replicating sequence (ARS) and expression control sequences, a promoter, an enhancer and necessary processing information sites, such as ribosome-binding sites, RNA splice sites, polyadenylation sites, transcriptional terminator sequences, and mRNA stabilizing sequences. Signal peptides can also be included where appropriate from secreted polypeptides of the same or related species, which allow the protein to cross and/or lodge in cell membranes, cell wall, or be secreted from the cell.

Selectable markers useful in practicing the methodologies of the disclosure disclosed herein can be positive selectable markers. Typically, positive selection refers to the case in which a genetically altered cell can survive in the presence of a toxic substance only if the recombinant polynucleotide of interest is present within the cell. Negative selectable markers and screenable markers are also well known in the art and are contemplated by the present disclosure. One of skill in the art will recognize that any relevant markers available can be utilized in practicing the inventions disclosed herein.

Screening and molecular analysis of recombinant strains of the present disclosure can be performed utilizing nucleic acid hybridization techniques. Hybridization procedures are useful for identifying polynucleotides, such as those modified using the techniques described herein, with sufficient homology to the subject regulatory sequences to be useful as taught herein. The particular hybridization techniques are not essential to the subject disclosure. As improvements are made in hybridization techniques, they can be readily applied by one of skill in the art. Hybridization probes can be labeled with any appropriate label known to those of skill in the art. Hybridization conditions and washing conditions, for example temperature and salt concentration, can be altered to change the stringency of the detection threshold. See, e.g., Sambrook et al. (1989) vide infra or Ausubel et al. (1995) *Current Protocols in Molecular Biology*, John Wiley & Sons, NY, N.Y., for further guidance on hybridization conditions.

Additionally, screening and molecular analysis of genetically altered strains, as well as creation of desired isolated nucleic acids can be performed using Polymerase Chain Reaction (PCR). PCR is a repetitive, enzymatic, primed synthesis of a nucleic acid sequence. This procedure is well known and commonly used by those skilled in this art (see Mullis, U.S. Pat. Nos. 4,683,195, 4,683,202, and 4,800,159; Saiki et al. (1985) *Science* 230:1350-1354). PCR is based on the enzymatic amplification of a DNA fragment of interest that is flanked by two oligonucleotide primers that hybridize to opposite strands of the target sequence. The primers are oriented with the 3' ends pointing towards each other. Repeated cycles of heat denaturation of the template, annealing of the primers to their complementary sequences, and extension of the annealed primers with a DNA polymerase result in the amplification of the segment defined by the 5' ends of the PCR primers. Because the extension product of each primer can serve as a template for the other primer, each cycle essentially doubles the amount of DNA template produced in the previous cycle. This results in the exponential accumulation of the specific target fragment, up to several million-fold in a few hours. By using a thermostable DNA polymerase such as the Taq polymerase, which is isolated from the thermophilic bacterium *Thermus aquaticus*, the amplification process can be completely automated. Other enzymes which can be used are known to those skilled in the art.

Nucleic acids and proteins of the present disclosure can also encompass homologues of the specifically disclosed sequences. Homology (e.g., sequence identity) can be 50%-100%. In some instances, such homology is greater than 80%, greater than 85%, greater than 90%, or greater than 95%. The degree of homology or identity needed for any intended use of the sequence(s) is readily identified by one of skill in the art. As used herein percent sequence identity of two nucleic acids is determined using an algorithm known in the art, such as that disclosed by Karlin and Altschul (1990) Proc. Natl. Acad. Sci. USA 87:2264-2268, modified as in Karlin and Altschul (1993) Proc. Natl. Acad. Sci. USA 90:5873-5877. Such an algorithm is incorporated into the NBLAST and XBLAST programs of Altschul et al. (1990) J. Mol. Biol. 215:402-410. BLAST nucleotide searches are performed with the NBLAST program, score=100, word-length=12, to obtain nucleotide sequences with the desired percent sequence identity. To obtain gapped alignments for comparison purposes, Gapped BLAST is used as described in Altschul et al. (1997) Nucl. Acids. Res. 25:3389-3402. When utilizing BLAST and Gapped BLAST programs, the default parameters of the respective programs (NBLAST and XBLAST) are used. See www.ncbi.nih.gov.

Preferred host cells are plant cells. Recombinant host cells, in the present context, are those which have been genetically modified to contain an isolated nucleic molecule, contain one or more deleted or otherwise non-functional genes normally present and functional in the host cell, or contain one or more genes to produce at least one recombinant protein. The nucleic acid(s) encoding the protein(s) of the present disclosure can be introduced by any means known to the art which is appropriate for the particular type of cell, including without limitation, transformation, lipofection, electroporation or any other methodology known by those skilled in the art.

Transgenic Plants and Plant Cells (t-DNA and Chloroplast Expression)

One embodiment of the present disclosure provides a plant or plant cell comprising one or more modified plant genes and/or introduced genes. For example, the present disclosure provides transgenic plants that lack functional expression of genes encoding chloroplast-localized transport proteins BASS6 and/or PLGG1. Additionally, some plants or plant cells provided herein also express non-native genes, such as enzymes encoded by bacteria-derived, plant-derived, and alga-derived genes. Alternately, some plants or plant cells provided herein can express a native gene in such a way as the protein produced is localized to an organelle (e.g., the chloroplast) or other sub-cellular compartment to which it is not naturally localized. Expression of other genetic elements (e.g., dsRNA resulting in knockdown of PLGG1 protein production) is also contemplated and described herein.

Transformation and generation of genetically altered monocotyledonous and dicotyledonous plant cells is well known in the art. See, e.g., Weising, et al., *Ann. Rev. Genet.* 22:421-477 (1988); U.S. Pat. No. 5,679,558; *Agrobacterium Protocols*, ed: Gartland, Humana Press Inc. (1995); and Wang, et al. *Acta Hort.* 461:401-408 (1998). The choice of method varies with the type of plant to be transformed, the particular application and/or the desired result. The appropriate transformation technique is readily chosen by the skilled practitioner.

Any methodology known in the art to delete, insert or otherwise modify the cellular DNA (e.g., genomic DNA and organelle DNA) can be used in practicing the inventions disclosed herein. For example, a disarmed Ti-plasmid, containing a genetic construct for deletion or insertion of a target gene, in *Agrobacterium tumefaciens* can be used to transform a plant cell, and thereafter, a transformed plant can be regenerated from the transformed plant cell using procedures described in the art, for example, in EP 0116718, EP 0270822, PCT publication WO 84/02913 and published European Patent application ("EP") 0242246. Ti-plasmid vectors each contain the gene between the border sequences, or at least located to the left of the right border sequence, of the T-DNA of the Ti-plasmid. Of course, other types of vectors can be used to transform the plant cell, using procedures such as direct gene transfer (as described, for example in EP 0233247), pollen mediated transformation (as described, for example in EP 0270356, PCT publication WO 85/01856, and U.S. Pat. No. 4,684,611), plant RNA virus-mediated transformation (as described, for example in EP 0 067 553 and U.S. Pat. No. 4,407,956), liposome-mediated transformation (as described, for example in U.S. Pat. No. 4,536,475), and other methods such as the methods for transforming certain lines of corn (e.g., U.S. Pat. No. 6,140,553; Fromm et al., Bio/Technology (1990) 8, 833-839); Gordon-Kamm et al., The Plant Cell, (1990) 2, 603-618) and rice (Shimamoto et al., Nature, (1989) 338, 274-276; Datta et al., Bio/Technology, (1990) 8, 736-740) and the method for transforming monocots generally (PCT publication WO 92/09696). For cotton transformation, the method described in PCT patent publication WO 00/71733 can be used. For soybean transformation, reference is made to methods known in the art, e.g., Hinchee et al. (Bio/Technology, (1988) 6, 915) and Christou et al. (Trends Biotech, (1990) 8, 145) or the method of WO 00/42207.

In some embodiments of the present disclosure, one or more genes have been "knocked out" of the host plant cell. Typically, this means deletion of all functional copies of the target gene (e.g., two or more copies, depending on the copy number of the target gene). Any modification of the native sequence(s) that results in a failure of the targeted gene or allele to produce a functional protein is included in the term "knockout". Such modifications include, but are not limited to, missense mutations, nonsense mutations, stop codon mutations, insertional mutations, deletional mutations, frameshift mutations, and splice site mutations.

Transgenic plants of the present disclosure can be used in a conventional plant breeding scheme to produce more transgenic plants with the same characteristics, or to introduce the genetic alteration(s) in other varieties of the same or related plant species. Seeds, which are obtained from the transformed plants, preferably contain the genetic alteration(s) as a stable insert in chromosomal or organelle DNA. Plants comprising the genetic alteration(s) in accordance with the disclosure include plants comprising, or derived from, root stocks of plants comprising the genetic alteration(s) of the disclosure, e.g., fruit trees or ornamental plants. Hence, any non-transgenic grafted plant parts inserted on a transformed plant or plant part are included in the disclosure.

Introduced genetic elements, whether in an expression vector or expression cassette, which result in the expression of an introduced gene will typically utilize a plant-expressible promoter. A 'plant-expressible promoter' as used herein refers to a promoter that ensures expression of the genetic alteration(s) of the disclosure in a plant cell. Examples of promoters directing constitutive expression in plants are known in the art and include: the strong constitutive 35S promoters (the "35S promoters") of the cauliflower mosaic virus (CaMV), e.g., of isolates CM 1841 (Gardner et al., Nucleic Acids Res, (1981) 9, 2871-2887), CabbB-S (Franck et al., Cell (1980) 21, 285-294) and CabbB-JI (Hull and Howell, Virology, (1987) 86, 482-493); promoters from the ubiquitin family (e.g., the maize ubiquitin promoter of Christensen et al., Plant Mol Biol, (1992) 18, 675-689), the gos2 promoter (de Pater et al., The Plant J (1992) 2, 834-844), the emu promoter (Last et al., Theor Appl Genet, (1990) 81, 581-588), actin promoters such as the promoter described by An et al. (The Plant J, (1996) 10, 107), the rice actin promoter described by Zhang et al. (The Plant Cell, (1991) 3, 1155-1165); promoters of the Cassava vein mosaic virus (WO 97/48819, Verdaguer et al. (Plant Mol Biol, (1998) 37, 1055-1067), the pPLEX series of promoters from Subterranean Clover Stunt Virus (WO 96/06932, particularly the S4 or S7 promoter), an alcohol dehydrogenase promoter, e.g., pAdh1S (GenBank accession numbers X04049, X00581), and the TR1' promoter and the TR2' promoter (the "TR1' promoter" and "TR2' promoter", respectively) which drive the expression of the 1' and 2' genes, respectively, of the T-DNA (Velten et al., EMBO J, (1984) 3, 2723-2730).

Alternatively, a plant-expressible promoter can be a tissue-specific promoter, i.e., a promoter directing a higher level of expression in some cells or tissues of the plant, e.g., in green tissues (such as the promoter of the PEP carboxylase). The plant PEP carboxylase promoter (Pathirana et al., Plant J, (1997) 12:293-304) has been described to be a strong promoter for expression in vascular tissue and is useful in one embodiment of the current disclosure. Alternatively, a plant-expressible promoter can also be a wound-inducible promoter, such as the promoter of the pea cell wall invertase gene (Zhang et al., Plant Physiol, (1996) 112:1111-1117). A 'wound-inducible' promoter as used herein means that upon wounding of the plant, either mechanically or by insect feeding, expression of the coding sequence under control of the promoter is significantly increased in such plant. These plant-expressible promoters can be combined with enhancer elements, they can be combined with minimal promoter elements, or can comprise repeated elements to ensure the expression profile desired.

In some embodiments, genetic elements can be used to increase expression in plant cells can be utilized. For example, an intron at the 5' end or 3' end of an introduced gene, or in the coding sequence of the introduced gene, e.g., the hsp70 intron. Other such genetic elements can include, but are not limited to, promoter enhancer elements, duplicated or triplicated promoter regions, 5' leader sequences different from another transgene or different from an endogenous (plant host) gene leader sequence, 3' trailer sequences different from another transgene used in the same plant or different from an endogenous (plant host) trailer sequence.

An introduced gene of the present disclosure can be inserted in host cell DNA so that the inserted gene part is upstream (i.e., 5') of suitable 3' end transcription regulation signals (i.e., transcript formation and polyadenylation signals). This is preferably accomplished by inserting the gene in the plant cell genome (nuclear or chloroplast). Preferred polyadenylation and transcript formation signals include those of the nopaline synthase gene (Depicker et al., J. Molec Appl Gen, (1982) 1, 561-573), the octopine synthase gene (Gielen et al., EMBO J, (1984) 3:835-845), the SCSV or the Malic enzyme terminators (Schunmann et al., Plant Funct Biol, (2003) 30:453-460), and the T-DNA gene 7 (Velten and Schell, Nucleic Acids Res, (1985) 13, 6981-6998), which act as 3'-untranslated DNA sequences in transformed plant cells.

Protein Homologs

It will be understood by those skilled in the art that various homologs of the particular proteins disclosed herein can be targeted for deletion, or knock-down approaches, or be utilized to create a Bypass pathway. The following are exemplary, but non-limiting, protein homologs to the particular proteins provided in this disclosure that can be utilized to practice embodiments disclosed herein.

BASS6 homologs include the following (species and accession number): *A. thaliana* (NP_567671.1), *A. thaliana* (CAA16569.1), *A. lyrata* (XP_002867746.1), *Eutrema salsugineum* (XP_006413612.1), *Capsella rubella* (XP_006282633.1), *Camelina sativa* (XP_010433982.1), *Camelina saliva* (XP_010448822.1), *Arabis alpine* (KFK39256.1), *Brassica oleracea* var. *oleracea* (XP_013593377.1), *Brassica napus* (XP_013737613.1), *Brassica rapa* (XP_009137288.1), and *Raphanus sativus* (XP_018484108.1).

PLGG1 homologs include the following (species and accession number): *Arabidopsis thaliana* (NP_564388.1), *Arabidopsis thaliana* (AAM65181.1), *Arabidopsis lyrata* (XP_020868671.1), *Arabidopsis lyrata* (EFH69957.1), *Capsella rubella* (XP_006307262.1), *Camelina saliva* (XP_010478626.1), *Camelina sativa*, (XP_010461027.1), *Camelina sativa* (XP_010499753.1), *Brassica napus* (XP_013733826.1), *Raphanus sativus* (XP_018457661.1), *Brassica oleracea* var. *oleracea* (XP_013587088.1), *Brassica napus* (XP_013731498.1), *Brassica rapa* (XP_009114919.1), *Eutrema salsugineum* (XP_006415255.1), *Brassica oleracea* var. *oleracea* (XP_013587305.1), *Brassica napus* (XP_022559249.1), *Brassica napus* (CDY35540.1), *Brassica rapa* (XP_009145211.1), *Raphanus sativus* (XP_018486680.1), *Arabis alpine* (KFK44969.1), *Brassica napus* (CDY59284.1), *Brassica napus* (XP_03731491.1), *Brassica napus* (CDY22583.1), *Tarenaya hassleriana* (XP_010518925.1), *Ricinus communis* (XP_002519004.1), *Hevea brasiliensis* (XP_021652349.1), *Citrus sinensis* (XP_006471454.1), *Brassica napus* (XP_022575243.1), and *Juglans regia* (XP_01.8843901.1).

Malate synthase homologs include the following (species and accession number): *Cucurbita maxima* (XP_023000792.1), *Cucurbita pepo* (XP_023519701.1), *Cucurbita moschata* (XP_022923624.1), *Momordica charantia* (XP_022137538.1), *Cucumis sativus* (XP_004152519.1), *Cucumis melo* (XP_008439505.1), *Theobroma cacao* (EOY22418.1), *Juglans regia* (XP_18821986.1), *Eucalyptus grandis* (XP_010037447.1), *Eucalyptus grandis* (KCW49165.1), *Herrania umbratica* (XP_021286625.1), *Theobroma cacao* (XP_007037917.2), *Arachis duranensis* (XP_020997255.1), *Gossypium barbadense* (PPR87616.1) *Prunus avium* (XP_021800964.1), *Vitis vinifera* (XP_002279452.1), *Quercus suber* (XP_023901530.1), *Quercus suber* (POF20494.1), *Gossypium raimondii* (XP_012468378.1), *Cephalotus follicularis* (GAV68244.1), *Gossypium barbadense* (PPD76680.1), *Capsicum baccatum* (PHT53703.1), *Nicotiana tabacum* (XP_016464464.1), *Capsicum chinense* (PHU23662.1), *Ricinus communis* (XP_002511225.1), *Capsicum annuum* (XP_016563806.1), *Gossypium arboretum* (XP_017604788.1), *Citrus clementina* (XP_006440060.1), *Medicago truncatula* (XP_013444720.1), *Durio zibethinus* (XP_022737455.1), *Trifolium pretense* (PNY13237.1), *Medicago truncatula* (ACJ85740.1), *Nicotiana tomentosiformis* (XP_009595632.1), *Citrus unshiu* (GAY51023.1), *Prunus mume* (XP_008239432.1), *Prunus sibirica* (AIU64851.1), *Prunus persica* (XP_020420471.1), *Solanum lycopersicum* (XP_004236345.1), *Parasponia andersonii* (PON64176.1), *Ricinus communis* (NP_001310646.1), *Citrus sinensis* (XP_006476991.1), *Glycine max* (NP 001347240.1), *Nicotiana attenuate* (XP_019261379.1), *Daucus carota* subsp. *Sativus* (XP_017250345.1), *Aquilegia coerulea* (PIA33657.1), *Trema orientalis* (PON95652.1), *Helianthus annuus* (XP_022038983.1), *Macleaya cordata* (OVA17558.1), *Nicotiana sylvestris* (XP_009776635.1), *Jatropha curcas* (XP_012079884.1), *Lupinus angustifolius* (XP_019463065.1), *Vigna angularis* (XP_017425062.1), *Solanum penneilii* (XP_015070973.1), *Glycine soja* (KHN14088.1), *Tarenaya hassleriana* (XP_010555537.1), *Solanum lycopersicum* (XP_010319064.1), *Solanum tuberosum* (XP_006351486.1), *Solanum pennellii* (XP_015070972.1), *Solanum tuberosum* (XP_006351485.1), *Cicer arietinum* (XP_004510708.1), *Vigna radiata* var. *radiate* (XP_022639201.1), *Lactuca sativa* (XP_023732731.1), *Populus euphratica* (XP_011024067.1), *Populus trichocarpa* (PNT01248.1), *Carica papaya* (XP_021909023.1), *Cajanus cajan* (XP_020216385.1), *Nicotiana tabacum* (XP_016435566.1), *Oleo, europaea* var. *sylvestris* (XP_022878435.1), *Malus domestica* (XP_008374272.1), *Olea europaea* var. *sylvestris* (XP_022878436.1), *Hevea brasiliensis* (XP_021681023.1), *Morus notabilis* (XP_010103099.1), *Punica granatum* (OWM90581.1), *Arabidopsis thaliana* (NP_196006.1), *Arabidopsis lyrata* (XP_002873119.1), *Ipomoea nil* (XP_019198829.1), *Erythranthe guttata* (XP_012854673.1), *Eutrema salsugineum* (XP_006398845.1), *Camelina sativa* (XP_010490879.1), *Sesamum indicum* (XP_011073010.1), *Ziziphus jujube* (XP_015878765.1), *Brassica rapa* (XP_009125524.1), *Fragaria vesca* subsp. *vesca* (XP_004297548.1), *Camelina saliva* (XP_010423656.1), *Glycine max* (XP_003525685.1), *Capsella rubella* (XP_006286626.1), *Brassica napus* (XP_013720273.1), *Raphanus sativus* (XP_018468682.1), *Brassica napus* (CDY14170.1), *Arabis alpine* (KFK24848.1), *Brassica oleracea* var. *oleracea*

(XP_013621105.1), *Solanum tuberosum* (XP_00635187.1), *Dorcoceras hygrometricum* (KZV21744.1), *Corchorus capsularis* (OMO84006.1), *Manihot esculenta* (OAY30724.1), and *Brassica napus* (CAA73793.1).

Glycolate hydrogenase homologs include the following (species and accession number): *Chlamydomonas reinhardtii* (XP_001695381.1), *Chlamydomonas reinhardtii* (ABG36932.1), *Volvox carteri* f. *nagariensis* (XP_002946459.1), *Gonium pectoral* (KXZA46746.1), *Chlamydomonas eustigma* (GAX77289), *Chlorella variabilis* (XP_005852216.1), *Coccomyxa subellipsoidea* (XP_005648725.1), *Micromonas commode* (XP_002506446.1), *Auxenochlorella prototheicoides* (XP_011399156.1), *Ostreococcus tauri* (XP_003074362.2), *Ostreococcus lucimarinus* (XP_001415862.1), *Ostreococcus tauri* (OUS42650.1), *Bathycoccus prasinos* (XP_007511439.1), *Micromonas pusilla* (XP_003063153.1), *Chrysochromulina* sp. (KOO33603.1), and *Guillardia theta* (XP_005827919.1).

Having generally described this invention, the same will be better understood by reference to certain specific examples, which are included herein to further illustrate the invention and are not intended to limit the scope of the invention as defined by the claims.

EXAMPLES

Example 1: Materials and Methods

Plant Material and Growth Conditions

*A. thaliana* Columbia (Col-0) was used as wild type reference. Salk_03569C (plgg1-1), CS859747 (bass6-1), and Salk_052903C (bass6-2) were obtained from the *Arabidopsis* Biological Resource Center (abrc.osu.edu). Plants were grown in either elevated (2000 ppm $CO_2$) or ambient (400 ppm $CO_2$) at 8 h light/16 h dark cycle (22° C./18° C.) at 250 $\mu mol \cdot m^{-2} \cdot s^{-1}$ PAR and 65% relative humidity (RH) in growth chambers (Conviron, USA) using LC1 Sunshine Mix.

Chlorophyll Fluorescence Measurements

*Arabidopsis* plants were grown under ambient air conditions and moved to a sealed clear plastic container at low $CO_2$ conditions under constant illumination for 24 hours similar to (Badger et al., 2009) before chlorophyll fluorescence measurements. Chlorophyll fluorescence measurements were done as previously described (Oxborough and Baker, Plant, Cell & Environ. (1997) 20:1473-83; Badger et al., supra). Briefly, Fv/Fm images were taken after 15 minutes dark adaptation of 4 week old plants using the CF Imager Technologica (www.technologica.co.uk). Maximum flash intensity was 6800 $\mu mol \cdot m^{-2} \cdot s^{-1}$ for 800 milliseconds. Image values were obtained for each individual plant by detecting colonies within the fluorimager software program defining each position.

Cloning

All expression vectors are described in Table 2. Promoters and open reading frames were synthesized based on sequence obtained from The *Arabidopsis* Information Resource (TAIR). Restriction sites and 4 base pair regions of homology were designed according to common syntax in plant synthetic biology (Patron et al., New Phytol. (2015) 208:13-19). Constructs were then assembled using Golden Gate cloning protocol then subcloned into a binary vector (EC50505) (Werner et al., Bioengineered (2012) 3:38-43; Engler et al., ACS Synth. Biol. (2014) 3:839-43; Marillonnet and Werner, In Glyco-engineering, A. Castilho, ed (Springer New York), pp. 269-84 (2015); Patron et al., supra). For stable transformation the binary vectors were transformed into *Agrobacterium tumefaciens* C58C1 by electroporation, and then transformed into the Col-0 wild type strain, plgg1-1 or bass6-1 T-DNA insertion lines by floral dip (Clough and Bent, Plant J. (1998) 16:735-43). Transformed lines were selected based on BASTA resistance and gene insertion was verified by PCR analysis. For transient expression, constructs were designed as above driven by the CaMV35s promoter with a C-terminal GFP fusion.

TABLE 2

Plasmids

| Plasmid | Inserted genes | Promoter | Vector | Source |
| --- | --- | --- | --- | --- |
| EC50505 | none | | EC50505 | ENSA (project ensa.ac.uk) |
| EC27349 | p19, eGFP | 2 × 35 s | EC50505 | This study |
| EC27357 | p19, BASS6-eGFP | 2 × 35 s | EC50505 | This study |
| p415 ADH1 | none | | p415 ADH1 | ATCC-87374 |
| | BASS6 | ADH1 | p415 ADH1 | This study |
| | PLGG1 | ADH1 | p415 ADH1 | This study |
| EC15325 | BAR | NOS | EC50505 | ENSA (project ensa.ac.uk) |
| EC27403 | BAR, PLGG1 | NOS, PLGG1 | EC15325 | This study |
| EC27404 | BAR, BASS6 | NOS, BASS6 | EC15325 | This study |
| EC27406 | BAR, BASS6 | NOS, PLGG1 | EC15325 | This study |

For the transient expression work on isolated protoplasts, the BASS6-GFP construct was cloned as follows. The coding sequence of *A. thaliana* Bass6 (AT4G22840) was synthesized by GENEWIZ Inc. with a C-terminal tag containing mGFP6 (Haseloff, J., Method Cell Biol. (1999) 58:139-51), 6×HIS and MYC, into a modified gateway-compatible pUC57 plasmid from which it was recombined in pMDC32. The AtPLGG1-GFP construct was previously published (Rolland et al., Front. Plant Sci. (2016) 7:185).

Agro-Infiltration of *Nicotiana benthamiana* and Microscopy

Growth and infiltration experiments are described in (Rolland et al., supra). Briefly, *Agrobacterium tumefaciens* GV3101 (pMP90) were transformed with plasmids of interest and grown in LB media containing rifampicin (50 µg/ml) and kanamycin (30 µg/ml). Cultures were grown for about 24 h in a 28-30° C. incubator and used for transformation of *N. benthamiana* leaves. Bacteria containing P19 (OD600=0.3) were mixed with bacteria containing the plasmid of interest and/or the ER compartment marker (OD600=0.5) (plasmid CD3-959 from the *Arabidopsis* Biological Resource Center, http://abrc.osu.edu, (Nelson et al., 2007)). Cells were centrifuged for 8 minutes at 2150×g and resuspended (10 mM MES pH 5.6, 10 mM $MgCl_2$, and 150 µM acetosyringone). The cells were incubated for 2 h at room temperature and infiltrated into 3-4 weeks old *N. benthamiana* leaves.

Protoplast preparation was completed as described previously (Rolland et al., supra). Two days after infiltration, a 4 $cm^2$ area of infiltrated leaf was cut with a scalpel and transferred in a 5 ml syringe in which 2 ml of digestion solution was added and a gentle vacuum was manually applied. The infiltration solution and the leaf tissue was transferred to a 2 ml Eppendorf tube and incubated for 1 h at room temperature. Leaf debris was removed and protoplasts were allowed to sediment before the solution was replaced with imaging solution (0.4 M mannitol, 20 mM KCl, 20 mM MES pH 5.6, 10 mM CaCl2, 0.1% [w/v] BSA).

Protoplasts were observed and imaged using an upright Zeiss LSM780 confocal laser-scanning microscope (Carl Zeiss), a 40× water immersion objective (NA=1.1) and the Zen 2011 software package (Carl Zeiss). GFP and chlorophyll were excited at 488 nm and recorded at 499-534 nm and at 630-735 nm, respectively. mCherry was excited at 561 nm and recorded at 579-633 nm in a separate track (although not shown in this study).

Sliced whole leaf tissue was visualized using a Light sheet Z1 (Carl Zeiss INC. Oberkochen, Germany) microscope from infiltrated leaf tissue as described, using a 40× objective (NA=1.0) using the Zen light sheet software package (Carl Zeiss). GFP and chlorophyll were excited at 488 nm and emission selection was recorded at 505-545 and 660 nm respectively.

Metabolic Profiling

For metabolite analysis ~40 mg of fresh leaf tissue was frozen in liquid nitrogen, crushed and then extracted with 500 μL of 100% methanol. Samples were then submitted to the Metabolomics Center, Roy J. Carver Biotechnology Center, University of Illinois at Urbana-Champaign where two additional extractions were then performed: isopropanol:acetonitrile:water (3:3:2 v/v), and chloroform:methanol (2:2 v/v). Metabolites were analyzed using a GC-MS system (Agilent Inc., CA, USA) consisting of an Agilent 7890 gas chromatograph, an Agilent 5975 mass selective detector and a HP 7683B auto sampler. Gas chromatography was performed on a ZB-5MS (60 m×0.32 mm I.D. and 0.25 um film thickness) capillary column (Phenomenex, CA, USA). The inlet and MS interface temperatures were 250° C., and the ion source temperature was adjusted to 230° C. An aliquot of 1 μL was injected with the split ratio of 10:1. The helium carrier gas was kept at a constant flow rate of 2 ml/min. The temperature program was: 5-min isothermal heating at 70° C., followed by an oven temperature increase of 5° C. $\text{min}^{-1}$ to 310° C. and a final 10 min at 310° C. The mass spectrometer was operated in positive electron impact mode (EI) at 69.9 eV ionization energy at m/z 30-800 scan range. The spectra of all chromatogram peaks were compared with electron impact mass spectrum libraries NIST08 (NIST, MD, USA), W8N08 (Palisade Corporation, NY, USA), and a custom-built database (464 unique metabolites). All known artificial peaks were identified and removed. To allow comparison among samples, all data were normalized to the internal standard in each chromatogram and the sample wet weight. The spectra of all chromatogram peaks were evaluated using the AMDIS 2.71 (NIST, MD, USA) program. Metabolite concentrations were reported as concentrations relative to the internal standard (i.e., target compound peak area divided by peak area of hentriacontanoic acid: $N_i = X_i * X^{-1} IS$) per gram wet weight. The instrument variability was within the standard acceptance limit of 5%.

Photosynthesis Measurements

The youngest fully expanded leaves of 30-40 day old Arabidopsis plants grown at elevated [$CO_2$] were used for analysis of photosynthesis by gas exchange. Gas exchange measurements were performed using a Li-COR 6400XT with a 2 $cm^2$ fluorescence measuring head with gasket leaks corrected for as outlined in the manual (LI-COR Biosciences, Lincoln, NE, USA). A, $g_s$ and $C_i$, measurements were obtained at indicated $CO_2$ concentrations at a leaf temperature of 25° C. and saturating light (1000 $\mu mol \cdot m^{-2} \cdot s^{-1}$). $AC_i$ curves were measured in a range of $CO_2$ (50-2000 ppm) under the same temperature and light conditions stated above after acclimation under ambient $CO_2$. $V_{cMax}$, $J_{Max}$ $R_d$ and $g_s$ were determined using $AC_i$ data and the PsFit model (Bernacchi et al., Plant Cell. Environ (2003) 26: 1419-1430).

RT-PCR cDNA was generated from RNA extracted using the plant RNeasy extraction kit and Quantitec reverse transcription kit (QIAGEN USA) from 4-week old Arabidopsis plants grown under 8 h/16 h day night cycle at 180 $mol \cdot m^{-2} \cdot s^{-1}$ PAR and 22° C./18° C. temperature regime at 65% RH. Three biological replicates including three technical replicates each were used for all samples. Samples were analyzed using a Bio-Rad CFX connect real-time PCR system (Bio-Rad laboratories, USA) and relative changes in transcript were determined using the ΔΔCt method using primers directed toward violaxanthin de-epoxidase (VDE), Plgg1, and Bass6 transcripts. cDNA was amplified using a SSO advanced SYBR green master mix (Bio-Rad) and primer sequences are described in Table 3.

TABLE 3

Primers

| Primer name | SEQ ID NO: | Sequence |
|---|---|---|
| p35s seq F | SEQ ID NO: 7 | CTCTCTGCCGACAGTGGT |
| t35s seq R | SEQ ID NO: 8 | CTTATATGCTCAACACATGAGCG |
| Salk_053469 LP | SEQ ID NO: 9 | ATAACCGCGAGATAGAGAGGC |
| Salk_053469RP | SEQ ID NO: 10 | CCCATGGCTACTCTTTTAGCC |
| LBb1.3 | SEQ ID NO: 11 | ATTTTGCCGATTTCGGAAC |
| Plgg1-005F | SEQ ID NO: 12 | GCCGGATCCATGGCTTCGTGCTC TAAGATCCGTTTCGGT |
| Plgg1-006R | SEQ ID NO: 13 | GCCCTCGAGTCAGCCGACGACCG CTAGC |
| Bass6-001F | SEQ ID NO: 14 | GCTCTAGAATGAGCGTGATCACA ACTCC |
| Bass6-002R | SEQ ID NO: 15 | GACTCGAGTTAAAATGTGTTACT CTTTTC |
| Plgg1-RT 1F | SEQ ID NO: 16 | CTACTCTTTTAGCCACTCCTATC TTC |
| Plgg1-RT 2R | SEQ ID NO: 17 | AGATTCAACTTCTGGGCACC |
| Bass6-RT 1F | SEQ ID NO: 18 | TCGCAGTCAACGGATTCAAG |
| Bass6-RT-2R | SEQ ID NO: 19 | TCTACGCCACAAATTCCTCG |
| VDE-RT-1F | SEQ ID NO: 20 | TGAGTTCAACGAGTGTGCTG |
| VDR-RT-2R | SEQ ID NO: 21 | ACTTGTAATGTACCACTTCCCG |

Yeast Complementation and Glycolate Uptake

Yeast plasmids were assembled as previously described (South et al., J. Biol. Chem. (2010) 285:595-607). Briefly, RNA was obtained from Col-0 wild-type Arabidopsis and converted to cDNA by RNeasy extraction kit and Quantitec reverse transcription kit (QIAGEN, Hilden, Germany). The CDS sequence of full length Bass6 and Plgg1 minus the chloroplast localization signal (1-24) were amplified by PCR using primers described in Table 3. The PCR product was cloned into the pRS415-ADH1 vector (ATCC, VA USA) using BamHI and XhoI restriction sites. Yeast transformations were performed as previously described with BY4741 mat a wild-type and ady2Δ strains (GE Dharmacon) (South et al., supra; South et al., Proc. Nat'l Acad. Sci. USA (2013) 110:E1016-E1025).

Complementation of the ady2Δ strain was performed by comparing growth analysis using glycolate as a carbon source. Wild-type and ady2Δ strains transformed with Bass6, Plgg1, or empty vector expression plasmids were grown in 50 mL cultures in synthetic complete media lacking leucine (SC-Leu) until reaching an optical density of $OD_{600}$ between 0.6 and 0.8. Cells were then washed in water twice and resuspended in water. A spot assay was performed on SC-Leu plates containing 2% glucose, lactate, or glycolate as a carbon source. 5 uL spots were dropped onto plates with five 10-fold serial dilutions starting with an $OD_{600}$ of 0.1. Plates were then incubated at 30° C. Photographs of plates were taken at 1 d (glucose), 2 d (lactate), 7 d (glycolate).

Glycolate uptake measurements were performed similarly to glycerol uptake describe previously (Oliveira et al., FEMS Microbiol. Lett. (1996) 142:147-53). Yeast strains were grown in 50 mL cultures in SC-Leu at 30° C. until reaching an optical density of $OD_{600}$ between 0.6 and 0.8. Cells were harvested and washed twice with water and resuspended in 100 mM Tris/citrate buffer pH 5.0 at a concentration of 30 mg/ml dry weight. After 2 minute incubation at 25° C. the reaction was started with the addition of 150 µL of (SC-Leu/glycolate) containing 1 µL aqueous solution of 50 mCi/mmol (3.7*10^3 [Bq] total) [$^{14}$C]-glycolic acid (American Radiolabeled chemicals, MO USA). After 10 minutes the reaction was stopped by the addition of 5 mL of ice cold water. The reaction mixtures were then filtered on glass fiber filters (Fisher Scientific USA) and washed 3 times with 5 mL of ice-cold water. [$^{14}$C]-glycolate uptake was measured by scintillation using the filters plus 4 mL of scintillation fluid (RPI Bio-safe II) using a Packard Tri-Carb liquid scintillation counter (Perkin Elmer USA).

Statistical Analyses

All experiments had at least 3 biological replicates and data indicate the average values. Relative growth analysis and relative changes in mRNA levels include standard deviation and significance using a student's T-test. Metabolite analysis and photosynthetic measurements were analyzed either by a one-way ANOVA (genotype) or two-way ANOVA (genotype by $CO_2$ treatment) with a significance threshold of P<0.05. All ANOVA were followed with a Tukey's post-hoc test and determined using statistical software (OriginPro 9.1, OriginLab, MA USA).

Example 2: Analysis of *Arabidopsis* Bass6 Mutant Phenotypes

Figure 3:
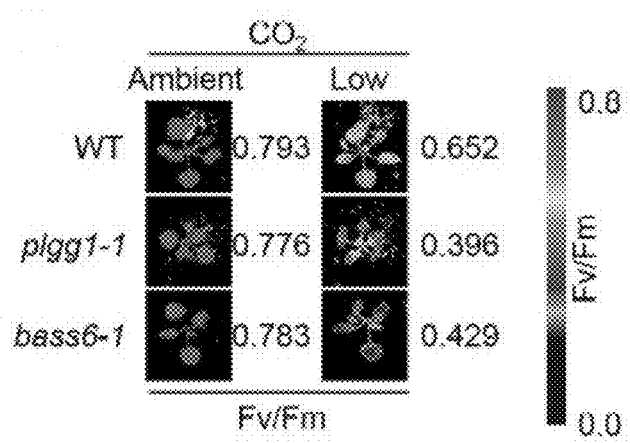
FIG. 3 provides a photograph of representative bass6 and plgg1 mutants compared to wild-type *A. thaliana* showing changes in Fv/Fm after 24 hours of low $CO_2$ and constant illumination. Numbers represent the average of 12 plants from three replicate experiments.
Figure 4A:
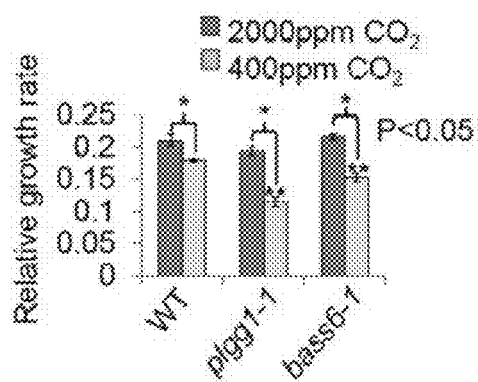
FIG. 4A and FIG. 4B provide a graphs showing relative growth rate of bass6-1 and plgg1-1 mutants compared to wild-type *A. thaliana* at different $CO_2$ concentrations.
Figure 4B:
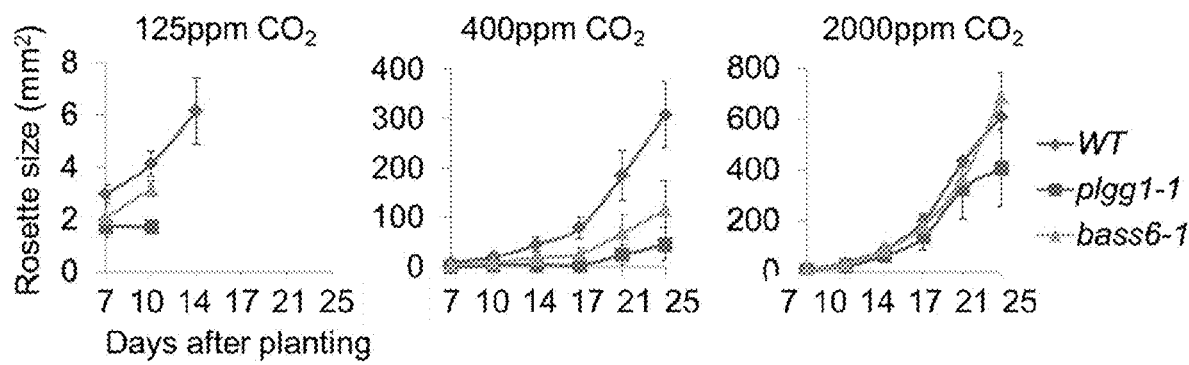

Two independent T-DNA insertion lines targeting the gene At4g22840, which lack the expression of the putative chloroplast inner membrane protein BASS6 were analyzed. To determine if BASS6 is involved in photorespiration, the two T-DNA lines (bass6-1 and bass6-2) were grown under ambient $CO_2$ (400 ppm) conditions. Compared to the wild type control, both bass6 mutant lines exhibited a smaller rosette size similar to that of the glycolate/glycerate transporter mutant involved in photorespiration plgg1-1 (FIG. 2—representative photos of bass6 and plgg1 mutants compared to WT grown at ambient $CO_2$ (8 weeks 400 ppm $CO_2$ at 8 h light/16 h dark cycle (22° C./18° C.) at 250 µmol·m$^{-2}$·s$^{-1}$ light intensity in growth chambers)). Illumination of photorespiratory mutants under low concentrations of $CO_2$ resulted in reduced dark-adapted Fv/Fm chlorophyll fluorescence potentially due to photodamage to photosystem II (Badger et al., supra). Both plgg1-1 and bass6-1 lines showed a significant reduction in Fv/Fm when compared to wild type following 24 hours under constant illumination, though no reduction in Fv/Fm was observed prior to low [$CO_2$] treatment (FIG. 3). To verify the photorespiratory mutant phenotype, growth analysis of the bass6-1 mutant was performed at low, ambient, and elevated $CO_2$. Consistent with a classical photorespiratory mutant phenotype both the bass6-1 and the plgg1-1 mutants failed to grow at 125 ppm $CO_2$ (FIG. 4B). Under ambient $CO_2$ conditions both the bass6-1 and the plgg1-1 T-DNA lines exhibited a slow growth phenotype when compared to the wild type control (FIGS. 4A and 4B). Importantly, the slow growth phenotype was recovered to the wild type phenotype in both the bass6-1 and plgg1-1 mutants when grown in high [$CO_2$] conditions (FIGS. 4A and 4B).

Figure 5:
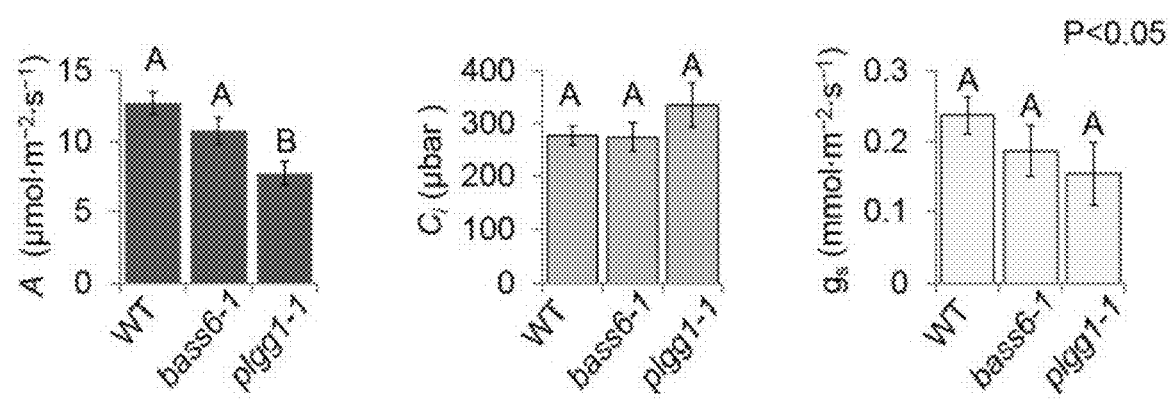
FIG. 5 provides graphs showing reduction in assimilation (A), internal $CO_2$ concentration ($C_i$), and stomatal conductance ($g_s$) in *A. thaliana* mutants lacking Bass6. Photosynthetic measurements recorded at 400 ppm $CO_2$ and saturating light (1000 $\mu mol \cdot m^{-2} \cdot s^{-1}$) for the indicated strains, assimilation (A), internal $CO_2$ concentration ($C_i$) and stomatal conductance ($g_s$). Letters indicate statistical differences based on ANOVA analysis N=3.

Mutants in the photorespiratory pathway often require high levels of $CO_2$ for wild-type or near wild-type growth, which are conditions that the RubisCO oxygenation reaction is suppressed to very low levels (Timm and Bauwe, supra). At ambient [$CO_2$] photorespiration mutants commonly show a reduction in photosynthesis characterized by reductions in carbon assimilation (A), Rubisco $V_{c\ max}$ and $J_{max}$ parameters. Similar to previous reports (Pick et al., supra; Walker et al., Photosyn Res. (2016) 129:93-103), plgg1-1 exhibited a lower photosynthetic rate compared to wild type (FIG. 5). The bass6-1 plants also showed a slight reduction in photosynthesis at ambient [$CO_2$] compared to WT with no detectable changes in internal $CO_2$ concentration ($C_i$) or stomatal conductance ($g_s$) (FIG. 5). To evaluate the biochemical limitations to photosynthesis of bass6-1 and plgg1-1 lines, the response of carbon assimilation (A) on the intercellular [$CO_2$] within the leaf ($C_i$) was investigated. Consistent with the single point photosynthetic measurements, both bass6-1 and plgg1-1 had decreased $V_{c\ max}$ and $J_{max}$ values (Table 3). For Table 4, letters indicate statistical difference based on ANOVA analysis p≤0.5. $V_c$Max, maximum carboxylation rate allowed by Rubisco; J Max, maximum rate of photosynthetic electron transport; $R_d$, day respiration; $g_s$, stomatal conductance. The reduction in the rate of photosynthesis in the bass6-1 line was not as large as in the plgg1-1 mutant, which is consistent with comparative rosettes sizes and the growth rates of the bass6-1 vs plgg1-1 mutant plants (compare FIG. 2 and FIG. 4A with FIG. 5 and Table 4).

TABLE 4

| | Photosynthetic parameters based on $AC_i$ data using PsFit model. | | | |
|---|---|---|---|---|
| | $V_{cMax}$ 25° C. (µmol · m$^{-2}$ · s$^{-1}$) | $J_{Max}$ 25° C. (µmol · m$^{-2}$ · s$^{-1}$) | $R_d$ (µmol · m$^{-2}$ · s$^{-1}$) | $g_s$ (mmol · m$^{-2}$ · s$^{-1}$) |
| Col-0 WT | 58.64$^A$ ± 0.93 | 121.98$^A$ ± 1.61 | 1.44$^A$ ± 0.16 | 0.24$^A$ ± 0.04 |
| bass6-1 | 49.60$^B$ ± 1.62 | 107.38$^B$ ± 1.18 | 1.20$^{AB}$ ± 0.33 | 0.22$^A$ ± 0.05 |
| plgg1-1 | 38.37$^C$ ± 3.12 | 97.33$^C$ ± 2.18 | 2.24$^B$ ± 0.5 | 0.16$^A$ ± 0.04 |

Figure 6A:
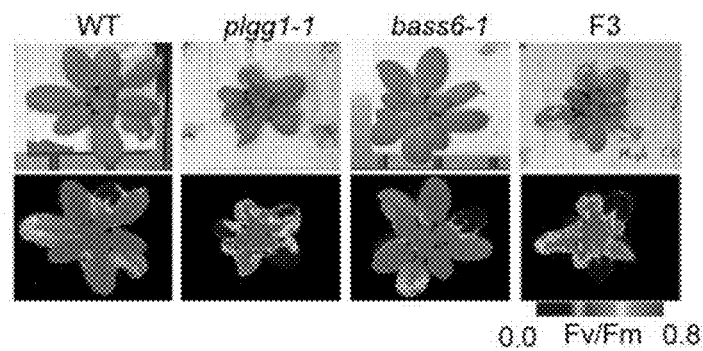
FIG. 6A and FIG. 6B provide analysis of a bass6, plgg1 double mutant *A. thaliana* showing additive photorespiratory phenotypic effects.
Figure 6B:
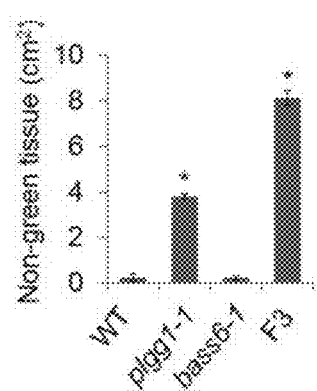
Figure 8A:
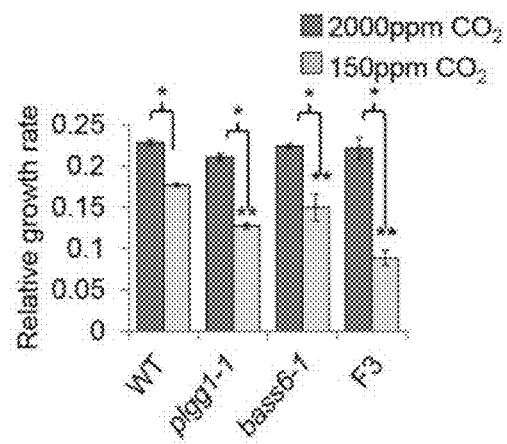
FIG. 8A and FIG. 8B provide analysis of a bass6, plgg1 double mutant *A. thaliana* showing additive photorespiratory phenotypic effects.
Figure 8B:
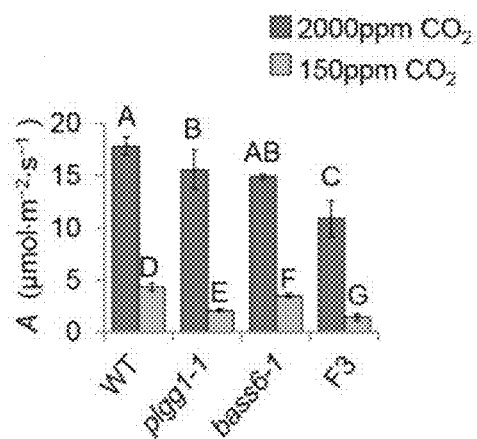

Previous characterization of plgg1-1 demonstrated that when plgg1-1 mutants develop chlorotic lesions on their leaves when grown at high levels of $CO_2$ and then shifted to ambient air (Pick et al., supra). Using chlorophyll fluorescent Fv/Fm detection, chlorotic lesions are detectable after 3 days in ambient air conditions. Consistent with previous studies the plgg1-1 mutant develops lesions on leaves after shift to ambient air (FIG. 6A). While the bass6-1 mutant alone does not develop observable chlorotic lesions on leaves after shift to ambient $CO_2$ at three days or as long as 7 days after transfer (FIG. 6A), the homozygous F3 generation of the bass6-1 and plgg1-1 cross develops chlorotic lesions more severely when compared to the plgg1-1 line alone consistent with an additive photorespiratory mutant phenotype (FIG. 6A and FIG. 6B). With an observed doubling in severity of chlorotic lesions in the bass6, plgg1 double mutant we hypothesized there would also be an additive growth defect and further reductions in photosynthetic rates. As predicted, the growth phenotype observed in the F3 double mutant plants show a further decrease, and the reduction in photosynthetic rate appears to be additive when both PLGG1 and BASS6 functions are missing (FIG. 8A and FIG. 8B).

Example 3: BASS6 Protein is Localized in the Chloroplast Envelope

Figure 7:
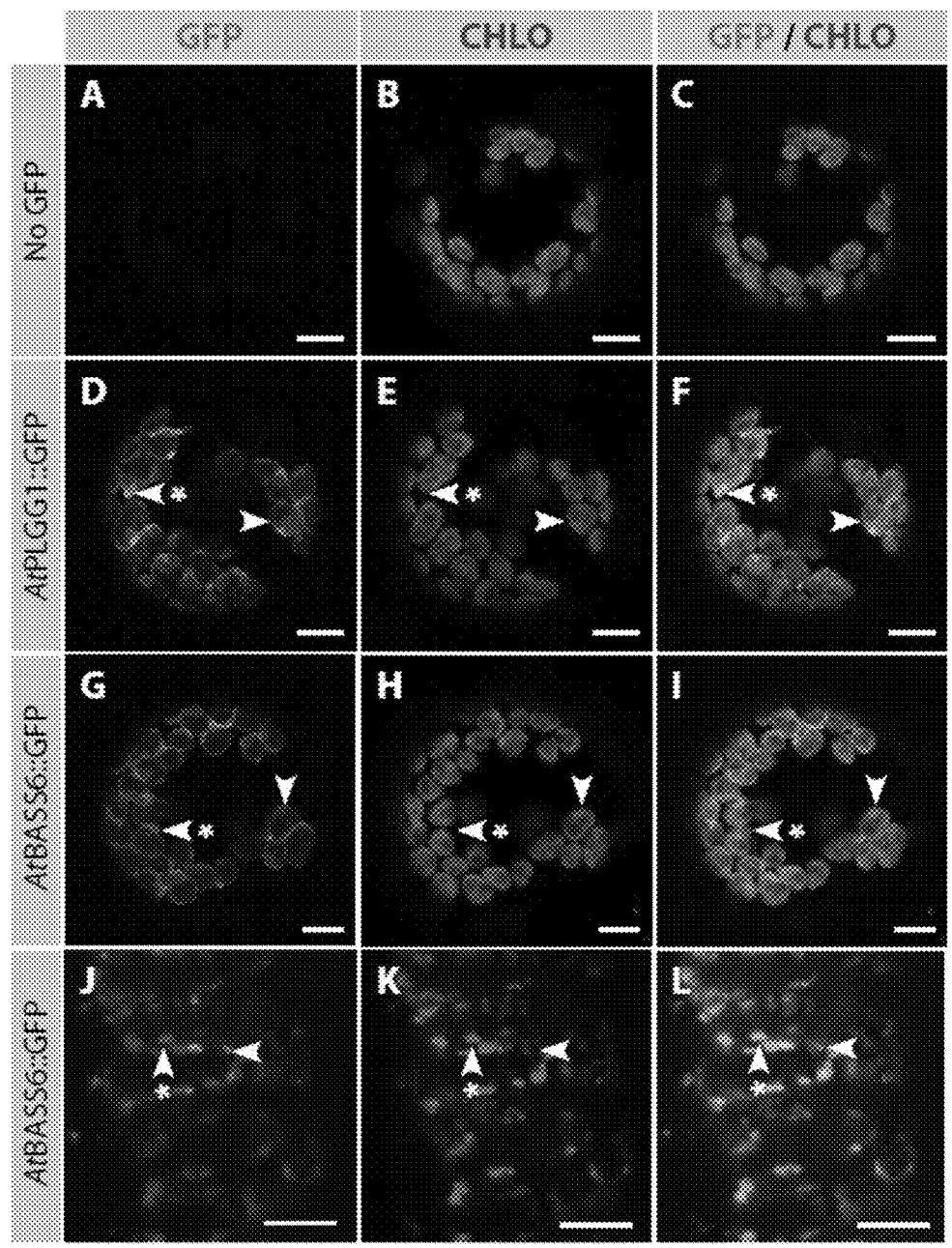
FIG. 7 provides confocal microscopy images of isolated *Nicotiana benthamiana* protoplasts showing localization of GFP-tagged PLGG1 (panels D-F) and GFP-tagged BASS6 (panels G-I) to the chloroplast envelope. These images are maximum projections of 4 successive planes, and show that both PLGG1 and BASS6 localize in the chloroplast envelope (arrowheads) where they form stromules (starred arrowheads). All protoplasts also express P19 and a mCherry-tagged ER marker, not shown. Scale bars: 10 μm. Panels J-L provide light sheet images of *N. benthamiana* leaf tissue transiently expressing Bass6-eGFP expressed from the 35s promoter. Arrows indicate GFP fluorescence not associated with chlorophyll auto-fluorescence. Starred arrows indicate GFP fluorescence associated with the chlorophyll envelope. Scale Bars: 50 µm. In all panels, GFP signal is shown in green, while chloroplast auto-fluorescence is shown in magenta.

Although a previous study suggested that BASS6 protein localizes to the chloroplast envelope, subcellular location prediction programs more strongly favored mitochondrial localization of BASS6 (Gigolashvili et al., supra). To determine the localization of BASS6 protein, transient expression of BASS6-GFP fusion proteins was analyzed in both protoplasts and whole leaf tissue in *Nicotiana benthamiana*. Chlorophyll auto-fluorescence was used to identify chloroplasts (FIG. 7, panels B, E, H, and K). The BASS6-GFP signal surrounded chloroplast autofluorescence (FIG. 7, panels G-I), similarly to the known glycolate/glycerate transporter PLGG1 (FIG. 7, panels D-F), indicating that BASS6 is localized to the chloroplast envelope. Furthermore, expression of either BASS6-GFP or PLGG1-GFP induced the formation of stromules (starred arrowheads in FIG. 7, panels D-I) which shapes are typical of proteins localized in the chloroplast inner envelope membrane (Breuers et al., Frontiers Plant Sci., (2012) 3:7). Light-sheet microscopy experiments from whole leaf tissue also showed localization to the chloroplast envelope and additional non-chloroplastic regions, though this may have resulted from transient overexpression (FIG. 7, panels J-L). As an additional control, a GFP control protein was compared to BASS6-GFP showing that BASS6 does not localize to the cytosol.

Example 4: Analysis of Bass6-1 Metabolite Profiles

Figure 9:
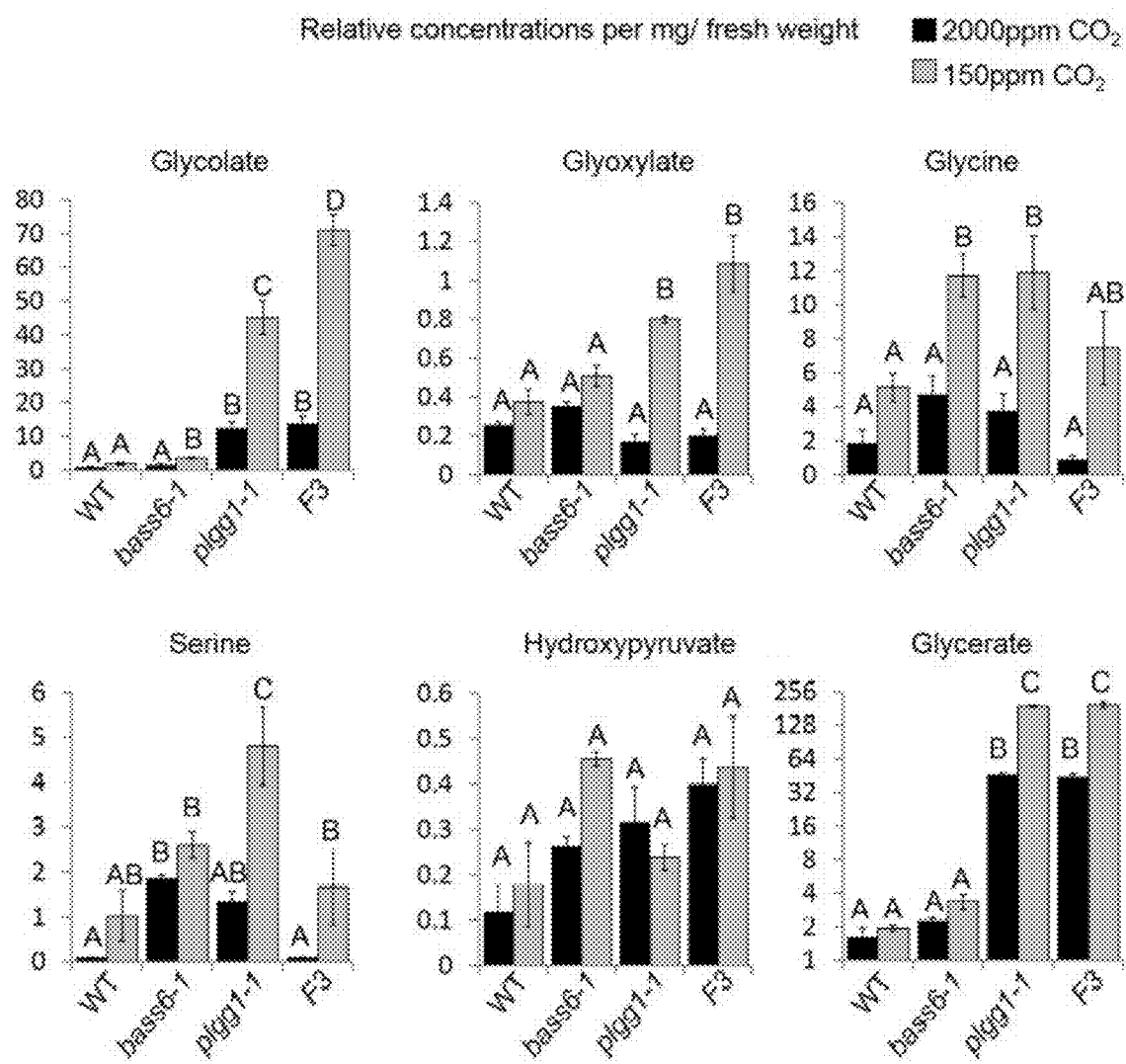
FIG. 9 provides a graph demonstrating accumulation of various photorespiratory intermediates in *A. thaliana* wild-type, bass6, plgg1, and double mutant bass6, plgg1 plants grown at elevated $CO_2$ for 6 weeks. Black bars indicate 2000 ppm and grey bars indicate 150 ppm $CO_2$. X-axis numbers represent relative differences of the indicated photorespiratory metabolite based on an internal standard. Error bars indicate standard error of the mean. Letters indicate statistical differences based on ANOVA analysis; N=3.

When RubisCO oxygenation rates are appreciable, mutant plants that have defects in photorespiration accumulate various metabolite intermediates within the photorespiratory pathway. To help identify the transport step of BASS6 in the photorespiration pathway, metabolite profiles were analyzed in leaf tissue exposed to either high (2000 ppm) or low (150 ppm) $[CO_2]$. When compared to the wild type control under high $[CO_2]$ conditions the bass6-1 line showed an increase in the amino acid serine, whereas the previously reported plgg1-1 line accumulated multiple photorespiratory intermediates such as glycolate, *Glycine* and glycerate, even at high $CO_2$ concentrations (FIG. 9). When leaves were exposed to low levels of $CO_2$ to increase the RubisCO oxygenation rate, the levels of *Glycine* and glycolate in bass6-1 were significantly increased compared to wild type (FIG. 9). As a comparison, bass6-1 accumulated *Glycine* levels similar to the plgg1-1 plants when leaves were exposed to low levels of $CO_2$ (FIG. 9).

To determine if the combined loss of BASS6 and PLGG1 led to an additive increase in level of photorespiratory intermediates, the homozygous F3 cross between the plgg1-1 and the bass6-1 lines was compared to wild type and the respective single mutants. The F3 double mutant exhibits a significant increase in glycolate accumulation when compared to wild type and the single mutant lines, and increases in other intermediates such as glycerate similar to the plgg1-1 single mutant (FIG. 9). The metabolite profile data show that the loss of BASS6 function can result in the accumulation of photorespiratory metabolites. In addition, loss of both BASS6 and PLGG1 function result in a further increase in glycolate accumulation. The accumulation of photorespiratory metabolites when exposed to low $CO_2$ conditions is consistent with the slow growth phenotype and with a role of BASS6 in photorespiratory metabolism.

Figure 10:
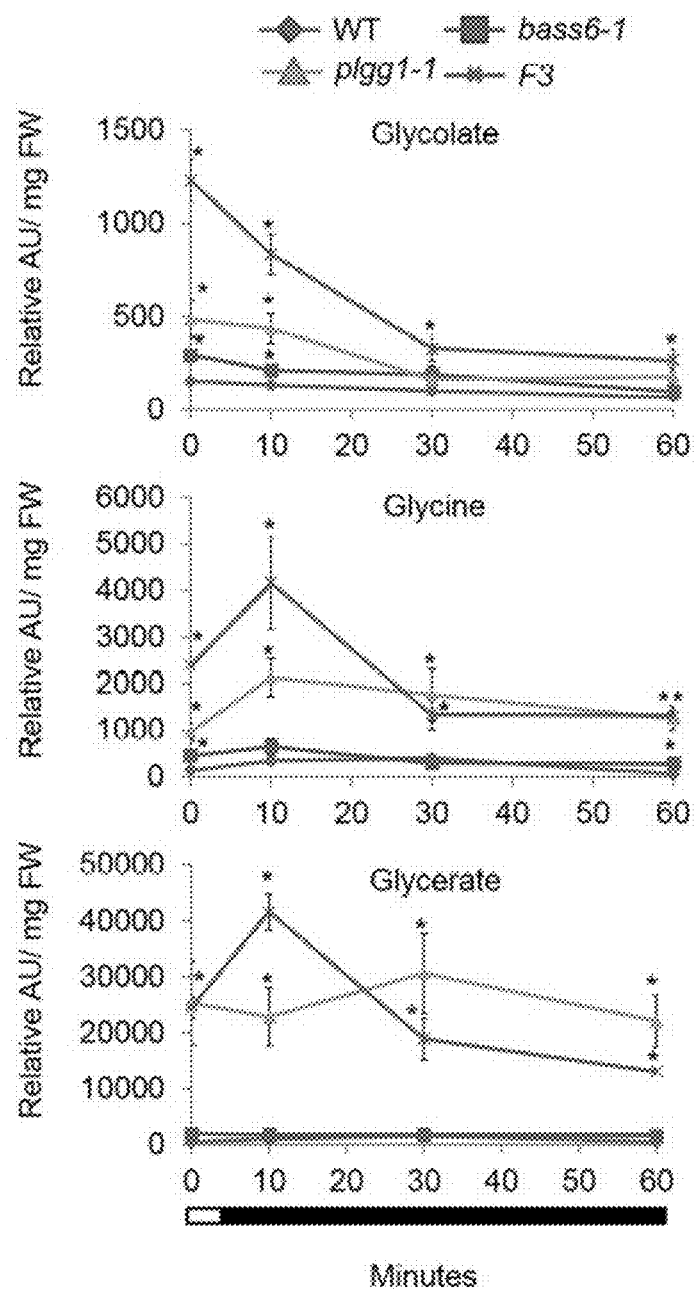
FIG. 10 provides graphs demonstrating the role of BASS6 and PLGG1 in glycolate metabolism in *A. thaliana* wild-type, bass6, plgg1, and double mutant bass6, plgg1. Indicated plant lines were grown in elevated $CO_2$ (2000 ppm) for 4 weeks then shifted to ambient air (400 ppm $CO_2$) for 24 hours. At the end of an 8-hour light cycle, tissue was collected as time 0. Each time point after was sample collection during the dark period. X-axis numbers represent relative differences of the indicated photorespiratory metabolite based on an internal standard. Error bars indicate standard error of the mean. Asterisks indicate statistical differences based on ANOVA analysis comparing WT control to T-DNA lines; N=3.

Photorespiration is a light dependent pathway. Metabolite analysis of the plgg1-1 *Arabidopsis* line showed a light dependent accumulation of glycolate, *Glycine*, serine and glycerate (Pick et al., supra), consistent with impairment of both glycolate export and glycerate import in the chloroplast. During the night under ambient air, the glycolate and *Glycine* levels in plgg1-1 mutants return to wild type levels and there was a significant reduction in glycerate (Pick et al., supra). To determine changes in glycolate, glycerate and *Glycine* levels in bass6-1 and the F3 double mutant plants compared to wild type and plgg1-1, metabolite analysis was performed after shift from high $[CO_2]$ to ambient air and immediately after the light to dark transition at the end of the growth photoperiod. The plgg1-1 mutants show a reduction in glycolate levels after the end of the light period (FIG. 10). The metabolite profile of bass6-1 plants showed accumulation of glycolate and glycerate at the end of the light period, which were significantly reduced within 10 minutes (FIG. 10). Accumulation of glycolate was significantly increased in the F3-bass6, plgg1 double mutant compared to plgg1-1 plants while *Glycine* and glycerate levels in the F3 mutants were very similar to plgg1 mutants. These combined with the localization of BASS6 to the chloroplast inner envelope membrane strongly implies that PLGG1 and BASS6 are together responsible for the export of glycolate from chloroplasts.

Figure 11:
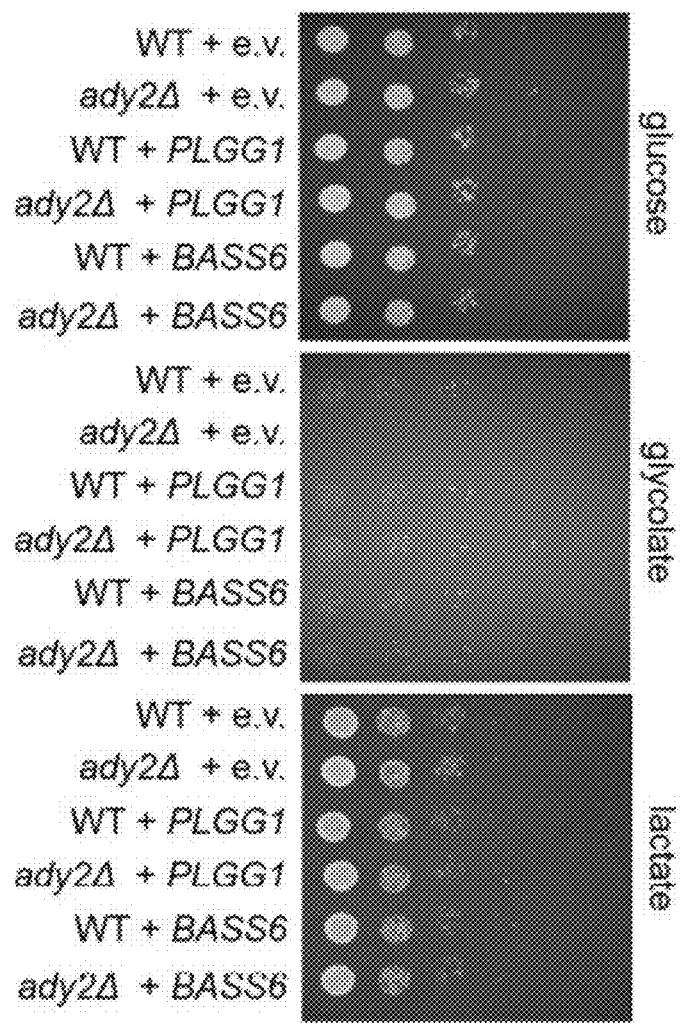
FIG. 11 provides photographs of various yeast strains expressing *A. thaliana* PLGG1 or BASS6 and showing the ability of both proteins to transport glycolate.

Example 5: BASS6 and PLGG1 Rescue Growth of Yeast on Glycolate as a Carbon Source There is no known glycolate transporter in the yeast *Saccharomyces cerevisiae*, but the acetate transporter ADY2 is homologous to *Escherichia coli* yjcG that is known to transport both acetate and glycolate (Gimenez et al., J. Bacteriol., (2003) 185:6448-55). Therefore, we generated yeast vectors expressing both BASS6 and PLGG1 and expressed them in both wild type BY4741 and the isogenic ady2Δ strain. Spot assays to measure growth demonstrated that the ady2Δ strain expressing only empty vector was unable to grow on glycolate as the sole carbon source (FIG. 11). As predicted, the expression of PLGG1 in the ady2Δ yeast strain rescued growth back to the levels of wild type using glycolate as the sole carbon source (FIG. 11). Expression of the Bass6 gene also rescued growth in the ady2Δ strain, evidence that BASS6 can also complement for glycolate transport (FIG. 11). Controls using glucose and lactate as a carbon source show that the expression of BASS6 and PLGG1 in yeast does not negatively affect growth and that the ady2Δ strain can utilize both sources of carbon (FIG. 11).

Figure 12:
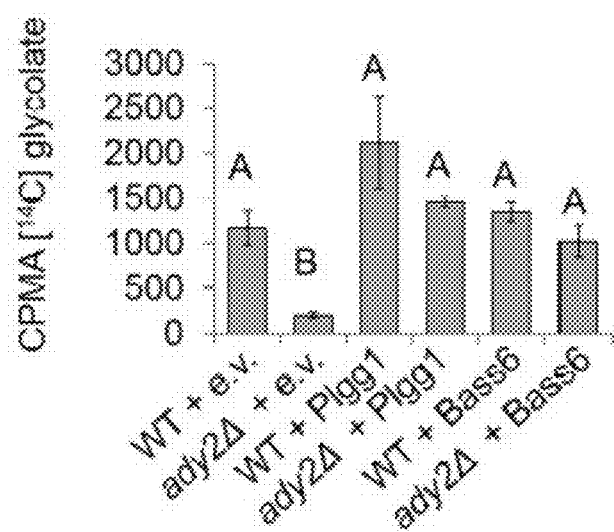
FIG. 12 provides a graph showing the ability of various yeast strains expressing *A. thaliana* PLGG1 or BASS6 to take up radio-labeled glycolate. Error bars indicate standard deviation and letters indicate statistical differences based on ANOVA analysis N=3.

Based on the findings that BASS6 and PLGG1 can complement yeast for growth on glycolate as a carbon source we sought to determine the transport capabilities of both proteins. To test transport characteristics of BASS6 and PLGG1 expressed in yeast we performed uptake experiments using [$^{14}$C]-glycolic acid. [$^{14}$C]-glycolic acid was incubated for 10 minutes before quenching and scintillation counting. The expression of PLGG1 protein showed an increase in the capacity for uptake of glycolate in both wild type and the ady2Δ strain (FIG. 12) as did the expression of BASS6 protein (FIG. 12). The data indicate that both BASS6 and PLGG1 expressed in yeast facilitate transmembrane glycolate transport leading to rescue of the growth in glycolate uptake defective ady2Δ mutant (FIG. 12).

Example 6: Effects on Gene Expression

Figure 2:
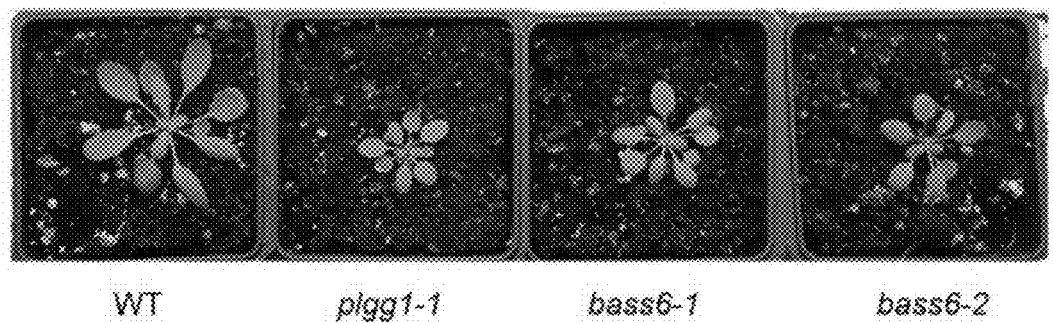
FIG. 2 provides photographs of representative bass6 and plgg1 mutants compared to wild-type *A. thaliana* grown at ambient $CO_2$ (8 weeks 400 ppm $CO_2$ at 8 h light/16 h dark cycle (22° C./18° C.) at 250 $\mu mol \cdot m^{-2} \cdot s^{-1}$ light intensity in growth chambers)
Figure 13:
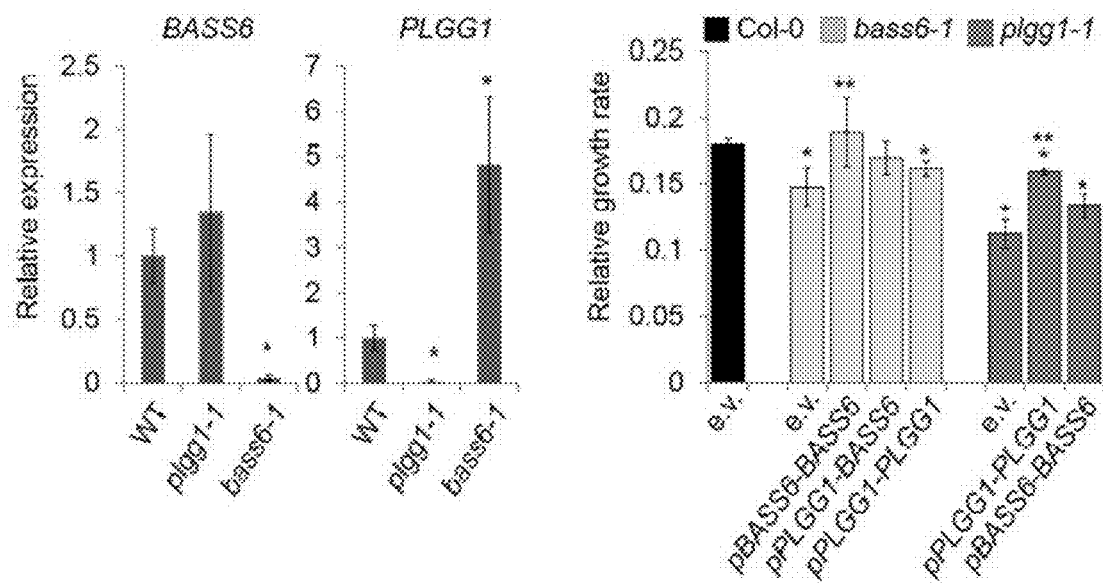
FIG. 13 provides graphs demonstrating some of the genetic regulatory mechanisms controlling expression of BASS6 and PLGG1. Expression of Bass6 and Plgg1 in leaf tissue was determined in the plgg1-1 and the bass6-1 mutants by qRT-PCR analysis. In the left panel, error bars indicate standard error of the mean from 3 biological replicates including 3 technical replicates each. Asterisk indicates significant change (p<0.05). Relative growth rate of indicated *Arabidopsis* transgenic lines are shown in the right panel. Error bars indicate standard deviation of at least 5 plants per 3 biological replicates. Asterisk (*) indicates significant difference between transgenic lines grown under ambient air conditions. Statistical difference based on Student's T-test.

The loss of either Bass6 or Plgg1 in *Arabidopsis* leads to a photorespiratory mutant phenotype with reduced growth rates compared to wild type in ambient or lower [$CO_2$] air (FIG. 2). In addition, double mutant plants lacking the expression of BASS6 and PLGG1 further reduced the plant's ability to grow (FIG. 6A). Although the loss of either BASS6 or PLGG1 resulted in a photorespiratory phenotype, neither T-DNA insertion line was lethal when grown in ambient air as seen with numerous other photorespiratory mutants. This could be due to redundancy in the transport processes and compensation for loss of one gene by the increase in expression of another. To test if the loss of Bass6 or Plgg1 results in changes in expression of the other gene, Real-Time PCR (RT-PCR) experiments were performed. In the plgg1-1 line when compared to wild type there was no detectable difference in Bass6 expression (FIG. 13). However, the expression of Plgg1 was increased 4.8 fold over wild type in the bass6-1 line suggesting that Plgg1 expression markedly increased to compensate for metabolic changes caused by the loss of BASS6 (FIG. 13). After determining that Plgg1 expression increased in the bass6-1 plants, it was hypothesized that the change in Plgg1 expression is the reason there is a less severe phenotype observed in bass6-1 compared to plgg1-1. This led to testing whether the expression of either Bass6 or Plgg1 could potentially complement the slow growth phenotype of each of the single mutants.

Also, to rule out the possibility that either the plgg1-1 or the bass6-1 line phenotypes were due to another mutation, Plgg1 and Bass6 were also transformed into the plgg1-1 and the bass6-1 lines under the control of their native promoters. Expression of Bass6 under the control of its own promoter or the control of the Plgg1 promoter rescues the growth rate phenotype in the bass6-1 line, confirming the loss of BASS6 is the cause of the photorespiratory phenotype (FIG. 13). In addition, expression of Plgg1 under the control of its own promoter, rescues its photorespiratory phenotype (FIG. 13). However, transforming the expression plasmid of Plgg1 into the bass6-1 line showed no significant change in growth rate compared to the bass6-1 mutant (FIG. 13). This could be due to the fact that too much expression of PLGG1 can have a negative impact on plant growth and that the expression of the endogenous Plgg1 gene is already increased compared to wild type (Yang et al., supra; FIG. 13). Intriguingly, expression of Bass6 under the control of its native promoter somewhat increased the growth rate of the plgg1-1 line compared to the empty vector but was not completely rescued back wild type level (FIG. 13).

Example 7: Enhancing Glycolate Flux Through Synthetic Bypass Pathways to Increase Plant Growth and Yield Plant Material

*Nicotiana tabacum* c.v. "*Petite Havana*" was transformed using *Agrobacterium tumefaciens* mediated transformation using standard methodology (Glowacka et al, Plant Cell Environ., (2016) 39:908-17) with 18 binary plasmids were assembled as described and listed in Table 5. The following abbreviations are utilized in the table: (TSR) tartonic semialdehyde reductase, (Spm) Maize Supressor-mutator transposable element promoter, (RbcS) Rubisco small subunit promoter and signal peptide, (Ocs) *Agrobacterium* opine synthase, (GdD) *E. coli* glycolate dehydrogenase subunit D, (Act2) Actin 2 promoter and terminator, (35s) Cauliflower mosaic virus 35s promoter and terminator, (Pgm) Phosphoglucomutase signal peptide, (GdE) *E. coli* glycolate dehydrogenase subunit E, (GdF) *E. coli* glycolate dehydrogenase subunit F, (Gcl) glyoxylate carboligase, (GO) glycolate oxidase, (MS) malate synthase, (Cat) Catalase, (Nos) *Agrobacterium* Nopine synthase promoter and terminator, (2×35S) double 35s promoter, (Ubi) Ubiquitin promoter.

Bypass pathway 1 genes originated from *E. coli* and bypass pathway 2 genes originated from plant and *E. coli* sources as reported previously (Kebeish et al, Nat. Biotechnol. (2007) 25:593-99; Maier et al, Front. Plant Sci., (2012)). We developed a different pathway, Bypass pathway 3, utilizing genes originating from *Chlamydomonas reinhardtii* for glycolate dehydrogenase (SEQ ID NO: 44) and a gene originating from *Cucurbita maxima* for malate synthase (SEQ ID NO: 42). Along with these genes, we developed an RNAi module that targets the plastidic glycolate/glycerate transporter PLGG1 from *A. thaliana* that was designed using 300 bp of exon sequence (SEQ ID NO: 46) derived from the Sol genomics network (solgenomics.net). All binary plasmids contained the BASTA resistance (bar) gene as a selectable marker for plant transformation. A minimum of 10 independent $T_0$ transformations were generated to produce $T_1$ progeny. T-DNA copy number was determined on $T_1$ either by digital droplet PCR analysis or through qRT-PC analysis (iDNA genetics, Norwich UK). From these results a minimum of 5 independent transformation events were selected to self and produce $T_2$ progeny. Copy number analysis was performed again to verify single insert homozygous lines for each transformation event.

TABLE 5

Synthetic glycolate utilization pathways

| Plasmid | Inserted gene | Promoter | Signal peptide | Terminator |
|---|---|---|---|---|
| Bypass 1 | | | | |
| EC27180 | TSR | Spm | RbcS | Ocs |
| | GdD | RbcS | Pgm | Mas |
| | GdE | Act2 | RbcS | Act2 |
| | GdF | 35 s | Pgm | Act2 |
| | Gcl | 2 × 35 s | Pgm | 35 s |
| EC27181 | Gcl | Spm | RbcS | Ocs |
| | TSR | RbcS | Pgm | Mas |
| | GdD | Act2 | RbcS | Act2 |
| | GdE | 35 s | Pgm | Act2 |
| | GdF | 2 × 35 s | Pgm | 35 s |

TABLE 5-continued

Synthetic glycolate utilization pathways

| Plasmid | Inserted gene | Promoter | Signal peptide | Terminator |
|---|---|---|---|---|
| EC27182 | GdF | Spm | RbcS | Ocs |
|  | Gcl | RbcS | Pgm | Mas |
|  | TSR | Act2 | RbcS | Act2 |
|  | GdD | 35 s | Pgm | Act2 |
|  | GdE | 2 × 35 s | Pgm | 35 s |
| EC27183 | GdE | Spm | RbcS | Ocs |
|  | GdF | RbcS | Pgm | Mas |
|  | Gcl | Act2 | RbcS | Act2 |
|  | TSR | 35 s | Pgm | Act2 |
|  | GdD | 2 × 35 s | Pgm | 35 s |
| EC27184 | GdD | Spm | RbcS | Ocs |
|  | GdE | RbcS | Pgm | Mas |
|  | GdF | Act2 | RbcS | Act2 |
|  | Gcl | 35 s | Pgm | Act2 |
|  | TSR | 2 × 35 s | Pgm | 35 s |
| EC27186 | TSR | Spm | RbcS | Ocs |
|  | GdD | RbcS | Pgm | Mas |
|  | GdE | Act2 | RbcS | Act2 |
|  | GdF | 35 s | Pgm | Act2 |
|  | Gcl | 2 × 35 s | Pgm | 35 s |
|  | PLGG1 RNAi | Ubi |  |  |
| EC27187 | Gcl | Spm | RbcS | Ocs |
|  | TSR | RbcS | Pgm | Mas |
|  | GdD | Act2 | RbcS | Act2 |
|  | GdE | 35 s | Pgm | Act2 |
|  | GdF | 2 × 35 s | Pgm | 35 s |
|  | PLGG1 RNAi | Ubi |  |  |
| EC27188 | GdF | Spm | RbcS | Ocs |
|  | Gcl | RbcS | Pgm | Mas |
|  | TSR | Act2 | RbcS | Act2 |
|  | GdD | 35 s | Pgm | Act2 |
|  | GdE | 2 × 35 s | Pgm | 35 s |
|  | PLGG1 RNAi | Ubi |  |  |
| EC27189 | GdE | Spm | RbcS | Ocs |
|  | GdF | RbcS | Pgm | Mas |
|  | Gcl | Act2 | RbcS | Act2 |
|  | TSR | 35 s | Pgm | Act2 |
|  | GdD | 2 × 35 s | Pgm | 35 s |
|  | PLGG1 RNAi | Ubi |  |  |
| EC27194 | GdD | Spm | RbcS | Ocs |
|  | GdE | RbcS | Pgm | Mas |
|  | GdF | Act2 | RbcS | Act2 |
|  | Gcl | 35 s | Pgm | Act2 |
|  | TSR | 2 × 35 s | Pgm | 35 s |
|  | PLGG1 RNAi | Ubi |  |  |
| Bypass 2 |  |  |  |  |
| EC27171 | GO | Nos | pgm | Nos |
|  | MS | Spm | RbcS | Ocs |
|  | CAT | 2 × 35 s | pgm | 35 s |
| EC27172 | CAT | Nos | pgm | Nos |
|  | GO | Spm | RbcS | Ocs |
|  | CmMS | 2 × 35 s | pgm | 35 s |
| EC27173 | CmMS | Nos | pgm | Nos |
|  | CAT | Spm | RbcS | Ocs |
|  | GO | 2 × 35 s | pgm | 35 s |
| EC27174 | GO | Nos | pgm | Nos |
|  | CmMS | Spm | RbcS | Ocs |
|  | CAT | 2 × 35 s | pgm | 35 s |
|  | PLGG1 RNAi | Ubi |  |  |
| EC27175 | CAT | Nos | pgm | Nos |
|  | GO | Spm | RbcS | Ocs |
|  | CmMS | 2 × 35 s | pgm | 35 s |
|  | PLGG1 RNAi | Ubi |  |  |
| EC27176 | CmMS | Nos | pgm | Nos |
|  | CAT | Spm | RbcS | Ocs |
|  | GO | 2 × 35 s | pgm | 35 s |
|  | PLGG1 RNAi | Ubi |  |  |
| Bypass 3 |  |  |  |  |
| EC27200 | CrGDH | Act2 | RbcS | Act2 |
|  | CmMS | Spm | RbcS | Ocs |
| EC27201 | CrGDH | Act2 | RbcS | Act2 |
|  | CmMS | Spm | RbcS | Ocs |
|  | PLGG1 RNAi | Ubi |  |  |

Chlorophyll Fluorescence Measurements

Tobacco seeds were germinated under ambient air conditions on Murashige and Skoog (MS) plates with essential vitamins in a controlled environment chamber (Environmental Growth Chambers, Chagrin Falls, Ohio, USA) with 14 h day (25° C.)/10 h night (22° C.) and light intensity of 500 µmol m$^{-2}$ s$^{-1}$. Eight days after germination, seedling plates were transferred to a custom assembled low $CO_2$ chamber inside the controlled environment growth chamber. The light levels were increased to 1200 µmol m$^{-2}$ s$^{-1}$ for 24 hours and $CO_2$ concentration was maintained below 35 µbar. Fv'/Fm' was determined on each plate using the CF Imager Technologica (www.technologica.co.uk). Maximum flash intensity was 6800 µmol·m$^{-2}$ s$^{-1}$ for 800 milliseconds. Image values were obtained for each individual plant by detecting colonies within the fluorimager software program defining each position as has been previously described (South et al, Plant Cell (2017) 29:808-823; Badger et al, Funct. Plant Biol. (2009) 36:867-73; Schmidt & Delaney, Mol. Genet. Genomics (2010) 283:233-41).

Gene Expression and Protein Detection

Plants were grown under greenhouse or field conditions described below. Five leaf discs were harvested from three plants per line (2.9 cm$^2$, ~100 mg). RNA and protein were extracted from the same leaf samples using the NucleoSpin RNA/Protein kit (Macherey-Nagel GmbH & Co. KG, Düren, Germany). cDNA was generated from extracted RNA using the Quantinova reverse transcriptase kit (QIAGEN, USA). A minimum of three biological replicates including three technical replicates each were used for all samples. Gene expression was analyzed using a Bio-Rad CFX connect real-time PCR system (Bio-Rad Laboratories, USA). Relative changes in transcript were determined using the ΔΔCt method using primers directed toward the transgene transcripts and the L25 gene as a standard control gene (Brooks & Farquhar, Planta (1985) 165:397-406. cDNA was amplified using a SSO advanced SYBR green master mix (Bio-Rad) and primer sequences are described in Table 6.

TABLE 6

Primers for gene expression analysis

| Primer Name | SEQ ID NO: | Sequence |
|---|---|---|
| L25 RT F | SEQ ID NO: 22 | CCCCTCACCACAGAGTCTGC |
| L25 RT R | SEQ ID NO: 23 | AAGGGTGTTGTTGTCCTCAATCTT |
| PLGG1 Nt RT-1F | SEQ ID NO: 24 | CTCAAATAAAGTTGAAATCCTTAC AAAC |
| PLGG1 Nt RT-2R | SEQ ID NO: 25 | TCTTGGTAGGGATGAATTGGAC |
| RT-MS-001F | SEQ ID NO: 26 | GGGAATCTGAGTGGACATGTG |
| RT-MS-002R | SEQ ID NO: 27 | CCAGAATTGAGTGCGTTGATG |
| RT-GO-001F | SEQ ID NO: 28 | ACAGAAACGCTTTTGCAAGG |
| RT-GO-002R | SEQ ID NO: 29 | GGTGAGCCATCTTTTGCATG |
| RT-CAT-001F | SEQ ID NO: 30 | GCGAGAAAATCACCCACTTTG |
| RT-CAT-002R | SEQ ID NO: 31 | TGGCTGGAAATAACCGTGAG |
| RT-TSR-001F | SEQ ID NO: 32 | TGAATTACTGTCGCTGGGC |
| RT-TSR-002R | SEQ ID NO: 33 | GTACAACCATTTTCACCGAACAG |
| RT-GCL-001F | SEQ ID NO: 34 | ATCAATCCGTTCTACTCAGCG |

TABLE 6 -continued

Primers for gene expression analysis

| Primer Name | SEQ ID NO: | Sequence |
|---|---|---|
| RT-GCL-002R | SEQ ID NO: 35 | GACATACGCCGATATTCCCTG |
| RT-GdD-001F | SEQ ID NO: 36 | GGAGGTAGCATCTTGTACGAAG |
| RT-GdD-002R | SEQ ID NO: 37 | CGGTATGCAGGATCTCAAGTC |
| RT-GdE-001F | SEQ ID NO: 38 | CGAGTGTGATTACAGCCAGG |
| RT-GdE-002R | SEQ ID NO: 39 | TGACAACGAACATCCAGCG |
| RT-GdF-001F | SEQ ID NO: 40 | CTGTGTTCACTGCGGATTTTG |
| RT-GdF-002R | SEQ ID NO: 41 | CTCCTGTGTTTTAAGCGTGAC |

Total protein from Bypass 3 was extracted using the Nucleospin protein/RNA kit above, or from frozen leaf material ground in liquid nitrogen, resuspended in lysis buffer (50 mM Hepes pH 7.6, 300 mM sucrose, 2 mM $MgCl_2$) plus plant protease inhibitor cocktail (Sigma-Aldrich). Protein was quantified using the protein quantification assay (Macherey-Nagel GmbH & Co. KG, Düren, Germany). 3 µg of protein was loaded per lane and separated by SDS-polyacrylamide electrophoresis (SDS-PAGE). PAGE gels were transferred to PVDF membranes (Immobilon-P, Millipore, USA) using a Bio-Rad semi-dry transfer system. After blocking in a 6% milk TBS-T solution, membranes were incubated with custom antibodies raised against the malate synthase (MS) and PLGG1 (Agrisera, Vannas, Sweden) and glycolate dehydrogenase (GDH) (Genscript, USA). As a protein loading control a commercial antibody raised against the large subunit of Rubisco (RbcL) was used (Agrisera, Vännäs, Sweden). After subsequent washing and incubation with anti-rabbit secondary antibody (Bio-Rad, USA) Chemiluminescence was detected using the ImageQuant LAS4010 scanner (GE Healthcare Life Sciences, Pittsburgh, USA).

Growth Analysis (Greenhouse)

To determine if the three bypasses to photorespiration would result in increased growth capacity and growth rate, stem height, and dry weight biomass was determined. Single insert $T_2$ seeds were germinated on LC1 sunshine mix (Sun Gro 202 Horticulture, Agawam, MA, USA). 10 days after germination seedlings were transferred to 4 L pots (400C, Hummert International, Earth City, MO, USA) with LC1 sunshine mix supplemented with slow release fertilizer ((Osmocote Plus 15/9/12, The Scotts Company LLC, Marysville, OH, USA). Pots were randomized within the greenhouse and positions were changed before each watering. Light intensity within the greenhouse was measured using a quantum sensor (LI-190R, LI-COR, Lincoln, Nebraska, USA). Air temperature, relative humidity and [CO2] were measured using a combined temperature and humidity sensor (HMP60-L, Vaisala Oyj, Helsinki, Finland) and an infrared gas analyzer (SBA-5, PPsystems, Amesbury, MA, USA). All climate data was logged using a data logger (CR1000, Campbell Scientific Inc, Logan, UT, USA). Greenhouse growth conditions utilized were similar to those previously reported in the literature (Kromdijk et al, supra). Above ground biomass was harvested at seven weeks after determination of stem height and dried for 2 weeks and dry weight was determined for each fraction.

2016 Field Experiment

As a proof of concept experiment, the effect of each photorespiration bypass design was evaluated under field conditions for the 2016 season in central Illinois. Five independent transformation events of Bypass 3 four events of Bypass 1 and due to poor performance compared to WT, only two independent transformations of bypass 2, with two wild type (WT) and two empty vector (EV) controls were planted in a randomized block design. Homozygous single insert $T_2$ seeds were germinated in pots containing soil mix (Sun Gro 202 Horticulture, Agawam, MA, USA) on May 14, 2016 and grown for seven days then transferred to floating trays as previously described (Kromdijk et al, Science (2016) 354:857-61). Plants were transplanted to the University of Illinois Energy Farm field station (40.11° N, 88.21 261° W, Urbana, IL, USA) on Jun. 6, 2016 after the field was prepared as described (Kromdijk et al, supra). Each block was 6×6 spaced 30 cm apart. The internal 16 plants per block were the indicated transgenic plant lines surrounded by a WT border. An additional two row border of WT plants surrounded the experiment. Watering was provided as needed from six water towers placed within the plot. Weather data, including Light intensity, air temperature, and precipitation were measured for the 2016 field season as described (data not shown).

Apparent quantum efficiency of photosynthesis (Φa) including the light saturated level of photosynthesis at ambient 400 µbar and low 100 µbar $CO_2$ concentrations was measured on the youngest fully expanded leaf 14-20 days after transplanting to the field. Φa was determined from assimilation measurements in response to light levels at the indicated [$CO_2$]. Gas exchange measurements were performed using a LI-COR 6400XT with a 2 $cm^2$ fluorescence measuring cuvette with gasket leaks corrected for as outlined in the manual (LI-COR Biosciences, Lincoln, NE, USA). Measurements of $CO_2$ assimilation were done at light intensities of 1200, 380, 120, 65, 40, 30, 25, 18, and 10 $\mu mol \cdot m^{-2} \cdot s^{-1}$, assimilation was recorded after a minimum of 120 seconds at each light level. Φa was calculated from the slope of the initial response of assimilation at low light levels. The saturating level of assimilation ($A_{sat}$) was determined from the 1200 $\mu mol \cdot m^{-2} \cdot s^{-1}$ measurement at the indicated [$CO_2$]. Stem height, leaf and stem biomass was determined for 8 plants per plot at 7 weeks post planting. After stem height was assessed, above ground biomass was harvested and separated into leaf and stem fractions. Plant material was dried for a minimum of 2 weeks prior to biomass measurements.

2017 Field Experiment

To get a more accurate evaluation of the effect of Bypass 3 on plant productivity under agricultural conditions a repeated randomized block design was used for the 2017 field season. The field plot consisted of five replicate blocks with seven randomized 6×6 plots per block. The central 16 plants were the tested transgenic lines, or WT surrounded by a WT border. The entire 35 plots were surrounded by additional rows of WT as a border. Single insert homozygous lines from the same harvest were sown on LC1 sunshine mix and germinated for seven days. After seven days, seedlings were transplanted to floating trays as described above. 14 days after transplant to floating trays, plants were transplanted to the Energy farm field station at the University of Illinois, Urbana, IL USA on Jun. 21, 2017. Watering was provided as needed using parallel drip irrigation (drip line). Weather data, including Light intensity, air temperature, and precipitation were recorded for the 2017 field season. Photosynthesis measurements to determine the Φa were performed Jul. 2-5, 2017 along with photosynthetic pigments harvested during the same time on the youngest fully expanded leaf.

Φa was performed as previously described (Kromdijk et al., supra). Briefly, gas exchange measurements were performed using a LI-COR 6400XT with a 2 cm² fluorescence measuring cuvette as described above. Measurements of $CO_2$ assimilation response to light were started pre-dawn and were performed at light intensities of 0, 10, 18, 25, 30, 40, 65, 120, 380, 1200, and 2000 µmol mol⁻¹. Diurnal measurements of photosynthesis were performed starting pre-dawn on July 14 and measured every two hours on two plants per block. Light levels and temperature were determined prior to measurements based on incoming light levels using a PAR sensor on the LI-COR 6400 and built in temperature sensor. $CO_2$ concentration was maintained at 400 ppm. Diurnal measurements were continued until after dusk. At 49 days post germination, eight plants per plot were harvested from all five replicate blocks. Above ground biomass was separated into leaf and stem fractions and dried for 2 weeks before biomass measurements. For starch analysis, 10 mg of leaf material collected on July 14$^{th}$ was frozen in liquid nitrogen and stored at −80° C. until processing. Starch was assayed using the Enzychrom starch assay kit (bioassay systems, Hayward, CA, USA). Colorimetric measurements were performed on a Biotek synergy HT plate reader (Biotek Winooski, VT, USA).

Gas Exchange

To determine the net photosynthetic assimilation rate from a $CO_2$ dose response the fifth leaf from the base of seven-week-old *N. tabacum* plants were clamped into the fluorescence cuvette of a LI-COR 6800 infrared gas analyzer (Li-Cor Biosciences, Lincoln, NE, USA) with leaf temperature controlled at 25° C. and light intensity set at 1500 µmol m⁻² s⁻¹. Leaves were acclimated at 400 µmol mol⁻¹ to achieve a steady state. The $CO_2$ concentration of the response curve was set at 400, 200, 100, 50, 30, 400, 600, 800, 1000, 1500, 2000 µmol mol⁻¹ and measurements were taken when assimilation reached a steady state. To determine the maximum rate of carboxylation ($V_{cmax}$), maximum electron transport rate ($J_{max}$) and mitochondrial respiration rate a model for leaf photosynthesis with temperature corrections was used assuming infinite mesophyll conductance from the collected $CO_2$ response curves. Γ* and $R_d$ measurements using the common intersection method Gas exchange was performed using a LI-COR 6800 (LI-COR Biosciences) using a fluorescence chamber. Γ* was measured using the common intersection method by measuring the $CO_2$ response of photosynthesis under various sub-saturating irradiances. The common intersection was determined using slope-intercept regression to produce more accurate and consistent values of Ci* and $R_d$ (Walker et al, Plant Cell Environ. (2016) 39:1198-1203). Plants were acclimated under 250 µmol m⁻² s⁻¹ light at 150 µBar $CO_2$ until photosynthesis reached steady and measured at 150, 120, 90, 70, 50, and 30 µBar $CO_2$ under irradiances of 250, 165, 120, 80, and 50 µmol m⁻² s⁻¹. The x-intersection point was converted to Γ* as previously reported (Walker et al, supra).

Statistical Analysis

All statistical analysis was performed using Origin pro 2016 (version 9.3.226, Origin lab corporation Northampton, MA, USA). For Fv'/Fm' measurements, each plate contained a minimum of 10 seedlings and data indicates average values. Significance was evaluated by one-way analysis of variance (ANOVA). Relative changes in gene expression were analyzed by one-way ANOVA with three technical replicates per biological replicate from either greenhouse or field grown samples. Greenhouse biomass and stem height experiments were analyzed by a one-way ANOVA with a minimum of 8 biological replicates. Biomass and Stem height experiments from the 2016 field season were analyzed by a one-way ANVOA with 8 biological replicates. Biomass data from the 2017 field season was analyzed by a two-way ANOVA (genotype x block) with 8 biological replicates per genotype per block. Greenhouse photosynthetic measurements were analyzed by a one-way ANOVA and three biological replicates per measurement and field photosynthetic measurements were analyzed by a two-way ANOVA with two plant replicates per plot and five randomized replicate blocks. All ANOVA testing was performed with a P<0.05 or smaller as indicated in figures. All ANOVA analysis was followed with a Tukey's post-hoc test for means comparison.

Results and Analysis

*Nicotiana tabacum* was transformed with three different photorespiration bypass designs expressing as many as 5 genes (FIG. 14, Table 5). Bypass 1 and Bypass 2 were previously reported in the literature. However, the newly developed Bypass 3 was designed utilizing the *Chlamydomonas reinhardtii* glycolate dehydrogenase (SEQ ID NO: 45) instead of glycolate oxidase which beneficially does not produce hydrogen peroxide as a byproduct during the conversion of glycolate to glyoxylate (Abolemy et al, Plant Physiol. Biochem. (2014) 79:25-30).

Unlike the testing of single gene inserts, multigene constructs may need increased coordination of gene expression to optimize flux through the designed pathway. Without a priori knowledge of the promoter gene combinations that optimize efficacy of photorespiration bypass, we utilized multiple promoter gene combinations for the reported photorespiratory bypass designs, five iterations of bypass 1, three iterations of Bypass 2 and a single iteration of Bypass 3 were generated (Table 5). In addition to the expression of the photorespiratory bypass genes, a long hairpin RNAi construct (SEQ ID NO: 46) was designed and added to the library of multigene constructs to reduce the expression of the chloroplast glycolate/glycerate transporter PLGG1 with the goal of increasing flux through the bypass pathways (FIG. 14, Table 5). In total, 17 of 18 independent constructs designed were successfully transformed and examined to test the function of Bypass 1, 2, and 3, with and without the inclusion of an RNAi module targeting the PLGG1 transporter.

Figure 15A:
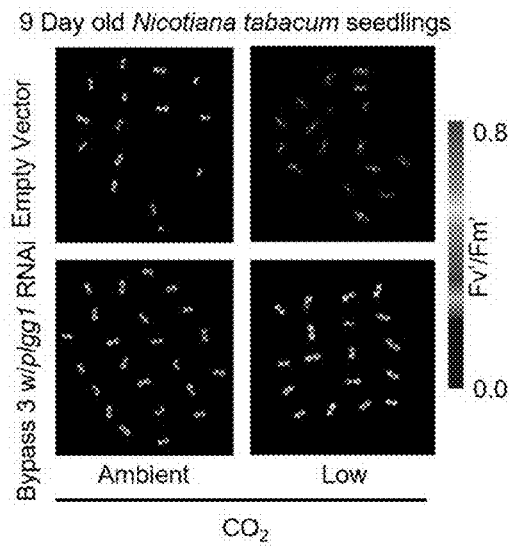
FIG. 15A-15B.
Figure 15B:
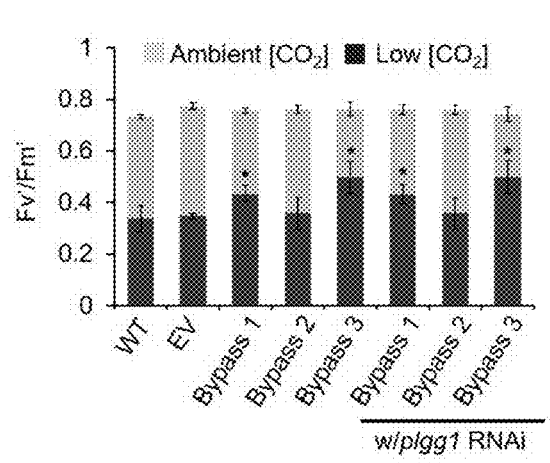

Photorespiratory stress induced damage to photosystem II can be visualized with chlorophyll fluorescence via decreases in maximal operating efficiency of PSII in the light (i.e. Fv'/Fm') (South et al., supra; Badger et al., supra). Using these changes in fluorescence as an indication of apparent photorespiration efficiency, each photorespiratory bypass design was screened after 24 hours of growth at high light (1200 µmol m⁻² s⁻¹) and near zero concentrations of $CO_2$, and compared to wild-type (WT) and empty vector (EV) controls (FIGS. 15A and 15B). Overall, plants transformed with versions of Bypass 1 and Bypass 3 showed improved apparent photorespiration efficiency compared to WT and EV controls (FIG. 15B). From this initial screen, lines demonstrating enhanced apparent photorespiration efficiency were selected from each design for further characterization in both greenhouse and field settings.

During and after initial assessment of the multiple gene-construct designs, many prototypes demonstrated poor phenotypes, either due to independent insertion, or sub-optimally designed promoter gene combinations, with multiple insertion events having the same detrimental phenotype.

Figure 16A:
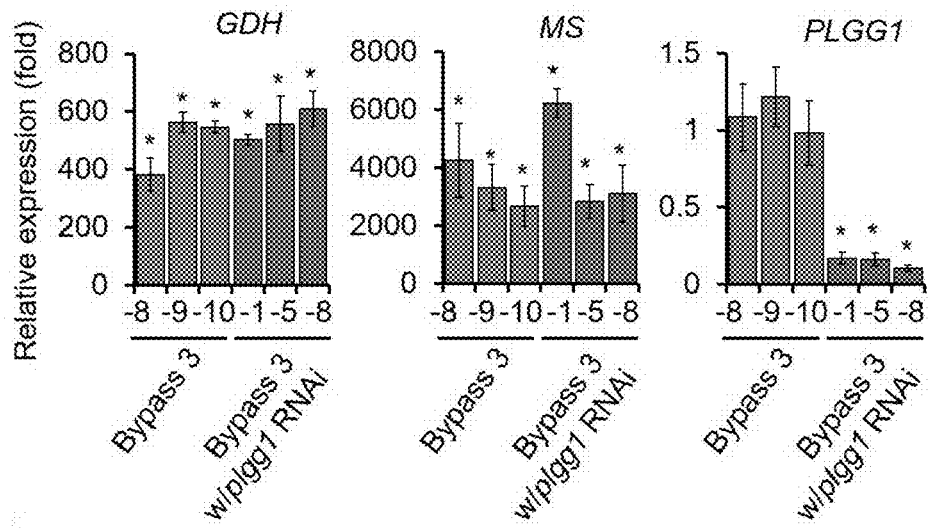
FIG. 16A-16B Gene expression and protein analysis of Bypass 3 lines.
Figure 17A:
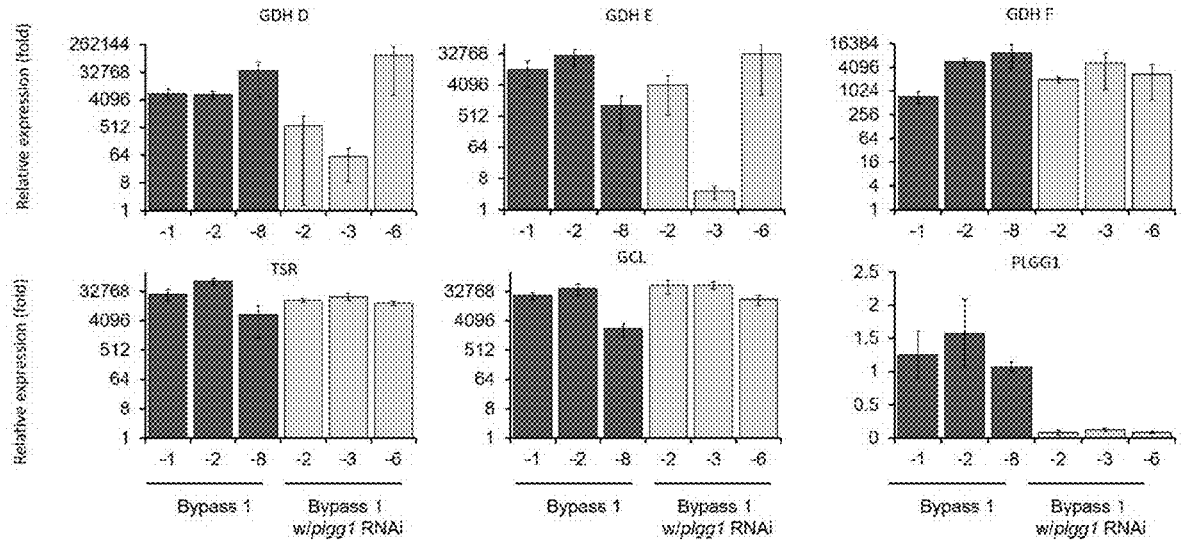
FIG. 17A-17B Gene expression analysis of bypass 1 and 2.
Figure 17B:
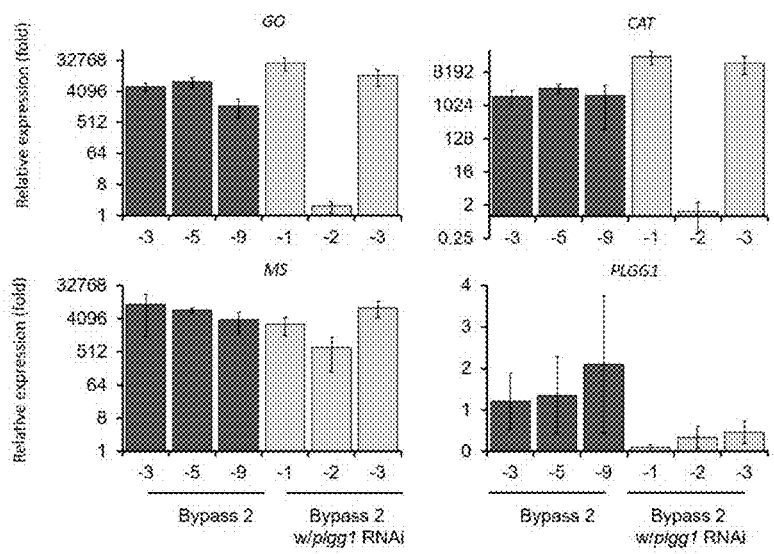
Figure 18A:
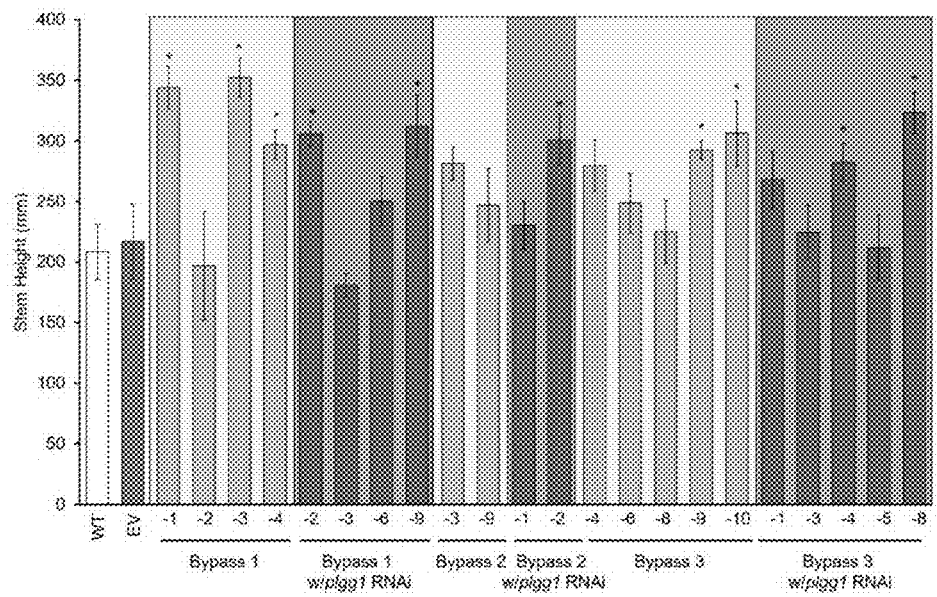
FIG. 18A-18B. Field trial stem height and biomass.
Figure 18B:
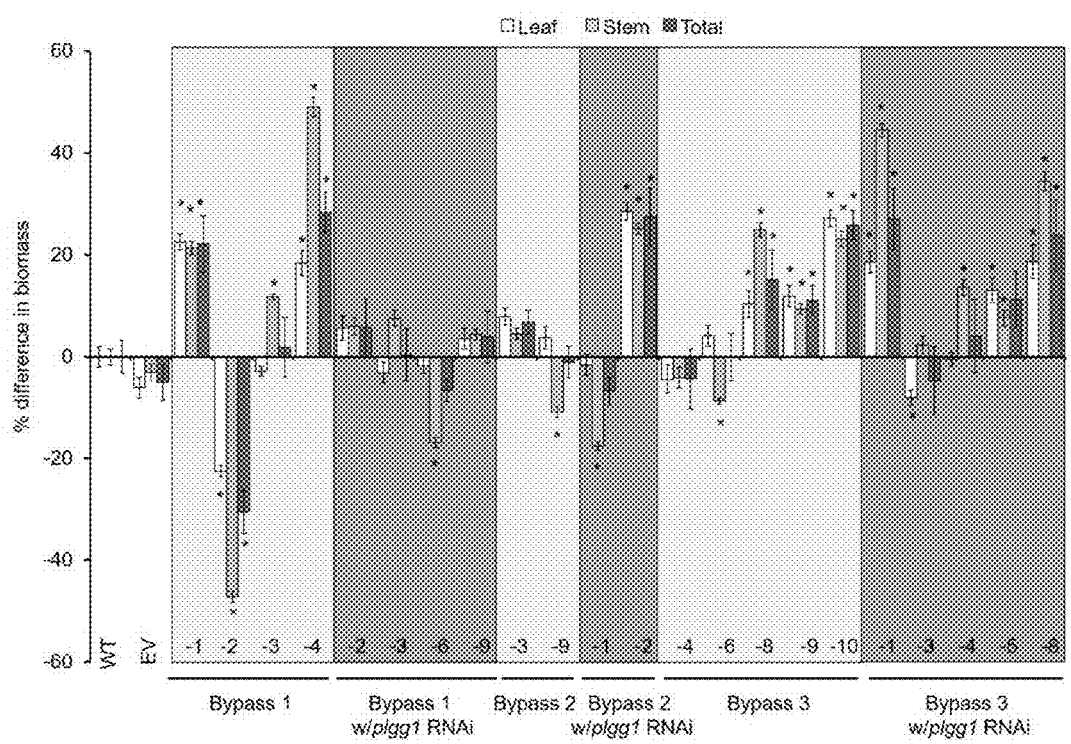
Figure 23:
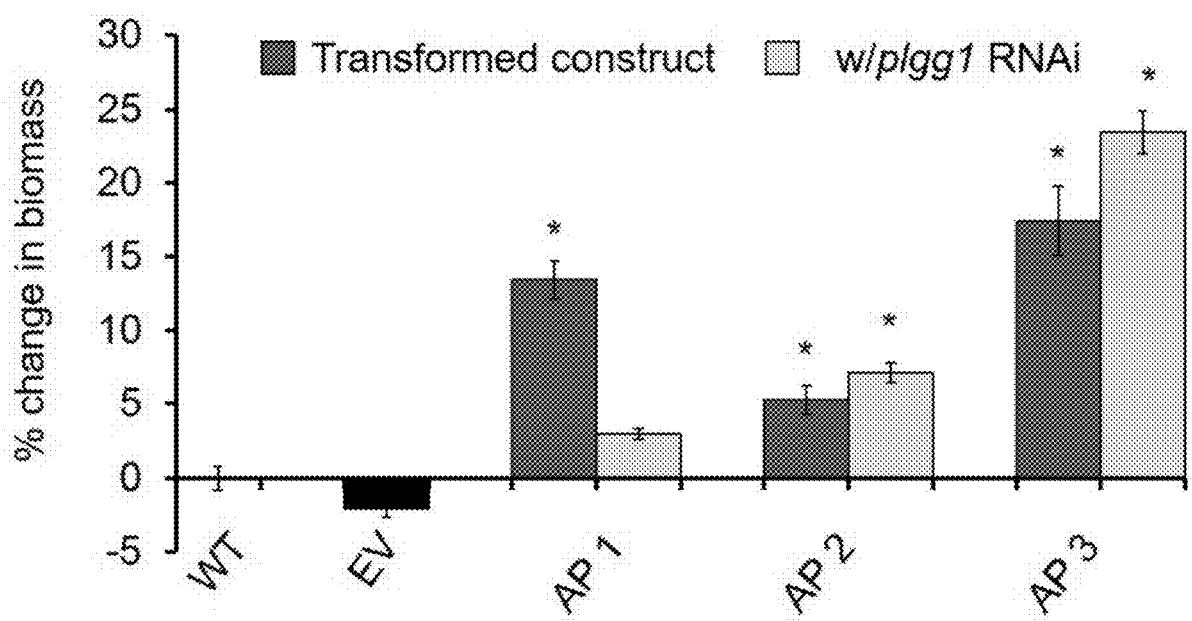
FIG. 23. Photorespiration bypass results in increased biomass under greenhouse conditions. % difference in total dry weight biomass of the indicated plant lines. EV, empty vector; AP1, Bypass 1; AP2, Bypass 2; AP3, Bypass 3. * indicates statistical difference based on one-way ANOVA. Error bars are SEM.

After successful screening, gene expression of the photorespiration bypass pathways was verified for each construct further tested in greenhouse and field trials (FIG. 16A and FIGS. 17A and 17B). A minimum of three independent transformations of each construct design were assessed under greenhouse conditions. We observed increases in dry weight biomass in all three bypass designs, suggesting a successful photorespiration bypass similar to previously reported findings in other plant species (Dalal e al., Biotechnol Biofuels (2015) 8; Kebeish et al., supra; Maier et al., supra; Nolke et al., Plant Biotechnol. J. (2014) 12:734-42; Ahmad et al Plant Biotechnol. Rep. (2016) 10:269-76). Overall, under greenhouse conditions, plants from the novel Bypass 3 exhibited unexpectedly greater differences in biomass than plants from Bypass 1 and 2 lines, and we observed a further enhancement in Bypass 3 when the RNAi module targeting PLGG1 was present, with total biomass increasing by as much as 23% relative to WT and 13% and 7% compared to Bypass 1 and 2 lines, respectively (FIG. 23). When tested under field conditions Bypass 3 with the RNAi targeting PLGG1 again showed the most significant increases in total dry weight biomass by as much as 27% as compared to the WT control (FIG. 18B).

Figure 19A:
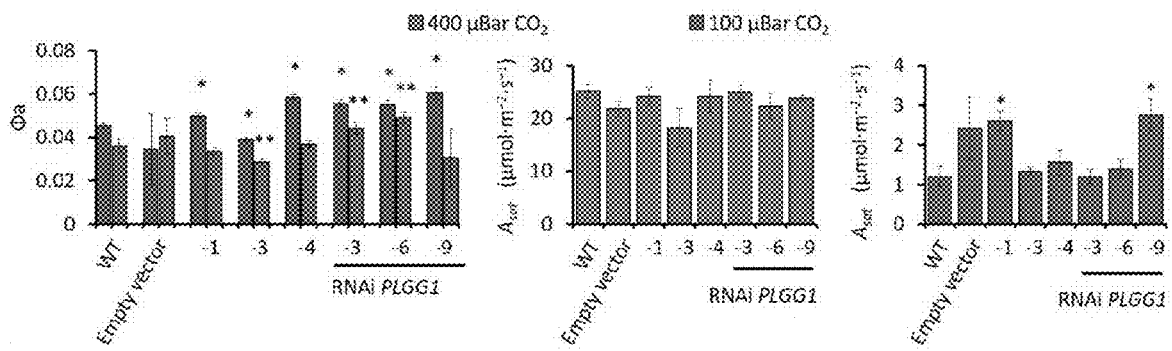
FIG. 19A-19C. Field trial photosynthetic efficiency.
Figure 19B:
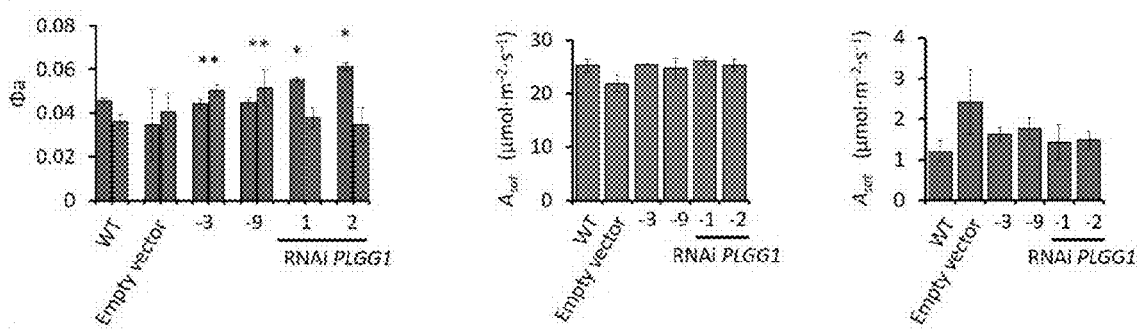
Figure 19C:
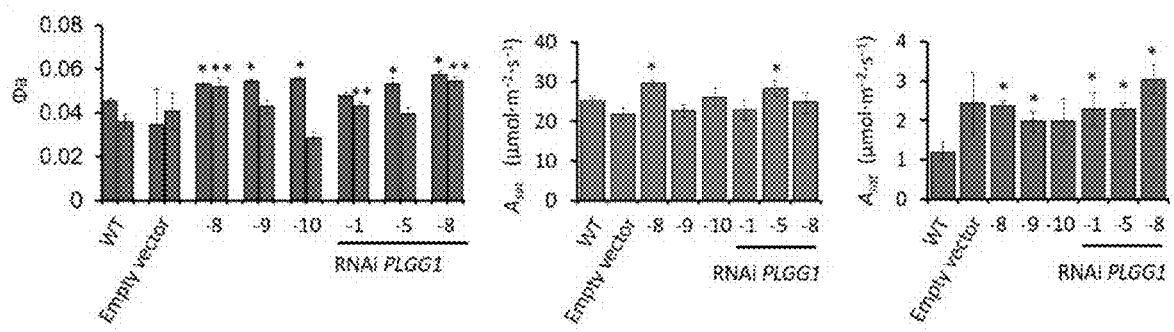

Promising lines from greenhouse trials were then tested for increased photosynthetic efficiency and plant productivity under agricultural conditions in a single block replicated garden plot experiment in 2016. We hypothesized that plants with bypass designs would exhibit increases in the quantum efficiency of photosynthesis (Φa) due to their decreased metabolic flux through the native photorespiratory pathway. Overall, we observed increases in the Φa in plants from all bypass lines, including those containing the RNAi module targeting the PLGG1 transporter (FIG. 19A-19C). We also measured performance under photorespiratory stress (i.e. low [$CO_2$]) conditions, and found that plants from Bypass 3 lines had an increased light-saturated rate and quantum efficiency of photosynthesis, again indicating a lessening of photorespiratory stress associated with a successful bypass design.

Figure 16B:
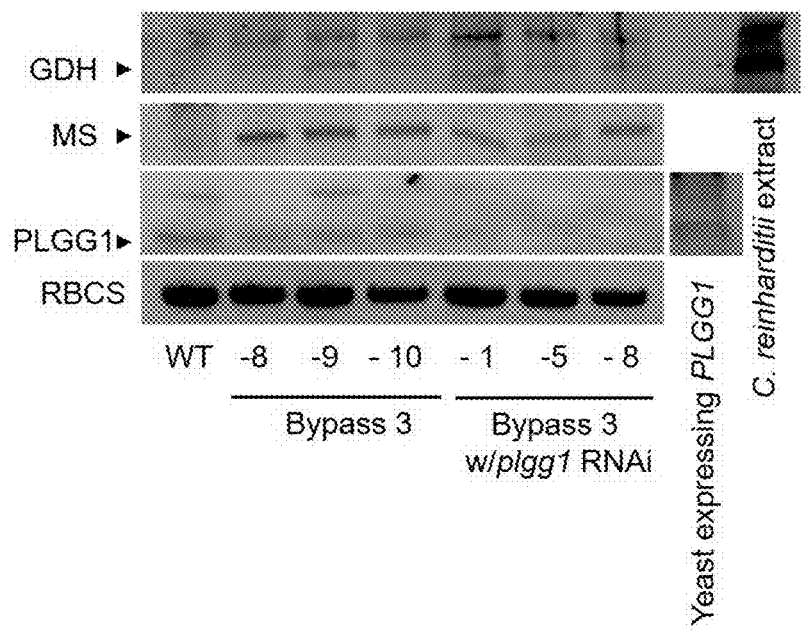
Figure 20A:
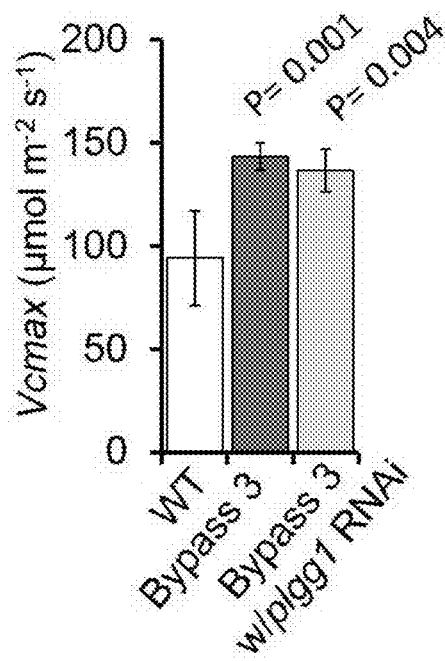
FIG. 20A-20D. Photosynthetic efficiency tested in greenhouse conditions.
Figure 20B:
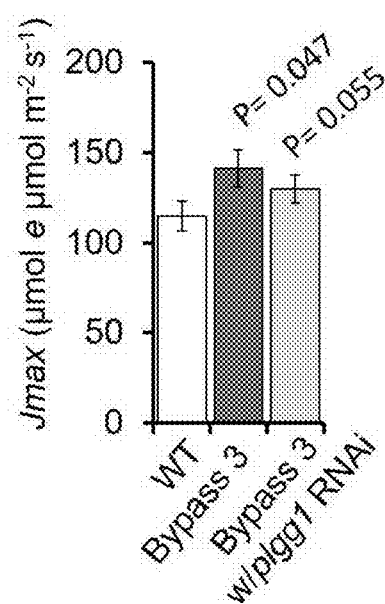
Figure 20C:
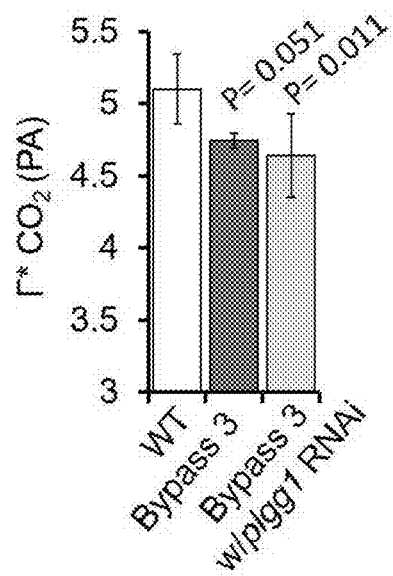
Figure 20D:
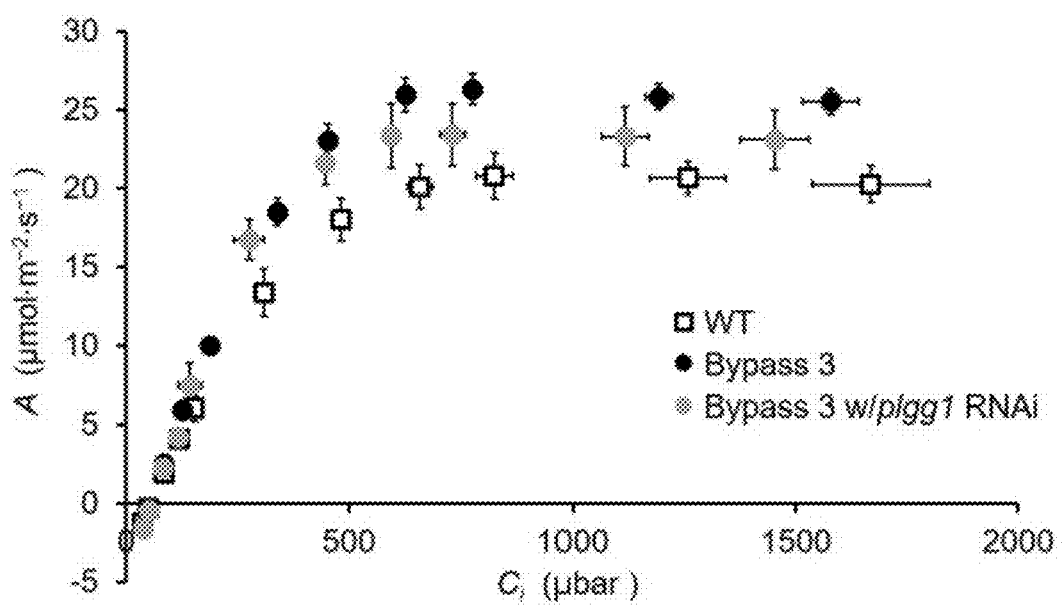

The combined fluorescence screen, greenhouse and 2016 field season studies show that bypass 3 was able to outperform WT, EV, and Bypass 1 and 2 in total plant growth, and this design was carried forward for further characterization. The Bypass 3 design was validated with Western blot analysis to ascertain the presence of CrGDH and MS as well as reduction in PLGG1 protein using custom generated antibodies (FIG. 16B). We further characterized the physiological impact of photorespiration Bypass 3 in planta under greenhouse conditions. We determined the maximum rate of carboxylation ($V_{cmax}$), and the RuBP limited rate of electron transport ($J_{max}$) by modelling photosynthetic rates (A) based on internal $CO_2$ concentration (Ci). Bypass 3, both with and without the PLGG1 RNAi module, demonstrated increases in $V_{cmax}$ and in $J_{max}$ suggesting more efficient photosynthesis at lower [$CO_2$] where photorespiration stress would be highest (FIG. 20A, 20B, 20D). We hypothesized that photorespiration bypass should lower the photosynthetic compensation point, or the point in which internal [$CO_2$] available for photosynthesis is equal to the $CO_2$ produced in daytime respiration. Indeed, we observed lower Γ* measurements in our bypass 3 plants compared to WT controls suggesting that photorespiration bypass increases photosynthetic efficiency at lower [$CO_2$] values possibly due to increases in the concentration of $CO_2$ within the chloroplast, which is predicted following the decarboxylation steps in the introduced pathway (FIG. 14).

Figure 21A:
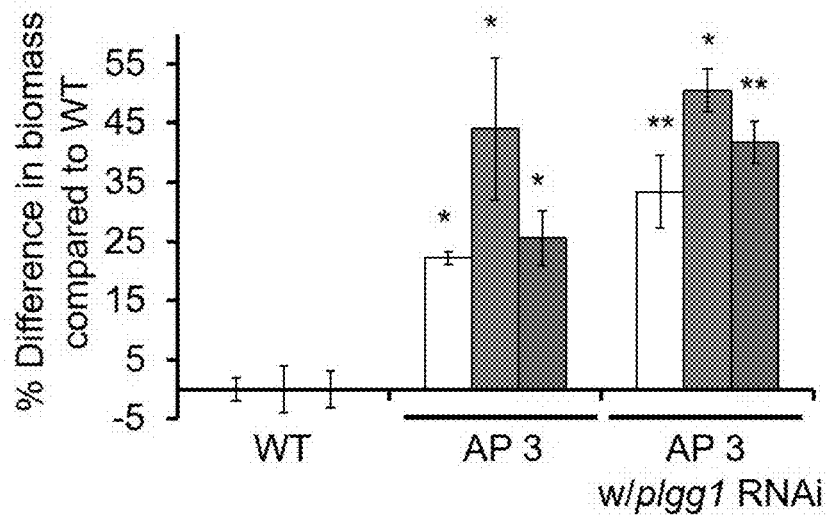
FIG. 21A-21E. Plant productivity and photosynthetic efficiency from the 2017 field trial.
Figure 21B:
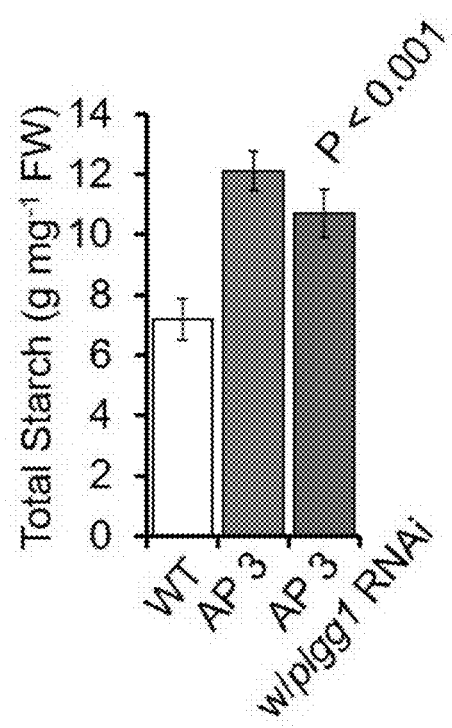
Figure 21C:
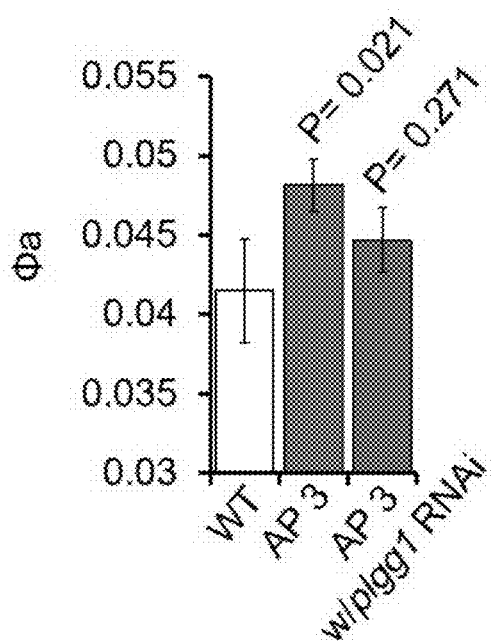

To better asses how Bypass 3 performs under agricultural conditions, a larger replicated block design was used during the 2017 field season. Five randomized replicate blocks were tested including three independent transformed bypass lines with and without the RNAi module targeting PLGG1. During the 2017 field season, we assessed leaf, stem, and total dry weight biomass, mid-day starch content, apparent quantum efficiency of photosynthesis (Φa). Overall, bypass 3 showed a 25% increase in total dry weight biomass (22% leaf, 44% stem) and Bypass 3 with PLGG1 RNAi showed a 41% increase in total dry weight biomass (33% leaf 50% stem) (FIG. 21A). In addition, the inclusion of the PLGG1 RNAi module in the Bypass 3 design showed a significant increase in leaf and total dry weight biomass compared to Bypass 3 alone (FIG. 21A). Total mid-day starch content was elevated in both Bypass 3 designs compared to the WT control by approximately 70% and 42% respectively (FIG. 21B). The apparent quantum efficiency of photosynthesis was increased in both bypass designs and significantly increased in bypass 3 alone (FIG. 21C).

Figure 21D:
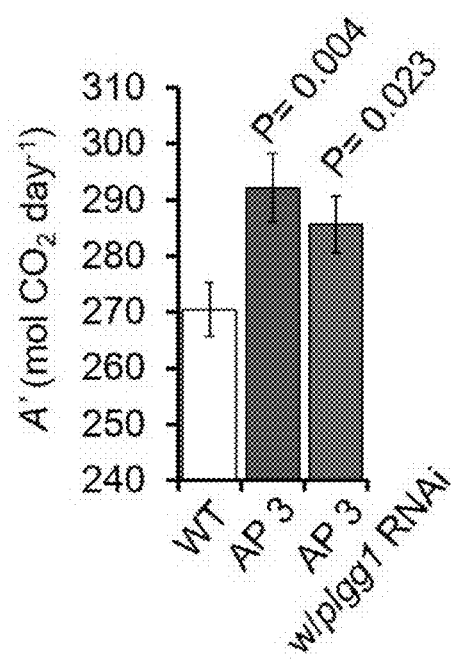
Figure 21E:
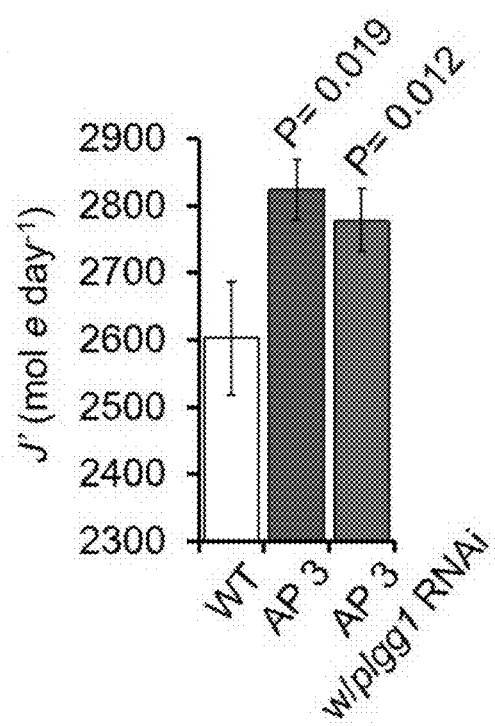

With an increased quantum efficiency of photosynthesis and a decrease in the compensation point in both Bypass 3 designs, we hypothesized that the total net photosynthesis throughout the light period would be higher compared to the WT control resulting in the observed increases in biomass (FIG. 18B and FIG. 21A). To determine this, we measured the combined diurnal assimilation of $CO_2$, and observed significant increases in the total net assimilation in both bypass designs (A') and the total number of electrons used toward photosynthesis (J') compared to WT (FIG. 21D and FIG. 21E).

Overall, our synthetic biology approach let us design, build and test multiple photorespiration bypass designs and to compare different promoter gene combinations. In addition, this was the first study to describe the effects of photorespiration bypass under agriculturally relevant conditions, where the final results were not clearly predictable. The Bypass 1 design which was the first and currently the most reported design indeed shows improvements in plant growth and dry weight biomass (FIG. 18B). When compared, Bypass 1 was surprisingly less productive than Bypass 3 and the improvement of having Bypass 1 in place was reduced when the PLGG1 RNAi module was added in both greenhouse and field settings (FIGS. 18A and 18B). These data suggest that the Bypass 1 metabolic pathway cannot convert glycolate effectively when there's a reduction in flux through the native photorespiration pathway, i.e. when PLGG1 expression is targeted for silencing, or not expressed in a knockout strain. Bypass 2 showed the least improvements in plant productivity and many transgenic lines resulted in stunted growth and yellow leaves. The production of hydrogen peroxide as a byproduct and a non-optimized expression of catalase, which has been previously suggested, is likely the cause of the Bypass 2 phenotypes (Maier et al., supra).

Figure 22:
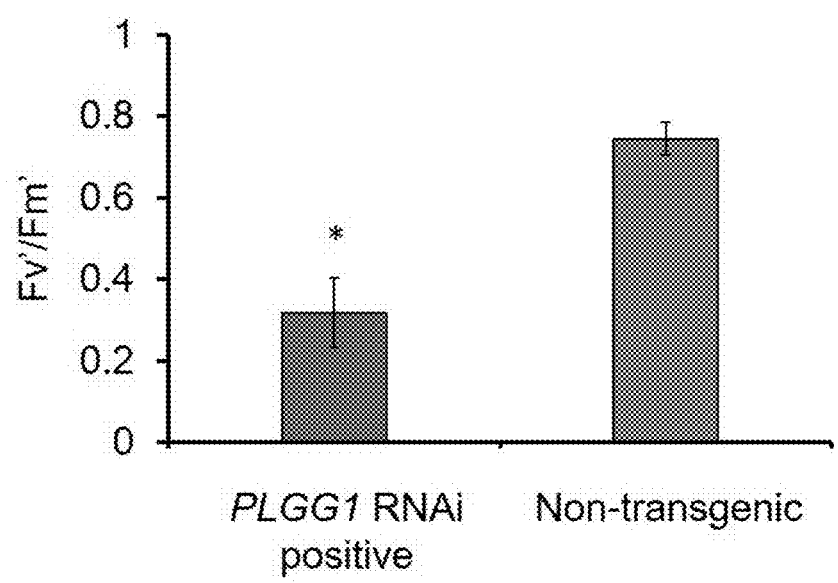
FIG. 22. Knock-down of PLGG1 by RNAi leads to increases Fv'/Fm' after shift from elevated $CO_2$ to ambient air. Combined values of 5 transgenic positive plants expressing only the PLGG1 RNAi module compared to trans-gene negative plants from the same T0 transformation event. Fv'/Fm' was measured 3 days after transition from elevated $CO_2$ to ambient air. Error bars indicate standard deviation.

Photorespiration Bypass 3 which contains the *C. maxima* malate synthase and *C. reinhardtii* glycolate dehydrogenase enzyme, significantly increased plant biomass and demonstrated surprising improvements to photosynthetic efficiency over potential bypass pathways previously reported in the literature. In addition, the inclusion of an RNAi module that reduced the expression of the PLGG1 chloroplast glycolate glycerate transporter, resulting in an effect similar to the PLGG1 knockout strains (FIG. 22) significantly increased post-harvest dry weight biomass compared to Bypass 3 alone (FIG. 18B).

While the invention has been described with reference to details of the illustrated embodiments, these details are not intended to limit the scope of the invention as defined in the appended claims. The embodiment of the invention in which exclusive property or privilege is claimed is defined as follows:

What is claimed is:

1. A genetically altered C3 plant, comprising a first heterologous polynucleotide encoding a malate synthase and a second heterologous polynucleotide encoding an algal glycolate dehydrogenase,
wherein the malate synthase and the algal glycolate dehydrogenase localize to a chloroplast of the plant,
wherein the first and second heterologous polynucleotides are heterologous to the genetically altered C3 plant,
wherein the genetically altered C3 plant further comprises a reduced glycolate and glycerate transport activity of an endogenous chloroplast inner membrane plastidic glycolate/glycerate translocator (PLGG1) protein in the genetically altered C3 plant as compared to a control plant lacking the genetic alterations,
wherein the malate synthase is at least 95% identical to amino acid residues 41-607 of SEQ ID NO: 43,
wherein the algal glycolate dehydrogenase is at least 95% identical to amino acid residues 41-1136 of SEQ ID NO: 45,
wherein the endogenous PLGG1 protein is at least 70% identical to SEQ ID NO: 6 and has glycolate and glycerate transport activity,
wherein the endogenous PLGG1 protein localizes to the chloroplast inner membrane, and
wherein the genetically altered C3 plant has increased biomass or increased photosynthetic efficiency when cultivated under ambient carbon dioxide conditions compared to a corresponding wild-type C3 plant that is cultivated under ambient carbon dioxide conditions, comprises endogenous levels of the endogenous PLGG1 protein, and does not comprise the first or second heterologous polynucleotides.

2. The genetically altered C3 plant of claim 1, wherein the first heterologous polynucleotide encodes an amino acid sequence at least 95% identical to SEQ ID NO: 43 and the second heterologous polynucleotide encodes an amino acid sequence at least 95% identical to SEQ ID NO: 45.

3. The genetically altered C3 plant of claim 1, wherein the endogenous PLGG1 protein has at least 75% sequence identity, at least 80% sequence identity, at least 85% sequence identity, or at least 90% sequence identity to SEQ ID NO: 6.

4. The genetically altered C3 plant of claim 1, wherein the endogenous PLGG1 protein has at least 95% sequence identity to SEQ ID NO: 6.

5. The genetically altered C3 plant of claim 1, wherein the plant is selected from the group consisting of rice, soybean, potato, cowpea, barley, wheat, and cassava.

6. The genetically altered C3 plant of claim 1, wherein the reduced activity of the endogenous PLGG1 protein is due to an RNAi module that expresses an RNAi polynucleotide with a high percent identity to the endogenous PLGG1 mRNA.

7. The genetically altered C3 plant of claim 6, wherein the RNAi polynucleotide has at least 85% sequence identity across a 16 nucleotide sequence within the RNA sequence encoded by the cDNA sequence provided by SEQ ID NO: 5.

8. The genetically altered C3 plant of claim 7, wherein the RNAi polynucleotide has at least 85% sequence identity across a 40 nucleotide sequence within the RNA sequence encoded by the cDNA sequence provided by SEQ ID NO: 5.

9. The genetically altered C3 plant of claim 1, wherein the genetically altered C3 plant has an increased rate of growth, an increased plant size, or an enhanced photosynthetic efficiency as compared to a C3 plant expressing only the malate synthase and the algal glycolate dehydrogenase.

10. The genetically altered C3 plant of claim 1, wherein the genetically altered C3 plant has an increased rate of growth, an increased plant size, decreased glycolate accumulation when grown at 150 ppm $CO_2$, and/or an enhanced photosynthetic efficiency as compared to a C3 plgg1 plant not expressing the malate synthase and the algal glycolate dehydrogenase.

11. A genetically altered C3 plant, comprising a first heterologous polynucleotide encoding a malate synthase and a second heterologous polynucleotide encoding an algal glycolate dehydrogenase,
wherein the malate synthase and the algal glycolate dehydrogenase localize to a chloroplast of the plant,
wherein the first and second heterologous polynucleotides are heterologous to the genetically altered C3 plant,
wherein the genetically altered C3 plant further comprises a reduced glycolate and/or glycerate transport activity of an endogenous chloroplast inner membrane plastidic glycolate/glycerate translocator (PLGG1) protein in the genetically altered C3 plant as compared to a control plant lacking the genetic alterations,
wherein the malate synthase is at least 95% identical to amino acid residues 41-607 of SEQ ID NO: 43,
wherein the algal glycolate dehydrogenase is at least 95% identical to amino acid residues 41-1136 of SEQ ID NO: 45,
wherein the endogenous PLGG1 protein is a homolog of SEQ ID NO: 6 and has glycolate and/or glycerate transport activity, and
wherein the endogenous PLGG1 protein localizes to the chloroplast inner membrane,
wherein the genetically altered C3 plant has increased biomass or increased photosynthetic efficiency when cultivated under ambient carbon dioxide conditions compared to a corresponding wild-type C3 plant that is cultivated under ambient carbon dioxide conditions, comprises endogenous levels of the endogenous PLGG1 protein, and does not comprise the first or second heterologous polynucleotides.

12. The genetically altered C3 plant of claim 1, further comprising:
an RNAi polynucleotide targeting the endogenous PLGG1,
wherein the RNAi polynucleotide comprises a sense strand comprising at least 16 contiguous nucleotides of the endogenous PLGG1 and an antisense strand that is fully complementary to the at least 16 contiguous nucleotides of the sense strand, wherein the sense strand and the antisense strand form a dsRNA.

13. The genetically altered C3 plant of claim 12, wherein the RNAi polynucleotide is at least 95% identical to SEQ ID NO: 46.

* * * * *

```
                       SEQUENCE LISTING

<160> NUMBER OF SEQ ID NOS: 46

<210> SEQ ID NO 1
<211> LENGTH: 2274
<212> TYPE: DNA
<213> ORGANISM: Arabidopsis thaliana

<400> SEQUENCE: 1
gaatctctcc ctctttcttc catttcccag aactctcaga gtttcgccac ttcttctgaa      60
gaatctgaaa gatcacaaag tccaagaaa aaaaatgagc gtgatcacaa ctccaataga     120
gaccctgcac ctaaagtcaa cacttcgtct tctaccacga gctgtttatc gcagtcaacg     180
gattcaagtt ttcccgccca acatcttctc gaacacttct ctgagttctc cacttcgcat     240
cgacccaatc tctcaaggtt tgttcatctt actctcatcg atcctcaggc gtttatgctt     300
gttgggtacc tgcaaaattt acactttctt ctctcatggt tttcttcaac ctactatata     360
cacagttggc ggatcgagga atttgtggcg tagatatgca tctgataatt tctcggagat     420
gggtttggat cctggagctg atccattcaa ggtgtgcgct atgggatctt tccttttcca     480
ttctatgtta tgttgggttt gaatagtctt ctcaaaatgt gtcatcttta atgtcaaaat     540
gtgattttgc actattgaag acttgttaat tatcctactt ttgaatctga ttagctaaaa     600
atcatccctg gatcacagtt ttgctacttt gttcttcgtt tgctgatgat ttcagttgtt     660
aagaatttta tgttacttcc gagaaccaac atgaatctag taagtggctt gcaggttatt     720
gagaagcctt ctatagtgga tagaatgaag aaagcaaact caattcttcc tcatgtagtg     780
ttggcgagta caatattagc tcttatctat cctccttctt tcacttggtt tacgtcgagg     840
ttcttcccat tggaacaagg tcaaattgat ctaagacttt gaattgtaga catgaggttt     900
gctaaaaagc tcttctttac tctcctgtta ttttaggtac tttgtgcccg ctttaggttt     960
tttgatgttt gcggttggta tcaattcaaa cgagaaagac tttcttgaag ctttcaaaag    1020
accaaaagct atcctcctcg gttatgttgg acaatatctc gtaaagcctg tcctaggttt    1080
catctttggc ctagctgctg tttctctttt ccaactccca actccaattg gtaaaagctc    1140
cctgtctctc atcattcaag actcttaacc tatctctcac attaaccaat ctttctcaat    1200
ctctcaggtg ctggaatcat gttggtatca tgtgttagtg gagctcagtt gtcaaactat    1260
gcgacattcc taactgatcc agcattggca cctcttagca tcgtcatgac atctctatca    1320
accgctactg cggttcttgt cacaccgatg ctatcactcc tgctcattgg gaagaaacta    1380
cccgttgatg taaaggaat gatatccagc attcttcagg ttgtaatcgc accaatcgct    1440
gcaggattgc tactaaacaa gtgagagata tagctacaag cctacaacta gaaataacca    1500
caagttgttt ctctaagtat aaccattttt atctcctttt tgtttcttct tttacaggtt    1560
gttcccaaaa gtatcaaatg caatccgacc atttctcccg attctatcgg ttctcgacac    1620
agcttgctgc gttggagcac cactcgcatt gaacataaac tcggtcatgt ctccatttgg    1680
agccaccata ttgttactag taacaatgtt tcatctctca gctttcctcg ctggatactt    1740
ccttaccggt tctgtctttta gaaacgctcc agacgctaaa gccatgcaaa gaacattgtc    1800
ctatgaaact ggtactaact ctttatggta ttggaaaatc ttatcaagaa agtacaattt    1860
ggtttaaaga tttgagaaga gaaatgtgtt tgtgaatata tcaggaatgc agagtagcct    1920
```

```
tttggctcta gcgcttgcta ctaagttctt tcaagatcct cttgtgggga ttcctcctgc    1980
tatatctgta agtctcatat cctttgaca tagcataatc ttttattgat gatgattata     2040 gagattttg ttttgttttg cagacggtgg taatgtcatt gatggggttc actctcgttt     2100
tgatctggtc taaggaaaag agtaacacat tttaacattt tgattttgtt tcactccaca    2160
ttttgattat acatatatat atgtactaca aataattgga aaattcttct tgtaatataa    2220
ataattcaat acagaatttg agatttttaa tgtactaatc tccatttttgt cttt         2274

<210> SEQ ID NO 2
<211> LENGTH: 1463
<212> TYPE: DNA
<213> ORGANISM: Arabidopsis thaliana

<400> SEQUENCE: 2
gaatctctcc ctctttcttc catttcccag aactctcaga gtttcgccac ttcttctgaa      60
gaatctgaaa gatcacaaag tccaaagaaa aaaatgagc gtgatcacaa ctccaataga      120
gaccctgcac ctaaagtcaa cacttcgtct tctaccacga gctgtttatc gcagtcaacg     180
gattcaagtt ttcccgccca acatcttctc gaacacttct ctgagttctc acttcgcat     240 cgacccaatc tctcaagttg gcggatcgag gaatttgtgg cgtagatatg catctgataa     300
tttctcggag atgggtttgg atcctggagc tgatccattc aaggttattg agaagccttc    360
tatagtggat agaatgaaga agcaaactc aattcttcct catgtagtgt tggcgagtac     420
aatattagct cttatctatc ctccttcttt cacttggttt acgtcgaggt actttgtgcc    480
cgctttaggt tttttgatgt ttgcggttgg tatcaattca aacgagaaag actttcttga    540
agctttcaaa agaccaaaag ctatcctcct cggttatgtt ggacaatatc tcgtaaagcc    600
tgtcctaggt ttcatctttg gcctagctgc tgtttctctt ttccaactcc caactccaat    660
tggtgctgga atcatgttgg tatcatgtgt tagtggagct cagttgtcaa actatgcgac    720
attcctaact gatccagcat tggcacctct tagcatcgtc atgacatctc tatcaaccgc    780
tactgcggtt cttgtcacac cgatgctatc actcctgctc attgggaaga aactaccgt     840 tgatgtaaaa ggaatgatat ccagcattct tcaggttgta atcgcaccaa tcgctgcagg    900
attgctacta aacaagttgt tcccaaaagt atcaaatgca atccgaccat ttctcccgat    960
tctatcggtt ctcgacacag cttgctgcgt tggagcacca ctcgcattga acataaactc    1020
ggtcatgtct ccatttggag ccaccatatt gttactagta acaatgtttc atctctcagc    1080
tttcctcgct ggatacttcc ttaccggttc tgtctttaga aacgctccag acgctaaagc    1140
catgcaaaga acattgtcct atgaaactgg aatgcagagt agccttttgg ctctagcgct    1200
tgctactaag ttctttcaag atcctcttgt ggggattcct cctgctatat ctacggtggt    1260
aatgtcattg atggggttca ctctcgtttt gatctggtct aaggaaaaga gtaacacatt    1320 ttaacattt gattttgttt cactccacat tttgattata catatatata tgtactacaa    1380
ataattggaa aattcttctt gtaatataaa taattcaata cagaatttga gatttttaat    1440
gtactaatct ccatttttgtc ttt                                            1463

<210> SEQ ID NO 3
<211> LENGTH: 409
<212> TYPE: PRT
<213> ORGANISM: Arabidopsis thaliana

<400> SEQUENCE: 3
```

```
Met Ser Val Ile Thr Thr Pro Ile Glu Thr Leu His Leu Lys Ser Thr
1               5                   10                  15

Leu Arg Leu Leu Pro Arg Ala Val Tyr Arg Ser Gln Arg Ile Gln Val
            20                  25                  30

Phe Pro Pro Asn Ile Phe Ser Asn Thr Ser Leu Ser Ser Pro Leu Arg
            35                  40                  45

Ile Asp Pro Ile Ser Gln Val Gly Gly Ser Arg Asn Leu Trp Arg Arg
50                  55                  60

Tyr Ala Ser Asp Asn Phe Ser Glu Met Gly Leu Asp Pro Gly Ala Asp
65                  70                  75                  80

Pro Phe Lys Val Ile Glu Lys Pro Ser Ile Val Asp Arg Met Lys Lys
            85                  90                  95

Ala Asn Ser Ile Leu Pro His Val Val Leu Ala Ser Thr Ile Leu Ala
            100                 105                 110

Leu Ile Tyr Pro Pro Ser Phe Thr Trp Phe Thr Ser Arg Tyr Phe Val
            115                 120                 125

Pro Ala Leu Gly Phe Leu Met Phe Ala Val Gly Ile Asn Ser Asn Glu
            130                 135                 140

Lys Asp Phe Leu Glu Ala Phe Lys Arg Pro Lys Ala Ile Leu Leu Gly
145                 150                 155                 160

Tyr Val Gly Gln Tyr Leu Val Lys Pro Val Leu Gly Phe Ile Phe Gly
            165                 170                 175

Leu Ala Ala Val Ser Leu Phe Gln Leu Pro Thr Pro Ile Gly Ala Gly
            180                 185                 190

Ile Met Leu Val Ser Cys Val Ser Gly Ala Gln Leu Ser Asn Tyr Ala
            195                 200                 205

Thr Phe Leu Thr Asp Pro Ala Leu Ala Pro Leu Ser Ile Val Met Thr
            210                 215                 220

Ser Leu Ser Thr Ala Thr Ala Val Leu Val Thr Pro Met Leu Ser Leu
225                 230                 235                 240

Leu Leu Ile Gly Lys Lys Leu Pro Val Asp Val Lys Gly Met Ile Ser
            245                 250                 255

Ser Ile Leu Gln Val Val Ile Ala Pro Ile Ala Ala Gly Leu Leu Leu
            260                 265                 270

Asn Lys Leu Phe Pro Lys Val Ser Asn Ala Ile Arg Pro Phe Leu Pro
            275                 280                 285

Ile Leu Ser Val Leu Asp Thr Ala Cys Cys Val Gly Ala Pro Leu Ala
290                 295                 300

Leu Asn Ile Asn Ser Val Met Ser Pro Phe Gly Ala Thr Ile Leu Leu
            305                 310                 315                 320

Leu Val Thr Met Phe His Leu Ser Ala Phe Leu Ala Gly Tyr Phe Leu
            325                 330                 335

Thr Gly Ser Val Phe Arg Asn Ala Pro Asp Ala Lys Ala Met Gln Arg
            340                 345                 350

Thr Leu Ser Tyr Glu Thr Gly Met Gln Ser Ser Leu Leu Ala Leu Ala
            355                 360                 365

Leu Ala Thr Lys Phe Phe Gln Asp Pro Leu Val Gly Ile Pro Pro Ala
            370                 375                 380

Ile Ser Thr Val Val Met Ser Leu Met Gly Phe Thr Leu Val Leu Ile
385                 390                 395                 400

Trp Ser Lys Glu Lys Ser Asn Thr Phe
            405
```

<210> SEQ ID NO 4
<211> LENGTH: 2459
<212> TYPE: DNA
<213> ORGANISM: Arabidopsis thaliana

<400> SEQUENCE: 4

```
gtgccgtctc ttagaatcac atccacgtcg tcgtctccat acccatggct actcttttag      60
ccactcctat cttctctcct ttagcttctt ctccagcaag gaaccgtctt tcttgctcta     120
agatccgttt cggttccaaa atgggaaaaa ttctcaattc tgatggtgcc agaagttga      180 atctctcaaa attccgtaaa cccgatggcc aaagattcct acaaatgggt tcttctaaag     240
agatgaactt tgagagaaaa ctctcagtcc aagctatgga tggtgcagga acaggaaaca     300
catcaacgat ctctcgtaac gtaagcttca cgatgttgtt tatttaccat tttattgtaa     360
cagcttttta aagttttgaa ttttcgttc aggtaattgc gataagtcac ttgttggtat      420
cacttgggat cattcttgct gcagactatt tcttgaagca ggcgtttgta gcagcgtcta     480
ttaagttccc aagtgctttg tttgggatgt tctgtatttt ctctgttctt atgatatttg     540
attcggttgt tcctgctgct gcaaatggtt tgatgaattt cttcgagcct gcgtttctgt     600
ttatccaaag atggcttcct ttgttctatg ttccttctct tgttgttctt cctctttctg     660
ttagagatat tccggctgct tcaggtgtca aaatctgcta cattgtaggt atgaacttga     720
tcttcacttg gttaatgatc ttgtgttctc tggtagcttt tatgggtttt ttgtctaatt     780
gctctgtttt gtttattatt taatgctgat ctgatgtcaa tgttgatttg aatgtttgtt     840
tgtatagccg gtggatggtt ggcgtcactt tgtgtagcag ggtacacagc tattgcagtg     900
agaaaaatgg tgaaaaccga atgacggaa gccgagccta tggcaaaacc atcaccattt      960
tcaacacttg agctatggag ttggagtgga atctttgttg tgtcgtttgt tggtgctctg    1020
ttttacccta attcattggg gacaagtgca agaacttctc tcccttttcct tctttcttca   1080 actgtgctag gttacattgt aggttctggg taatattcaa aaaccccttct tgttctcca   1140 tctttaagcc tctctatctc gcggttattc tcagtgtctt atctttcttt cttccaggtt    1200
gccatcttct attaagaaag ttttccatcc gataatctgc tgcgcgctat ctgcagtact    1260
tgctgctcta gcttttgggt atgcttcagg atctggactt gatcctgttt taggtaaagt    1320
taccttcact atgaaagaaa ctatagagaa accctttttt gacctaaaac agaaagtaaa    1380
agcattttgt taactgctct ttaatggtga caggaaaacta ccttaccaaa gtagcatcag   1440
atcctggtgc tggtgacatc ttaatggggtt tccttggctc tgtcattctc tctttcgctt    1500
tctccatgtt caaacaaaga aaggtaaaac aaacaacaaa cttgttctgt tttgctttag   1560
aaaactggta acaatcgctt tggtttgcct ctgtcttctt cagctcgtga agaggcacgc    1620
agctgagatc ttcacatctg tgatagtttc aacggtattc tcgctctact ccactgctct    1680
tgttggacgt ttagtcggtt tagaaccttc tttaacggtt tcaatcctac ctcgctgcat    1740
cacggttgca ttggcccctta gcattgtatc actctttgaa ggtatatatg tttcttcttc    1800
ttctcaacac attaaagaac atccctaacg aatttgttgg acattttcag ggaccaattc   1860
gtctcttaca gcagctgtag tcgttgtgac tggtctgatt ggagctaact ttgtacaagt   1920
tgttcttgac aaactgcgtt tacgtgatcc aattgctcgg ggaattgcaa ctgcttcaag   1980
gtgactccat tacaaaagat ctttcacatt ttgaattaaa attatgcatt aatgccatta    2040
ggatcaaaag acatgacctt tctatttttt atggacagtg ctcatggact tggaacagca   2100
gctttgtcgg ctaaggagcc agaggctctt ccctttgtg caatagctta tgctcttacc    2160
```

```
ggaatcttcg gatcgttact gtgttctgtt cctgccgtcc gacagagttt gctagcggtc    2220
gtcggctgag gattgatgat gtggcgaaac acgattgatg gtctcaaagc tggcgagtta    2280
cttaaaatat gagagcagtt tgctttggat gtcaaataag cttgtattaa tgaaaaagat    2340
gatggaaaat gtttatttat tttattttat atatgtaaat gttgtgagat ttgtacaaca    2400
tacataaatt ttatatagga gtaggatgtc ccagctttcc aaaaatttgt cacaaaggt     2459

<210> SEQ ID NO 5
<211> LENGTH: 1813
<212> TYPE: DNA
<213> ORGANISM: Arabidopsis thaliana

<400> SEQUENCE: 5
gtgccgtctc ttagaatcac atccacgtcg tcgtctccat acccatggct actcttttag      60
ccactcctat cttctctcct ttagcttctt ctccagcaag gaaccgtctt tcttgctcta     120
agatccgttt cggttccaaa aatgggaaaa ttctcaattc tgatggtgcc cagaagttga     180
atctctcaaa attccgtaaa cccgatggcc aaagatttct acaaatgggt tcttctaaag     240
agatgaactt tgagagaaaa ctctcagtcc aagctatgga tggtgcagga acaggaaaca     300
catcaacgat ctctcgtaac gtaattgcga taagtcactt gttggtatca cttgggatca     360
ttcttgctgc agactatttc ttgaagcagg cgtttgtagc agcgtctatt aagttcccaa     420
gtgctttgtt tgggatgttc tgtatttcct ctgttcttat gatatttgat tcggttgttc     480
ctgctgctgc aaatggtttg atgaatttct tcgagcctgc gtttctgttt atccaaagat     540
ggcttccttt gttctatgtt ccttctcttg ttgttcttcc tctttctgtt agagatattc     600
cggctgcttc aggtgtcaaa atctgctaca ttgtagccgg tggatggttg gcgtcacttt     660
gtgtagcagg gtacacagct attgcagtga aaaaatggt gaaaaccgaa atgacggaag      720
ccgagcctat ggcaaaacca tcaccatttt caacacttga gctatggagt tggagtggaa     780
tctttgttgt gtcgtttgtt ggtgctctgt tttaccctaa ttcattgggg acaagtgcaa     840
gaacttctct cccttttcctt ctttcttcaa ctgtgctagg ttacattgta ggttctgggt     900
tgccatcttc tattaagaaa gttttccatc cgataatctg ctgcgcgcta tctgcagtac     960
ttgctgctct agcttttggg tatgcttcag gatctggact tgatcctgtt ttaggaaact    1020 acctaccaa agtagcatca gatcctggtg ctggtgacat cttaatgggt tttcttggct     1080
ctgtcattct ctctttcgct ttctccatgt tcaaacaaag aaagctcgtg aagaggcacg    1140
cagctgagat cttcacatct gtgatagttt caacggtatt ctcgctctac tccactgctc    1200 tgttggacg tttagtcggt ttagaacctt ctttaacggt ttcaatccta cctcgctgca     1260
tcacggttgc attggccctt agcattgtat cactctttga agggaccaat tcgtctctta    1320
cagcagctgt agtcgttgtg actggtctga ttggagctaa cttttgtacaa gttgttcttg    1380 acaaactgcg tttacgtgat ccaattgctc ggggaattgc aactgcttca agtgctcatg    1440
gacttggaac agcagctttg tcggctaagg agccagaggc tcttcccttt tgtgcaatag    1500
cttatgctct taccggaatc ttcggatcgt tactgtgttc tgttcctgcc gtccgacaga    1560
gtttgctagc ggtcgtcggc tgaggattga tgatgtggcg aaaacgattg atggtctca     1620 aagctggcga gttacttaaa atatgagagc agtttgcttt ggatgtcaaa taagcttgta    1680
ttaatgaaaa agatgatgga aaatgtttat ttatttattt ttatatatgt aaatgttgtg    1740
agatttgtac aacatacata aattttatat aggagtagga tgtcccagct ttccaaaaat    1800
ttgtcacaaa ggt                                                       1813
```

<210> SEQ ID NO 6
<211> LENGTH: 512
<212> TYPE: PRT
<213> ORGANISM: Arabidopsis thaliana

<400> SEQUENCE: 6

```
Met Ala Thr Leu Leu Ala Thr Pro Ile Phe Ser Pro Leu Ala Ser Ser
1               5                   10                  15

Pro Ala Arg Asn Arg Leu Ser Cys Ser Lys Ile Arg Phe Gly Ser Lys
                20                  25                  30

Asn Gly Lys Ile Leu Asn Ser Asp Gly Ala Gln Lys Leu Asn Leu Ser
            35                  40                  45

Lys Phe Arg Lys Pro Asp Gly Gln Arg Phe Leu Gln Met Gly Ser Ser
    50                  55                  60

Lys Glu Met Asn Phe Glu Arg Lys Leu Ser Val Gln Ala Met Asp Gly
65                  70                  75                  80

Ala Gly Thr Gly Asn Thr Ser Thr Ile Ser Arg Asn Val Ile Ala Ile
                85                  90                  95

Ser His Leu Leu Val Ser Leu Gly Ile Ile Leu Ala Ala Asp Tyr Phe
            100                 105                 110

Leu Lys Gln Ala Phe Val Ala Ala Ser Ile Lys Phe Pro Ser Ala Leu
    115                 120                 125

Phe Gly Met Phe Cys Ile Phe Ser Val Leu Met Ile Phe Asp Ser Val
130                 135                 140

Val Pro Ala Ala Ala Asn Gly Leu Met Asn Phe Phe Glu Pro Ala Phe
145                 150                 155                 160

Leu Phe Ile Gln Arg Trp Leu Pro Leu Phe Tyr Val Pro Ser Leu Val
                165                 170                 175

Val Leu Pro Leu Ser Val Arg Asp Ile Pro Ala Ala Ser Gly Val Lys
            180                 185                 190

Ile Cys Tyr Ile Val Ala Gly Gly Trp Leu Ala Ser Leu Cys Val Ala
    195                 200                 205

Gly Tyr Thr Ala Ile Ala Val Arg Lys Met Val Lys Thr Glu Met Thr
210                 215                 220

Glu Ala Glu Pro Met Ala Lys Pro Ser Pro Phe Ser Thr Leu Glu Leu
225                 230                 235                 240

Trp Ser Trp Ser Gly Ile Phe Val Val Ser Phe Val Gly Ala Leu Phe
                245                 250                 255

Tyr Pro Asn Ser Leu Gly Thr Ser Ala Arg Thr Ser Leu Pro Phe Leu
            260                 265                 270

Leu Ser Ser Thr Val Leu Gly Tyr Ile Val Gly Ser Gly Leu Pro Ser
    275                 280                 285

Ser Ile Lys Lys Val Phe His Pro Ile Ile Cys Cys Ala Leu Ser Ala
290                 295                 300

Val Leu Ala Ala Leu Ala Phe Gly Tyr Ala Ser Gly Ser Gly Leu Asp
305                 310                 315                 320

Pro Val Leu Gly Asn Tyr Leu Thr Lys Val Ala Ser Asp Pro Gly Ala
                325                 330                 335

Gly Asp Ile Leu Met Gly Phe Leu Gly Ser Val Ile Leu Ser Phe Ala
            340                 345                 350

Phe Ser Met Phe Lys Gln Arg Lys Leu Val Lys Arg His Ala Ala Glu
    355                 360                 365

Ile Phe Thr Ser Val Ile Val Ser Thr Val Phe Ser Leu Tyr Ser Thr
```

```
                370                 375                 380
Ala Leu Val Gly Arg Leu Val Gly Leu Glu Pro Ser Leu Thr Val Ser
385                 390                 395                 400

Ile Leu Pro Arg Cys Ile Thr Val Ala Leu Ala Leu Ser Ile Val Ser
                405                 410                 415

Leu Phe Glu Gly Thr Asn Ser Ser Leu Thr Ala Ala Val Val Val Val
                420                 425                 430

Thr Gly Leu Ile Gly Ala Asn Phe Val Gln Val Val Leu Asp Lys Leu
                435                 440                 445

Arg Leu Arg Asp Pro Ile Ala Arg Gly Ile Ala Thr Ala Ser Ser Ala
                450                 455                 460

His Gly Leu Gly Thr Ala Ala Leu Ser Ala Lys Glu Pro Glu Ala Leu
465                 470                 475                 480

Pro Phe Cys Ala Ile Ala Tyr Ala Leu Thr Gly Ile Phe Gly Ser Leu
                485                 490                 495

Leu Cys Ser Val Pro Ala Val Arg Gln Ser Leu Leu Ala Val Val Gly
                500                 505                 510
```

<210> SEQ ID NO 7
<211> LENGTH: 18
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 7
ctctctgccg acagtggt                                          18

<210> SEQ ID NO 8
<211> LENGTH: 23
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 8
cttatatgct caacacatga gcg                                    23

<210> SEQ ID NO 9
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 9
ataaccgcga gatagagagg c                                      21

<210> SEQ ID NO 10
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 10
cccatggcta ctcttttagc c                                      21

<210> SEQ ID NO 11
<211> LENGTH: 19
<212> TYPE: DNA
<213> ORGANISM: ARTIFICIAL SEQUENCE

```
<220> FEATURE:
<223> OTHER INFORMATION: CHEMICALLY SYNTHESIZED

<400> SEQUENCE: 11
attttgccga tttcggaac                                                     19

<210> SEQ ID NO 12
<211> LENGTH: 39
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 12
gccggatcca tggcttcgtg ctctaagatc cgtttcggt                               39

<210> SEQ ID NO 13
<211> LENGTH: 28
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 13
gccctcgagt cagccgacga ccgctagc                                           28

<210> SEQ ID NO 14
<211> LENGTH: 28
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 14
gctctagaat gagcgtgatc acaactcc                                           28

<210> SEQ ID NO 15
<211> LENGTH: 29
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 15
gactcgagtt aaaatgtgtt actcttttc                                          29

<210> SEQ ID NO 16
<211> LENGTH: 26
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 16
ctactctttt agccactcct atcttc                                             26

<210> SEQ ID NO 17
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 17
agattcaact tctgggcacc                                                    20
```

```
<210> SEQ ID NO 18
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 18
tcgcagtcaa cggattcaag                                               20

<210> SEQ ID NO 19
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 19
tctacgccac aaattcctcg                                               20

<210> SEQ ID NO 20
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 20
tgagttcaac gagtgtgctg                                               20

<210> SEQ ID NO 21
<211> LENGTH: 22
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 21
acttgtaatg taccacttcc cg                                            22

<210> SEQ ID NO 22
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 22
cccctcacca cagagtctgc                                               20

<210> SEQ ID NO 23
<211> LENGTH: 24
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 23
aagggtgttg ttgtcctcaa tctt                                          24

<210> SEQ ID NO 24
<211> LENGTH: 28
<212> TYPE: DNA
<213> ORGANISM: ARTIFICIAL SEQUENCE
<220> FEATURE:
<223> OTHER INFORMATION: CHEMICALLY SYNTHESIZED
```

<400> SEQUENCE: 24
ctcaaataaa gttgaaatcc ttacaaac                                          28

<210> SEQ ID NO 25
<211> LENGTH: 22
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 25
tcttggtagg gatgaattgg ac                                                22

<210> SEQ ID NO 26
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 26
gggaatctga gtggacatgt g                                                 21

<210> SEQ ID NO 27
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 27
ccagaattga gtgcgttgat g                                                 21

<210> SEQ ID NO 28
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 28
acagaaacgc ttttgcaagg                                                   20

<210> SEQ ID NO 29
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 29
ggtgagccat cttttgcatg                                                   20

<210> SEQ ID NO 30
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 30
gcgagaaaat cacccacttt g                                                 21

<210> SEQ ID NO 31

```
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 31
tggctggaaa taaccgtgag                                              20

<210> SEQ ID NO 32
<211> LENGTH: 19
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 32
tgaattactg tcgctgggc                                               19

<210> SEQ ID NO 33
<211> LENGTH: 23
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 33
gtacaaccat tttcaccgaa cag                                          23

<210> SEQ ID NO 34
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 34
atcaatccgt tctactcagc g                                            21

<210> SEQ ID NO 35
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 35
gacatacgcc gatattccct g                                            21

<210> SEQ ID NO 36
<211> LENGTH: 22
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 36
ggaggtagca tcttgtacga ag                                           22

<210> SEQ ID NO 37
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 37
```
cggtatgcag gatctcaagt c                                              21

<210> SEQ ID NO 38
<211> LENGTH: 20
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 38
cgagtgtgat tacagccagg                                                20

<210> SEQ ID NO 39
<211> LENGTH: 19
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 39
tgacaacgaa catccagcg                                                 19

<210> SEQ ID NO 40
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 40
ctgtgttcac tgcggatttt g                                              21

<210> SEQ ID NO 41
<211> LENGTH: 21
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 41
ctcctgtgtt ttaagcgtga c                                              21

<210> SEQ ID NO 42
<211> LENGTH: 1828
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 42
atggcttcct ctatgctctc ttccgctact atggttgcct ctccggctca ggccactatg      60
gtcgctcctt tcaacggact taagtcctcc gctgccttcc cagccacccg caaggctaac     120
ggaggtggat cgctgggaat gtattctgaa tcggcagtaa ggaagaaaag tagccgaggc     180
tacgatgttc cagagggagt ggacattcgg ggacgttatg atgaagaatt tgccaggatt     240
ctcaacaagg aagccttgct gtttgtggct gatttacaga ggactttcag aaaccacata     300
aggtattcga tggaatgccg cagagaagcc aaaaggaggt acaatgaagg ggcggtgccg     360
gggtttgatc cggcgaccaa gtatataagg gaatctgagt ggacatgtgc atcagtcccc     420
ccggcagttg ctgatcggag agtggagatc accggacctg tggagcggaa gatgatcatc     480
aacgcactca attctggagc taaagttttc atggcggact ttgaagatgc actatcacca     540

```
aactgggaga atttgatgag ggggcaaatt aatctgaagg atgcagttga tgggactata    600
agcttccatg acaaagctag aaacaaggtt tataaactga acgatcagac agccaagctc    660
tttgttcgcc ctcgaggttg gcacttcgct gaggctcata tcttcatcga cggcgagcct    720
gccaccggct gtcttgtgga cttcgggctc tactttttc acaaccatgc caatttccgg     780
cgctctcaag gtcaaggttc tggccctttc ttttaccttc ccaaaatgga gcactccagg    840
gaagcaaaaa tatggaacag tgtatttgag agagcagaga agatggcagg gatagagagg    900
ggcagcatca gggccactgt gctgattgaa acacttccag cagtgtttca aatggatgaa    960
atactctatg agctgaggga tcattctgtg ggattgaact gtggtagatg ggattacata   1020
ttcagctatg tcaagacctt ccaggctcac ctagatcgcc tgttacccga ccgagtccaa   1080
gtcggtatgg cacaacattt catgaggagt tattctgatc tccttatcag gacttgtcat   1140
acggttgtgt gccacgtggg aggcatggct gctcaaattc caattaggga tgacccgaag   1200
gcaaatgaga tggcacttga gctagtgagg aaggacaaat tgagagaggc aaaggcagga   1260
catgatggaa catgggcagc acatccagga ttaatcccag catgtatgga agtgtttacc   1320
aacagcatgg gaaatgcccc caatcagatc cgatctgcaa gacgcgatga tgctgcaaac   1380
ctaactgagg atgacctctt gcagcaaccg agggtgttc gtacattgga agggctccgg    1440
ttgaacaccc gagtcggaat tcagtaccta gcagcatggc taaccgggac aggctctgtg   1500
cctctctaca accttatgga agatgcagcc acagctgaaa tcagcagggt tcaaaactgg   1560
caatggctga gtatggagt ggaattggat ggagatgggc ttggagtgag agtgaacaag    1620
gaactgttcg caagagtggt ggaagaagaa atggaaagga ttgaaagaga agtgggaag    1680
gagaaattca ggaagggaat gtacaaagag gcttgcaaga tgttcacaag gcaatgcaca   1740
gcgccaacct tggatgattt tctgaccttg gatgcgtaca accacatagt catacatcat   1800
cccagggagc tgtccaggct ctgagctt                                       1828

<210> SEQ ID NO 43
<211> LENGTH: 607
<212> TYPE: PRT
<213> ORGANISM: ARTIFICIAL SEQUENCE
<220> FEATURE:
<223> OTHER INFORMATION: CHEMICALLY SYNTHESIZED

<400> SEQUENCE: 43

Met Ala Ser Ser Met Leu Ser Ser Ala Thr Met Val Ala Ser Pro Ala
1               5                   10                  15

Gln Ala Thr Met Val Ala Pro Phe Asn Gly Leu Lys Ser Ser Ala Ala
            20                  25                  30

Phe Pro Ala Thr Arg Lys Ala Asn Gly Gly Ser Leu Gly Met Tyr
        35                  40                  45

Ser Glu Ser Ala Val Arg Lys Lys Ser Ser Arg Gly Tyr Asp Val Pro
    50                  55                  60

Glu Gly Val Asp Ile Arg Gly Arg Tyr Asp Glu Phe Ala Arg Ile
65                  70                  75                  80

Leu Asn Lys Glu Ala Leu Leu Phe Val Ala Asp Leu Gln Arg Thr Phe
                85                  90                  95

Arg Asn His Ile Arg Tyr Ser Met Glu Cys Arg Arg Glu Ala Lys Arg
            100                 105                 110

Arg Tyr Asn Glu Gly Ala Val Pro Gly Phe Asp Pro Ala Thr Lys Tyr
        115                 120                 125

Ile Arg Glu Ser Glu Trp Thr Cys Ala Ser Val Pro Pro Ala Val Ala
```

```
                130                 135                 140
Asp Arg Arg Val Glu Ile Thr Gly Pro Val Glu Arg Lys Met Ile Ile
145                 150                 155                 160

Asn Ala Leu Asn Ser Gly Ala Lys Val Phe Met Ala Asp Phe Glu Asp
                165                 170                 175

Ala Leu Ser Pro Asn Trp Glu Asn Leu Met Arg Gly Gln Ile Asn Leu
            180                 185                 190

Lys Asp Ala Val Asp Gly Thr Ile Ser Phe His Asp Lys Ala Arg Asn
        195                 200                 205

Lys Val Tyr Lys Leu Asn Asp Gln Thr Ala Lys Leu Phe Val Arg Pro
    210                 215                 220

Arg Gly Trp His Phe Ala Glu Ala His Ile Phe Ile Asp Gly Glu Pro
225                 230                 235                 240

Ala Thr Gly Cys Leu Val Asp Phe Gly Leu Tyr Phe Phe His Asn His
                245                 250                 255

Ala Asn Phe Arg Arg Ser Gln Gly Gln Gly Ser Gly Pro Phe Phe Tyr
            260                 265                 270

Leu Pro Lys Met Glu His Ser Arg Glu Ala Lys Ile Trp Asn Ser Val
        275                 280                 285

Phe Glu Arg Ala Glu Lys Met Ala Gly Ile Glu Arg Gly Ser Ile Arg
    290                 295                 300

Ala Thr Val Leu Ile Glu Thr Leu Pro Ala Val Phe Gln Met Asp Glu
305                 310                 315                 320

Ile Leu Tyr Glu Leu Arg Asp His Ser Val Gly Leu Asn Cys Gly Arg
                325                 330                 335

Trp Asp Tyr Ile Phe Ser Tyr Val Lys Thr Phe Gln Ala His Leu Asp
            340                 345                 350

Arg Leu Leu Pro Asp Arg Val Gln Val Gly Met Ala Gln His Phe Met
        355                 360                 365

Arg Ser Tyr Ser Asp Leu Leu Ile Arg Thr Cys His Thr Val Val Cys
    370                 375                 380

His Val Gly Gly Met Ala Ala Gln Ile Pro Ile Arg Asp Asp Pro Lys
385                 390                 395                 400

Ala Asn Glu Met Ala Leu Glu Leu Val Arg Lys Asp Lys Leu Arg Glu
                405                 410                 415

Ala Lys Ala Gly His Asp Gly Thr Trp Ala Ala His Pro Gly Leu Ile
            420                 425                 430

Pro Ala Cys Met Glu Val Phe Thr Asn Ser Met Gly Asn Ala Pro Asn
        435                 440                 445

Gln Ile Arg Ser Ala Arg Arg Asp Ala Ala Asn Leu Thr Glu Asp
    450                 455                 460

Asp Leu Leu Gln Gln Pro Arg Gly Val Arg Thr Leu Glu Gly Leu Arg
465                 470                 475                 480

Leu Asn Thr Arg Val Gly Ile Gln Tyr Leu Ala Ala Trp Leu Thr Gly
                485                 490                 495

Thr Gly Ser Val Pro Leu Tyr Asn Leu Met Glu Asp Ala Ala Thr Ala
            500                 505                 510

Glu Ile Ser Arg Val Gln Asn Trp Gln Trp Leu Lys Tyr Gly Val Glu
        515                 520                 525

Leu Asp Gly Asp Gly Leu Gly Val Arg Val Asn Lys Glu Leu Phe Ala
    530                 535                 540

Arg Val Val Glu Glu Glu Met Glu Arg Ile Glu Arg Glu Val Gly Lys
545                 550                 555                 560
```

```
Glu Lys Phe Arg Lys Gly Met Tyr Lys Glu Ala Cys Lys Met Phe Thr
            565                 570                 575
Arg Gln Cys Thr Ala Pro Thr Leu Asp Asp Phe Leu Thr Leu Asp Ala
        580                 585                 590
Tyr Asn His Ile Val Ile His His Pro Arg Glu Leu Ser Arg Leu
    595                 600                 605
```

<210> SEQ ID NO 44
<211> LENGTH: 3410
<212> TYPE: DNA
<213> ORGANISM: ARTIFICIAL SEQUENCE
<220> FEATURE:
<223> OTHER INFORMATION: CHEMICALLY SYNTHESIZED

<400> SEQUENCE: 44

```
aatggcttcc tctatgctct cttccgctac tatggttgcc tctccggctc aggccactat    60
ggtcgctcct ttcaacggac ttaagtcctc cgctgccttc ccagccaccc gcaaggctaa   120
cggaggtcca cgcggccagg gcaagcgcct ggctcagctc cttggagctc agctgaagca   180
gtacgcagcg gaggtgcgtg gcatcagcac agctggtggc gcttctcgcg gtggagctcg   240
aggacctgca tcccctagct cgctagagca gcagacgcgc caggtcgctc aggttgctgt   300
tcagcagtcg actcagcagg cagtgaaggt cgttgtgccg gccatcaaag tagacctggt   360
tggtgcggtc agctcggtgt ctgagagcga caaggtggag ccgggtgtgt tcaagaacgt   420
ggatggccac cgcttcgagg acggtcgcta tgccgctttt gttgaggaga ttacaaagtt   480
tatccccaag gagcgccagt actcggaccc cgtgcgcaca ttcgcgtatg cacggatgc   540
ctccttctac cggcttaacc gaagctggt agtgaaggtg cacaacgagg acgaggtccg   600
ccgcatcatg cccatcgcgg agcggctgca ggtccctatc accttccgcg cggccggcac   660
gtcgctgtct gggcaggcaa ttaccgactc ggtgctcatt aagctgagcc acacgggcaa   720
gaacttccgc aactttaccg tgcacggcga cggtagcgtg atcacggtgg agccgggcct   780
cattggcggc gaggtgaacc gcatcctggc ggcacaccag aagaagaaca agctgcccat   840
ccagtacaag atcggacccg acccctcctc catcgacagc tgcatgatcg gcggcatcgt   900
gtccaacaac agcagcggca tgtgctgcgg cgtgagccag aacacctacc acacgctgaa   960
ggacatgcgg gtggtgttcg tagacggaac ggtgctggac acggccgacc ccaactcgtg  1020
caccgccttc atgaagagcc accgctcgct ggtggatggc gtcgtgagcc tggcgcgccg  1080
cgtgcaggcc gacaaggagc tgacggcgct catccgccgc aagttcgcca tcaagtgcac  1140
caccggctac tccctgaacg cgctggtgga cttcccggtg acaaccccca ttgagatcat  1200
caagcacctc atcatcggca gcgagggcac gctgggcttc gtcagccgcg ccacctacaa  1260
caccgtgccc gagtggccca caaggcctc ggccttcatc gtgttcccgg acgtgcgcgc  1320
cgcctgcacc ggcgcctcgg tgctgcgcaa cgaaacctcc gtggacgcgg tggagctgtt  1380
tgaccgcgcc agcctgcgcg agtgcgagaa caacgaggac atgatgcgcc tggtgcccga  1440
catcaagggc tgcgacccca tggcggcagc gctgctgatc gagtgccgcg ccaggacga  1500
ggccgcactg cagagccgca ttgaggaggt ggtgcgcgtg ctgacggcgg cgggcctgcc  1560
cttcggcgcc aaggccgcgc agcccatggc catcgacgcc tacccctcc accacgacca  1620
gaagaacgcc aagtcttttt gggacgtgcg caggggcctg atcccccattg tgggcgcggc  1680
gcgcgagccc ggcacatcca tgctgatcga ggacgtggcc tgcccgtgg acaagctggc  1740
cgacatgatg atcgacctga tcgacatgtt ccagcgccac ggctaccacg acgcctcctg  1800
```

```
cttcggccac gcgctcgagg gcaaccttca tttggtattc tcgcagggct tccgcaacaa   1860
ggaggaggtg cagcgcttca gcgacatgat ggaggagatg tgccatctgg tagccaccaa   1920
gcactcgggc agcctcaagg gcgagcacgg cacgggccgc aacgtggcgc cgttcgtgga   1980
gatggagtgg ggcaacaagg cgtacgagct gatgtgggag ctcaaggcgc tgttcgaccc   2040
cagccacacc ctcaacccgg gcgtcatcct caaccgcgac caggacgcgc acatcaagtt   2100
cctgaagccc tcgcccgcgg cctcgccat cgtcaaccgc tgcatcgagt gcggcttctg    2160
cgagtccaac tgccctcgc gcgacatcac gctcacgccg ccagcgca tctccgtgta      2220
ccgcgagatg taccgcctca gcagctgggc ccgggcgcc agcgaggagg agaagaagca    2280
gctggcggcc atgagcagct cgtacgccta cgacggcgag cagacgtgcg cggcggacgg   2340
catgtgccag gagaagtgcc ccgtcaagat caacacgggc gatctgatca agtcgatgcg   2400
tgccgagcac atgaaggagg agaaaaccgc cagcggcatg gcagactggc tggccgccaa   2460
cttcggcgtc atcaactcca acgtgccgcg cttcctcaac atcgtcaacg ccatgcatag   2520
cgtagtgggc tcggcgcctc tgtccgccat cagccgcgcg ctcaacgccg ccaccaacca   2580
tttcgtaccg gtgtggaacc cctacatgcc caagggcgcg cgccgctca aggtgccccgc  2640
cccgccggcg ccggcagctg ctgaggcctc gggcatcccg cgcaaggtgg tgtacatgcc   2700
cagctgcgtg acgcgcatga tgggcccggc cgcctccgac accgaaaccg cggcggtgca   2760
cgagaaggtg atgagcctgt tcggcaaggc cggctacgag gtgatcatcc ccgagggcgt   2820
ggccagccag tgctgcggca tgatgttcaa cagccgcggc ttcaaggacg ccgccgccag   2880
caagggcgcg gagctggagg cggcgctgct caaggcctcg gacaatggca agatccccat   2940
cgtcatcgac acctcgccct gcctggcgca ggtgaagagc cagatcagcg agccgtcgct   3000
gcgcttcgcg ctgtacgagc cggttgagtt catccggcac ttcctggtgg acaagctgga   3060
gtggaagaag gtgcgcgacc aggtggccat ccacgtgccc tgctcctcca agaagatggg   3120
catcgaggag tccttcgcga agctggcggg cctgtgcgcc aacgaggtgg tgccctcggg   3180
cattccttgc tgcggcatgg cgggcgaccg cggcatgcgc ttccccgagc tgaccggcgc   3240
ctcgctgcag cacctcaacc tgcccaagac ctgcaaggac ggctactcca ccagccgcac   3300
ctgcgagatg tcgctcagca accacgccgg catcaacttc aggggcctgg tgtacctggt   3360
ggatgaggcc acggcgccta agaagcaggc cgccgctgcc aagaccgcgt              3410

<210> SEQ ID NO 45
<211> LENGTH: 1136
<212> TYPE: PRT
<213> ORGANISM: ARTIFICIAL SEQUENCE
<220> FEATURE:
<223> OTHER INFORMATION: CHEMICALLY SYNTHESIZED

<400> SEQUENCE: 45

Met Ala Ser Ser Met Leu Ser Ser Ala Thr Met Val Ala Ser Pro Ala
1               5                   10                  15

Gln Ala Thr Met Val Ala Pro Phe Asn Gly Leu Lys Ser Ser Ala Ala
            20                  25                  30

Phe Pro Ala Thr Arg Lys Ala Asn Gly Gly Pro Arg Gly Gln Gly Lys
        35                  40                  45

Arg Leu Ala Gln Leu Leu Gly Ala Gln Leu Lys Gln Tyr Ala Ala Glu
    50                  55                  60

Val Arg Gly Ile Ser Thr Ala Gly Gly Ala Ser Arg Gly Gly Ala Arg
65                  70                  75                  80
```

```
Gly Pro Ala Ser Pro Ser Ser Leu Glu Gln Gln Thr Arg Gln Val Ala
                85                  90                  95

Gln Val Ala Val Gln Ser Thr Gln Gln Ala Val Lys Val Val
            100                 105                 110

Pro Ala Ile Lys Val Asp Leu Val Gly Ala Val Ser Ser Val Ser Glu
            115                 120                 125

Ser Asp Lys Val Glu Pro Gly Val Phe Lys Asn Val Asp Gly His Arg
130                 135                 140

Phe Glu Asp Gly Arg Tyr Ala Ala Phe Val Glu Ile Thr Lys Phe
145                 150                 155                 160

Ile Pro Lys Glu Arg Gln Tyr Ser Asp Pro Val Arg Thr Phe Ala Tyr
                165                 170                 175

Gly Thr Asp Ala Ser Phe Tyr Arg Leu Asn Pro Lys Leu Val Lys
            180                 185                 190

Val His Asn Glu Asp Glu Val Arg Arg Ile Met Pro Ile Ala Glu Arg
    195                 200                 205

Leu Gln Val Pro Ile Thr Phe Arg Ala Ala Gly Thr Ser Leu Ser Gly
    210                 215                 220

Gln Ala Ile Thr Asp Ser Val Leu Ile Lys Leu Ser His Thr Gly Lys
225                 230                 235                 240

Asn Phe Arg Asn Phe Thr Val His Gly Asp Gly Ser Val Ile Thr Val
                245                 250                 255

Glu Pro Gly Leu Ile Gly Gly Glu Val Asn Arg Ile Leu Ala Ala His
            260                 265                 270

Gln Lys Lys Asn Lys Leu Pro Ile Gln Tyr Lys Ile Gly Pro Asp Pro
        275                 280                 285

Ser Ser Ile Asp Ser Cys Met Ile Gly Gly Ile Val Ser Asn Asn Ser
    290                 295                 300

Ser Gly Met Cys Cys Gly Val Ser Gln Asn Thr Tyr His Thr Leu Lys
305                 310                 315                 320

Asp Met Arg Val Val Phe Val Asp Gly Thr Val Leu Asp Thr Ala Asp
                325                 330                 335

Pro Asn Ser Cys Thr Ala Phe Met Lys Ser His Arg Ser Leu Val Asp
            340                 345                 350

Gly Val Val Ser Leu Ala Arg Arg Val Gln Ala Asp Lys Glu Leu Thr
        355                 360                 365

Ala Leu Ile Arg Arg Lys Phe Ala Ile Lys Cys Thr Thr Gly Tyr Ser
    370                 375                 380

Leu Asn Ala Leu Val Asp Phe Pro Val Asp Asn Pro Ile Glu Ile Ile
385                 390                 395                 400

Lys His Leu Ile Ile Gly Ser Glu Gly Thr Leu Gly Phe Val Ser Arg
                405                 410                 415

Ala Thr Tyr Asn Thr Val Pro Glu Trp Pro Asn Lys Ala Ser Ala Phe
            420                 425                 430

Ile Val Phe Pro Asp Val Arg Ala Ala Cys Thr Gly Ala Ser Val Leu
        435                 440                 445

Arg Asn Glu Thr Ser Val Asp Ala Val Glu Leu Phe Asp Arg Ala Ser
    450                 455                 460

Leu Arg Glu Cys Glu Asn Asn Glu Asp Met Met Arg Leu Val Pro Asp
465                 470                 475                 480

Ile Lys Gly Cys Asp Pro Met Ala Ala Ala Leu Leu Ile Glu Cys Arg
                485                 490                 495
```

```
Gly Gln Asp Glu Ala Ala Leu Gln Ser Arg Ile Glu Val Val Arg
                500                 505                 510

Val Leu Thr Ala Ala Gly Leu Pro Phe Gly Ala Lys Ala Ala Gln Pro
        515                 520                 525

Met Ala Ile Asp Ala Tyr Pro Phe His His Asp Gln Lys Asn Ala Lys
    530                 535                 540

Val Phe Trp Asp Val Arg Arg Gly Leu Ile Pro Ile Val Gly Ala Ala
545                 550                 555                 560

Arg Glu Pro Gly Thr Ser Met Leu Ile Glu Asp Val Ala Cys Pro Val
                565                 570                 575

Asp Lys Leu Ala Asp Met Met Ile Asp Leu Ile Asp Met Phe Gln Arg
                580                 585                 590

His Gly Tyr His Asp Ala Ser Cys Phe Gly His Ala Leu Glu Gly Asn
                595                 600                 605

Leu His Leu Val Phe Ser Gln Gly Phe Arg Asn Lys Glu Glu Val Gln
            610                 615                 620

Arg Phe Ser Asp Met Met Glu Glu Met Cys His Leu Val Ala Thr Lys
625                 630                 635                 640

His Ser Gly Ser Leu Lys Gly Glu His Gly Thr Gly Arg Asn Val Ala
                645                 650                 655

Pro Phe Val Glu Met Glu Trp Gly Asn Lys Ala Tyr Glu Leu Met Trp
                660                 665                 670

Glu Leu Lys Ala Leu Phe Asp Pro Ser His Thr Leu Asn Pro Gly Val
                675                 680                 685

Ile Leu Asn Arg Asp Gln Asp Ala His Ile Lys Phe Leu Lys Pro Ser
    690                 695                 700

Pro Ala Ala Ser Pro Ile Val Asn Arg Cys Ile Glu Cys Gly Phe Cys
705                 710                 715                 720

Glu Ser Asn Cys Pro Ser Arg Asp Ile Thr Leu Thr Pro Arg Gln Arg
                725                 730                 735

Ile Ser Val Tyr Arg Glu Met Tyr Arg Leu Lys Gln Leu Gly Pro Gly
                740                 745                 750

Ala Ser Glu Glu Glu Lys Lys Gln Leu Ala Ala Met Ser Ser Ser Tyr
        755                 760                 765

Ala Tyr Asp Gly Glu Gln Thr Cys Ala Ala Asp Gly Met Cys Gln Glu
    770                 775                 780

Lys Cys Pro Val Lys Ile Asn Thr Gly Asp Leu Ile Lys Ser Met Arg
785                 790                 795                 800

Ala Glu His Met Lys Glu Glu Lys Thr Ala Ser Gly Met Ala Asp Trp
                805                 810                 815

Leu Ala Ala Asn Phe Gly Val Ile Asn Ser Asn Val Pro Arg Phe Leu
                820                 825                 830

Asn Ile Val Asn Ala Met His Ser Val Val Gly Ser Ala Pro Leu Ser
    835                 840                 845

Ala Ile Ser Arg Ala Leu Asn Ala Ala Thr Asn His Phe Val Pro Val
    850                 855                 860

Trp Asn Pro Tyr Met Pro Lys Gly Ala Ala Pro Leu Lys Val Pro Ala
865                 870                 875                 880

Pro Pro Ala Pro Ala Ala Glu Ala Ser Gly Ile Pro Arg Lys Val
                885                 890                 895

Val Tyr Met Pro Ser Cys Val Thr Arg Met Met Gly Pro Ala Ala Ser
        900                 905                 910

Asp Thr Glu Thr Ala Ala Val His Glu Lys Val Met Ser Leu Phe Gly
```

|                                         |                 |                 |
| --------------------------------------- | --------------- | --------------- |
|                                915      |       920       |       925       |

Lys Ala Gly Tyr Glu Val Ile Ile Pro Glu Gly Val Ala Ser Gln Cys
    930                 935                 940

Cys Gly Met Met Phe Asn Ser Arg Gly Phe Lys Asp Ala Ala Ala Ser
945                 950                 955                 960

Lys Gly Ala Glu Leu Glu Ala Ala Leu Leu Lys Ala Ser Asp Asn Gly
                965                 970                 975

Lys Ile Pro Ile Val Ile Asp Thr Ser Pro Cys Leu Ala Gln Val Lys
            980                 985                 990

Ser Gln Ile Ser Glu Pro Ser Leu Arg Phe Ala Leu Tyr Glu Pro Val
        995                 1000                1005

Glu Phe Ile Arg His Phe Leu Val Asp Lys Leu Glu Trp Lys Lys
    1010                1015                1020

Val Arg Asp Gln Val Ala Ile His Val Pro Cys Ser Ser Lys Lys
    1025                1030                1035

Met Gly Ile Glu Glu Ser Phe Ala Lys Leu Ala Gly Leu Cys Ala
    1040                1045                1050

Asn Glu Val Val Pro Ser Gly Ile Pro Cys Cys Gly Met Ala Gly
    1055                1060                1065

Asp Arg Gly Met Arg Phe Pro Glu Leu Thr Gly Ala Ser Leu Gln
    1070                1075                1080

His Leu Asn Leu Pro Lys Thr Cys Lys Asp Gly Tyr Ser Thr Ser
    1085                1090                1095

Arg Thr Cys Glu Met Ser Leu Ser Asn His Ala Gly Ile Asn Phe
    1100                1105                1110

Arg Gly Leu Val Tyr Leu Val Asp Glu Ala Thr Ala Pro Lys Lys
    1115                1120                1125

Gln Ala Ala Ala Ala Lys Thr Ala
    1130                1135

<210> SEQ ID NO 46
<211> LENGTH: 694
<212> TYPE: RNA
<213> ORGANISM: ARTIFICIAL SEQUENCE
<220> FEATURE:
<223> OTHER INFORMATION: CHEMICALLY SYNTHESIZED

<400> SEQUENCE: 46

| | |
|---|---:|
| uacuauucca gcaguaagac agagccuacu ggcaaucguc ggcugagcug gcagucgcau | 60 |
| ccaucuuucu ucauaccaau ucgaucauuc uguuggaagu gccagcaaaa ucacccgagu | 120 |
| ugauguucag aaggcaauca augacgugcu guuucuugac agagaagaug caugauggug | 180 |
| uuuauaaagu uaaguuuuca cuguuucucg aucaacucaa ugauuaggaa cucuccuguc | 240 |
| uaucuaguuu ugguuuuaca uaggaucuau auagagguaa auguccaucc caccuuugua | 300 |
| uuuucuggaa gaaagaaaga uaagacacug agaauaaccg cgagauagag aggcuuaaag | 360 |
| auggagaaca aagaaggguu uuugaauauu acaaaauaca aaggugggau ggacauuuac | 420 |
| cucuauauag auccuaugua aacccaaaac uagauagaca ggagaguucc uaaucauuga | 480 |
| guugaucgag aaacagugaa aacuuaacuu uauaaacacc aucaugcauc uucucuguca | 540 |
| agaaacagca cgucauugau ugccuucuga acaucaacuc ggugauuuu gcuggcacuu | 600 |
| ccaacagaau gaucgaauug guaugaagaa agauggaugc gacugccagc ucagccgacg | 660 |
| auugccagua ggcucugucu uacugcugga augc | 694 |